US012792613B2

(12) United States Patent
Smith et al.

(10) Patent No.: US 12,792,613 B2
(45) Date of Patent: Nov. 10, 2026

(54) ERROR IDENTIFICATION, INDEXING AND LINKING CONSTRUCTION DOCUMENTS

(71) Applicant: Blink Forward, LLC, Phoenix, AZ (US)

(72) Inventors: Samuel Melvin Smith, Lehi, UT (US); Michael Smith, Rancho Cucamonga, CA (US)

(73) Assignee: Blink Forward L.L.C., Phoenix, AZ (US)

( * ) Notice: Subject to any disclaimer, the term of this patent is extended or adjusted under 35 U.S.C. 154(b) by 0 days.

(21) Appl. No.: 19/025,852

(22) Filed: Jan. 16, 2025

(65) Prior Publication Data

US 2025/0231950 A1 Jul. 17, 2025

Related U.S. Application Data

(63) Continuation of application No. 18/472,968, filed on Sep. 22, 2023, now Pat. No. 12,259,893, which is a (Continued)

(51) Int. Cl.

*G06F 16/2457* (2019.01)
*G06F 16/22* (2019.01)
(Continued)

(52) U.S. Cl.

CPC .... *G06F 16/24575* (2019.01); *G06F 16/2228* (2019.01); *G06F 16/285* (2019.01); (Continued)

(58) Field of Classification Search

None
See application file for complete search history.

(56) References Cited

U.S. PATENT DOCUMENTS

| | | | |
|---|---|---|---|
| 5,613,110 | A | 3/1997 | Stuart |
| 6,182,091 | B1 | 1/2001 | Pitkow et al. |

(Continued)

OTHER PUBLICATIONS

Editorial: Evidence-based Guidelines for Avoiding Reference List Errors in Manuscripts Submitted to Journals for Review for Publication (Year: 2011).*

(Continued)

*Primary Examiner* — Kim T Nguyen
(74) *Attorney, Agent, or Firm* — PCFB, LLC; Justin K. Flanagan

(57) ABSTRACT

The present disclosure provides various systems and methods for indexing digital (electronic) documents and providing various error reporting and identification functions. The systems and methods may utilize various software, hardware, and firmware modules to identify notations, such as sheet names, anchors, and anchor references on construction documents. Various algorithms and methods may be employed to identify errors, erroneous notations, missing sheets, missing details, and/or the like to aid in the correction of construction documents. Identified notations are indexed and used to create hyperlinked pages that are easily navigable. In some embodiments, the hyperlinked pages may include previous- and next-sheet hyperlinks that allow for direct navigation within a set of pages, according to an order provided in an index sheet (e.g., a table of contents sheet).

18 Claims, 47 Drawing Sheets

Related U.S. Application Data continuation of application No. 17/681,977, filed on Feb. 28, 2022, now Pat. No. 11,768,838, which is a continuation of application No. 16/277,078, filed on Feb. 15, 2019, now Pat. No. 11,263,219, which is a continuation of application No. 15/156,184, filed on May 16, 2016, now abandoned, which is a continuation of application No. 15/075,989, filed on Mar. 21, 2016, now Pat. No. 9,600,480, which is a continuation of application No. 13/920,982, filed on Jun. 18, 2013, now Pat. No. 9,292,510.

(51) Int. Cl.

| | |
|---|---|
| ***G06F 16/28*** | (2019.01) |
| ***G06F 16/93*** | (2019.01) |
| ***G06F 16/955*** | (2019.01) |
| ***G06F 16/958*** | (2019.01) |
| ***G06F 40/134*** | (2020.01) |
| ***G06F 40/279*** | (2020.01) |

(52) U.S. Cl.

CPC .............. *G06F 16/93* (2019.01); *G06F 16/94* (2019.01); *G06F 16/9558* (2019.01); *G06F 16/958* (2019.01); *G06F 40/134* (2020.01); *G06F 40/279* (2020.01)

(56) References Cited

U.S. PATENT DOCUMENTS

| | | | | |
|---|---|---|---|---|
| 6,263,121 | B1 | 7/2001 | Melen et al. | |
| 7,860,844 | B2 | 12/2010 | Ebaugh et al. | |
| 7,987,165 | B2 | 7/2011 | Steele et al. | |
| 8,046,361 | B2 | 10/2011 | Sigurbjornsson et al. | |
| 8,112,441 | B2 | 2/2012 | Ebaugh et al. | |
| 8,306,326 | B2 | 11/2012 | Behm et al. | |
| 8,447,747 | B1 | 5/2013 | Yi et al. | |
| 8,631,008 | B1 | 1/2014 | G. et al. | |
| 8,990,235 | B2 | 3/2015 | King et al. | |
| 9,152,763 | B2 | 10/2015 | Carus et al. | |
| 9,171,073 | B1 | 10/2015 | Ye et al. | |
| 9,292,510 | B2 * | 3/2016 | Smith | G06F 16/2228 |
| 9,317,496 | B2 | 4/2016 | Myers et al. | |
| 9,323,733 | B1 | 4/2016 | Mcghee et al. | |
| 9,588,971 | B2 | 3/2017 | Hartmann et al. | |
| 9,600,480 | B2 | 3/2017 | Smith et al. | |
| 9,710,519 | B1 | 7/2017 | Smith et al. | |
| 9,753,899 | B1 * | 9/2017 | Smith | G06F 16/94 |
| 9,811,565 | B2 * | 11/2017 | Smith | G06F 16/285 |
| 11,263,219 | B2 * | 3/2022 | Smith | G06F 40/134 |
| 2003/0120647 | A1 | 6/2003 | Aiken et al. | |
| 2003/0191737 | A1 | 10/2003 | Steele et al. | |
| 2004/0122811 | A1 | 6/2004 | Page | |
| 2005/0039115 | A1 | 2/2005 | Gordon et al. | |
| 2005/0076000 | A1 | 4/2005 | Sweet et al. | |
| 2005/0188300 | A1 | 8/2005 | Sweet et al. | |
| 2007/0044027 | A1 | 2/2007 | Fischer | |
| 2007/0150483 | A1 | 6/2007 | Goldman et al. | |
| 2008/0040389 | A1 | 2/2008 | Seth et al. | |
| 2008/0056575 | A1 | 3/2008 | Behm et al. | |
| 2008/0201318 | A1 | 8/2008 | McNew | |
| 2009/0083305 | A1 | 3/2009 | Baker | |
| 2009/0144614 | A1 | 6/2009 | Dresevic et al. | |
| 2009/0265315 | A1 | 10/2009 | Sigurbjornsson et al. | |
| 2011/0043652 | A1 | 2/2011 | King et al. | |
| 2011/0087641 | A1 | 4/2011 | Baker | |
| 2013/0173603 | A1 | 7/2013 | Hamilton et al. | |
| 2013/0246436 | A1 | 9/2013 | Levine | |
| 2014/0214864 | A1 | 7/2014 | Tudusciuc | |
| 2014/0215322 | A1 | 7/2014 | Gunderson | |
| 2014/0372445 | A1 * | 12/2014 | Smith | G06F 16/94 707/738 |
| 2015/0220497 | A1 | 8/2015 | Kutilek et al. | |
| 2015/0220520 | A1 | 8/2015 | Hartmann et al. | |
| 2016/0203133 | A1 | 7/2016 | Smith et al. | |
| 2016/0259819 | A1 * | 9/2016 | Smith | G06F 16/958 |
| 2017/0185651 | A1 * | 6/2017 | Smith | G06F 16/9558 |
| 2017/0242829 | A1 | 8/2017 | Smith et al. | |
| 2017/0270168 | A1 * | 9/2017 | Smith | G06F 16/24575 |
| 2019/0179825 | A1 * | 6/2019 | Smith | G06F 16/24575 |
| 2022/0261408 | A1 * | 8/2022 | Smith | G06F 16/93 |
| 2024/0012822 | A1 * | 1/2024 | Smith | G06F 16/958 |
| 2025/0231950 | A1 * | 7/2025 | Smith | G06F 16/24575 |

OTHER PUBLICATIONS

Low-Cost Storage and Retrieval of Organic Structures by Permuted Line Notations: Small Collections (Year: 1968).*

U.S. Appl. No. 15/616,755, Non-Final Office Action Mailed Jul. 13, 2017, 22 pp.

U.S. Appl. No. 15/592,057; Notice of Allowance; Mailed Jun. 16, 2017, 16 pp.

U.S. Appl. No. 13/920,982; Non-final Office Action Mailed Aug. 27, 2015, 16 pp.

U.S. Appl. No. 15/075,989; Non-final Office Action Mailed Jul. 1, 2016, 17 pp.

U.S. Appl. No. 15/616,755, Notice of Allowance Mailed Sep. 25, 2017 , 7 pp.

U.S. Appl. No. 15/156,184, Final Office Action Mailed Oct. 16, 2018, 17 pp.

U.S. Appl. No. 15/156,184, Office Action Mailed Mar. 3, 2018, 16 pp.

U.S. Appl. No. 15/075,989, Notice of Allowance Mailed Feb. 1, 2017, 17 pp.

U.S. Appl. No. 17/681,977, Non-Final Office Action Mailed Nov. 9, 2022, 12 pp.

* cited by examiner 900
910
Sheet Number
ARCHITECTURAL DRAWING LIST
A-100 Site Plan
A-101 Lower Level Floor Plan
A-102 Second Level Floor Plan
A-104 Third Level Floor Plan
A-105 Fourth Level Floor Plan
A-115 Top of Roof 901
921
A-115
ROOM
L101
A-472
920
3
A-301

902
931
A-301
301E
301F
301G
203
201
100
L 101
SECTION 6
SCALE: 1/8 = 1'-0"
930

FIG. 28G

2860

Bad Links 2861 2862 2863 2864 2865

| File | Page | Sheet | Detail Sheet | Detail | Reason |
|---|---|---|---|---|---|
| 005_A0.5 - CODE ANALYSIS.pdf | 1 | A05 | A32 | A | Sheet Missing |
| 020_C2.01 - PRECISE GRADING PLAN.pdf | 1 | C201 | A26 | P | Sheet Missing |
| 023_C4.01 - UTILITY PLAN.pdf | 1 | C401 | C900 | A, P | Sheet Missing |
| 031_A2.1 - FIRST FLOOR PLAN.pdf | 1 | A21 | A101D | 1 | Sheet Missing |
| 031_A2.1 - FIRST FLOOR PLAN.pdf | 1 | A21 | A102A | | Sheet Missing |
| 031_A2.1 - FIRST FLOOR PLAN.pdf | 1 | A21 | A103A | P | Sheet Missing |
| 031_A2.1 - FIRST FLOOR PLAN.pdf | 1 | A21 | A104A | | Sheet Missing |
| 031_A2.1 - FIRST FLOOR PLAN.pdf | 1 | A22 | A107A | 2, 2 | Sheet Missing |
| 032_A2.2 - MEZZANINE FLOOR PLAN.pdf | 1 | A23 | A119A | P | Sheet Missing |
| 033_A2.3 - CATWALK PLAN.pdf | 1 | A24 | A101A | P | Sheet Missing |
| ■ | ■ | ■ | ■ | ■ | ■ |
| ■ | ■ | ■ | ■ | ■ | ■ |
| ■ | ■ | ■ | ■ | ■ | ■ |
| 061_9.2 - SUSPENDED CEILING DETA... | 1 | C197 | C193 | 2B | Sheet Missing |
| 072_S2.1 - FOUNDATION PLAN.pdf | 1 | C198 | C200 | 76 | Sheet Missing |
| 074_S3.2 - CATWALK FRAMING PLAN.pdf | 1 | A122A | A124B | | Sheet Missing |
| 076_S4.1 - LOW ROOF FRAMING PLA... | 1 | AV02 | A131A | | Sheet Missing |
| 177_AV-02 - FLOOR PLAN.pdf | 1 | A124C | A135C | | Sheet Missing |
| 177_AV-02 - FLOOR PLAN.pdf | 1 | AV11 | A136A | P | Sheet Missing |
| 177_AV-02 - FLOOR PLAN.pdf | 1 | AV02 | A137A | | Sheet Missing |
| 177_AV-02 - FLOOR PLAN.pdf | 1 | AV02 | A138A | A, P | Sheet Missing |

Previous Page Next Page

| File | Page | Sheet | Anchor Count Delta | 01/21/15 12:36 PM | 02/28/15 2:12 PM |
|---|---|---|---|---|---|
| 005_A0.5 - CODE ANALYSIS.pdf | 1 | A01 | 0 | 1 | 1 |
| 010_A1.2 - ENLARGED SITE PLA... | 1 | A03 | 0 | 3 | 3 |
| 012_A1.4 - DETAILS.pdf | 1 | A04 | 1 | 4 | 5 |
| 013_A1.5 - DETAILS.pdf | 1 | A05 | 0 | 7 | 7 |
| 014.1_A1.6 - DETAILS.pdf | 1 | A10 | (1) | 45 | 44 |
| 014_A1.7 - DETAILS.pdf | 1 | A101 | 0 | 32 | 32 |
| 023_C4.01 - UTILITY PLAN.pdf | 1 | A11F | 1 | 0 | 1 |
| 026_C5.03 - UTILITY DETAILS.pdf | 1 | A12 | 0 | 0 | 0 |
| 040_A5.1 - ELEVATIONS.pdf | 1 | A15 | (2) | 4 | 2 |
| 041_A5.2 - ELEVATIONS.pdf | 1 | C002 | (9) | 16 | 7 |
| ⋮ | ⋮ | ⋮ | | ⋮ | |
| 189_AV-14 - PULL BOX.pdf | 1 | TR714 | 1 | 7 | 8 |
| 190_AV-15 - INTERCOM.pdf | 1 | AV12 | 0 | 4 | 4 |
| 191_1 - GENERAL NOTES.pdf | 1 | AV14 | 0 | 2 | 2 |
| 192_2 - CHAIR LAYOUT.pdf | 1 | AV15 | (1) | 13 | 12 |
| 193_3 - FLOOR LAYOUT.pdf | 1 | 3 | 0 | 4 | 4 |
| 194_4 - SECTIONS.pdf | 1 | 4 | 1 | 1 | 2 |

ERROR IDENTIFICATION, INDEXING AND LINKING CONSTRUCTION DOCUMENTS

RELATED APPLICATIONS

This application is a continuation of U.S. patent application Ser. No. 18/472,968 filed on Sep. 22, 2023 titled "Error Identification, Indexing and Linking Construction Documents," which is a continuation of U.S. patent application Ser. No. 17/681,977 filed on Feb. 28, 2022 titled "Error Identification, Indexing and Linking Construction Documents," which is a continuation of U.S. patent application Ser. No. 16/277,078 filed on Feb. 15, 2019 titled "Error Identification, Indexing and Linking Construction Documents" now granted as U.S. Pat. No. 11,263,219, which is a continuation of U.S. patent application Ser. No. 15/156,184 filed on May 16, 2016 titled "Error Identification, Indexing and Linking Construction Documents," which is a continuation-in-part of Ser. No. 15/075,989 filed on Mar. 21, 2016 titled "Systems and Methods for Indexing and Linking Electronic Documents" now granted as U.S. Pat. No. 9,600,480, which is a continuation of Ser. No. 13/920,982 filed on Jun. 18, 2013 titled "Systems and Methods for Indexing and Linking Electronic Documents" now granted as U.S. Pat. No. 9,292,510, each of which is hereby incorporated by reference in its entirety.

TECHNICAL FIELD

This disclosure relates to machine-readable text analysis, database indexing, and error identification. More specifically, this disclosure provides various systems and methods for identifying internal cross-references within a set of electronic construction documents to identify errors and missing links.

BRIEF DESCRIPTION OF THE DRAWINGS

Non-limiting and non-exhaustive embodiments of the disclosure are described herein, including various embodiments of the disclosure illustrated in the figures listed below.

FIG. 28G illustrates a report from a bad link identification module that identifies links for which the referenced sheets or referenced anchors are missing.

Figure 1:
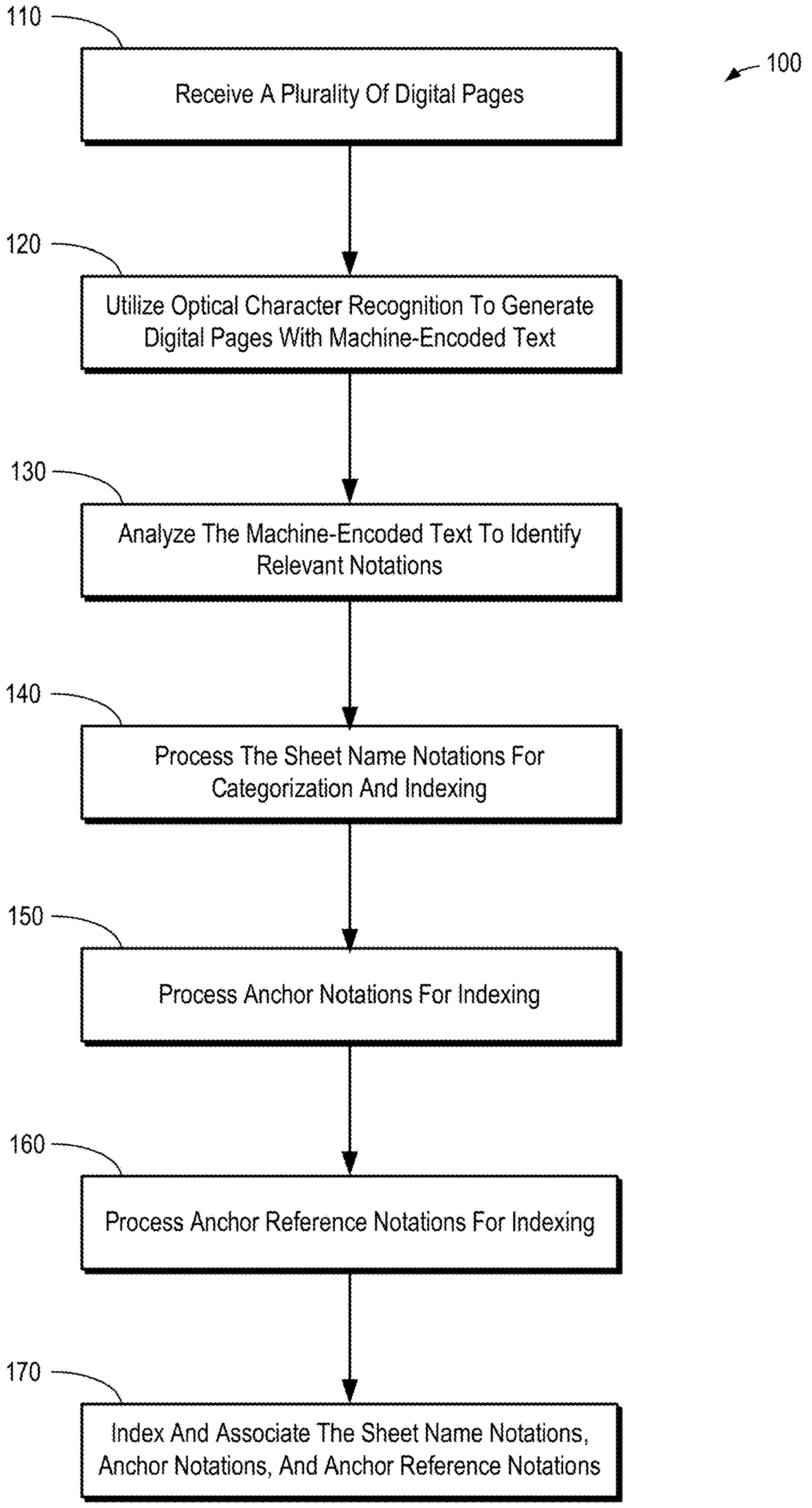
FIG. 1 illustrates a flow chart of a method for indexing a plurality of pages that include various notations, including sheet name notations (sheet names), anchor notations (anchors), and anchor reference notations (anchor references).

The described features, structures, and/or characteristics of the systems and methods described herein may be combined in any suitable manner in one or more alternative embodiments, and may differ from the illustrated embodiments.

DETAILED DESCRIPTION

The present disclosure provides various systems and methods for indexing digital (electronic) documents. The present disclosure also provides various systems and methods for generating electronically linked documents using the index. For clarity, the systems and methods are often described in terms of steps of a method and/or as actions performed by a computing system. However, the systems and methods described herein may be implemented in hardware, software, and/or firmware.

In various embodiments, an indexing system may receive a plurality of digital pages. The digital pages may be part of one or more electronic documents that have one digital page per document or multiple digital pages per document. In some embodiments, the digital pages may have machine-encoded text. For example, the digital pages may have been created in a word processor or other computer program that allows for machine-encoded text input.

In other embodiments, the digital pages may originate as scanned or image-based digital pages. Optical character recognition (OCR) and/or another image-text analysis technique may be utilized to generate digital pages with machine-encoded text. For instance, a computer processor may perform the OCR or a human may manually convert image-text to machine-encoded text. In some embodiments, a combination of computer processing and manual inputs may be performed.

The machine-encoded text of each of the digital documents may be analyzed to identify relevant notations. Although the systems and methods may be utilized and/or readily adapted for use with various document types and fields of interest, the remainder of the specification uses construction plan documents as an example. In that application, the indexing system may analyze the machine-encoded text to identify notations such as sheet names, anchors, anchor references, building names, etc.

Sheet names identified on the pages may be categorized into primary sheet names and reference sheet names. Each page of the documents may have a primary sheet name, although some primary sheet names may be blank primary sheet names, such as a table of contents page and/or index page (index sheet). A page may include one or more anchors. An anchor may be referred to using various alternative terms including, but not limited to, an anchor reference, a callout detail, an elevation detail, a detail, an elevation callout detail, and/or the like.

Each anchor may reference a particular portion of the page and may include an anchor description. An anchor may include just an anchor identifier, in which case it is understood that the anchor refers to the page on which it is found. In other embodiments, an anchor may include an anchor identifier together with a reference to the sheet name of the page on which it is found. That is, the anchor may include a reference to the primary sheet name to clarify that the anchor is associated with the page on which it is found.

Additionally, a page may include one or more anchor references. An anchor reference may be directed to an anchor on another page. For example, an anchor reference may include an anchor identifier and a reference sheet name. The anchor identifier of the anchor reference is directed to an anchor on the page corresponding to the reference sheet name. In some embodiments, the construction documents may refer to more than one building. In that case each primary sheet name may be associated with one or more of the buildings.

After identifying the various notations, the indexing system may generate an index that maps various associations between the primary sheet names, reference sheet names, anchors, anchor references, and/or building names. An "index" may include various sub-indexes. An index may be implemented using any of a wide variety of data types, arrays, mappings, tags, and structs, and/or any of a wide variety of associated data structures.

The index may be used to generate various reports related to the indexed notations, such as the number of anchor references that reference a particular sheet name or the number of sheet names not referenced by any anchor reference. The index may also be used to generate a plurality of linked pages corresponding to the originally indexed pages. The linked pages may provide various hyperlinks and integrated reports. For example, the linked pages may include hyperlinks for each of the anchor references that, when selected, direct a user to the referenced sheet name and/or anchor.

In some embodiments, analyzing the machine-encoded text, categorizing, and/or otherwise identifying notations may incorporate the usage of one or more whitelists and/or regular expressions. The term "regular expression" as used herein may relate to any type of software, hardware, or firmware module configured to automatically identify textual material that corresponds to one or more patterns, including text-based and image-based patterns. The term "regular expression" may also be used as defined in any of a wide variety of programming languages, as would be understood by one of skill in the art.

As used herein, the terms "hyperlinked" and "linked" are, in many instances, used broadly to encompass a variety of linking or hyperlinking variations. For example, the term "hyperlink" may be used to describe a "link" or "link action" within a PDF document as supported by, for example, ADOBE ACROBAT™. Thus, the term "hyperlink" or "link" might be used to describe a link action within a document intended to go to a page view, open a file, open a webpage, or implement a script that includes some form of redirection, highlighting, emphasizing, or linking.

Understanding that modules may be implemented in software, hardware, firmware, and/or a combination thereof, the system may include a notation identification module that identifies any of the various notations described herein. The system may include a categorization module that distinguishes between primary and reference sheet names. The system may also include an indexing module that indexes each of the plurality of pages and associates the notations with one another, as described herein.

Reference throughout this specification to "one embodiment" or "an embodiment" means that a particular feature, structure, or characteristic described in connection with the embodiment is included in at least one embodiment. Thus, the appearances of the phrases "in one embodiment" and "in an embodiment" in various places throughout this specification are not necessarily all referring to the same embodiment. In particular, an "embodiment" may be a system, an article of manufacture (such as a computer-readable storage medium), a method, and/or a product of a process.

Furthermore, the described features, operations, or characteristics may be combined in any suitable manner in one or more embodiments. The order of the steps or actions of the methods described in connection with the embodiments disclosed may be varied. Thus, any order in the drawings or Detailed Description is for illustrative purposes only and is not meant to imply a required order, unless otherwise specified.

Embodiments may include various features, which may be embodied in machine-executable instructions executed by a general-purpose or special-purpose computer (or other electronic device). Alternatively, the features may be performed by hardware components that include specific logic for performing the steps or by a combination of hardware, software, and/or firmware.

Accordingly, the various components, modules, systems, and/or features described herein may be embodied as modules within a system. Such a system may be implemented in software, firmware, hardware, and/or physical infrastructure. Although not always explicitly named herein, a module may be identified (named) based on a function it performs. For example, a module that is configured to display something may comprise specific hardware, software, or firmware and be properly referred to as a "display module."

Embodiments may also be provided as a computer program product including a non-transitory machine-readable medium having stored thereon instructions that may be used to program, or be executed on, a computer (or other electronic device) to perform processes described herein. The machine-readable medium may include, but is not limited to, hard drives, floppy diskettes, optical disks, CD-ROMs, DVD-ROMs, ROMs, RAMS, EPROMS, EEPROMs, magnetic or optical cards, solid-state memory devices, or other types of media/machine-readable media suitable for storing electronic instructions. Moreover, a computer program product may be run, executed, downloaded, and/or otherwise used locally or remotely via a network.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

FIG. 1 illustrates a flow chart of a method 100 for receiving a plurality of pages and indexing various notations, including sheet names, anchors, and anchor references. A system, such as a computing system comprising hardware, firmware, and/or software, may receive a plurality of digital pages, at 110. The system may receive the digital pages as a set of individual documents or files. Alternatively, the system may receive the digital pages as a single document or file having any number of pages.

In some embodiments, the digital pages may already include machine-encoded text. In other embodiments, optical character recognition (OCR) may be used to generate corresponding digital pages with machine-encoded text thereon, at 120. Alternatively, machine-encoded text that corresponds to text images on the original digital pages may be manually provided. The system may then analyze the machine-encoded text on each of the digital pages to identify one or more types of notations, at 130. For example, the system may analyze the machine-encoded text to identify primary sheet names, reference sheet names, anchors, anchor references, and/or building names.

In some embodiments, the system may identify sheet names and then process the sheet names for categorization and subsequent indexing, at 140. That is, each sheet name may be categorized as either a primary sheet name of a page or a reference sheet name that refers to the primary sheet name of another page. Additionally, identified anchors and/or anchor references may be processed and/or analyzed for indexing, at 150 and 160.

The system may generate an index that associates one or more of the sheet names (including primary and reference sheet names), anchors, and/or anchor references, at 170. For example, the index may associate a primary sheet name notation with each of the plurality of digital pages, and associate each reference sheet name notation with the primary sheet name notation on the page on which it is identified.

Figure 2:
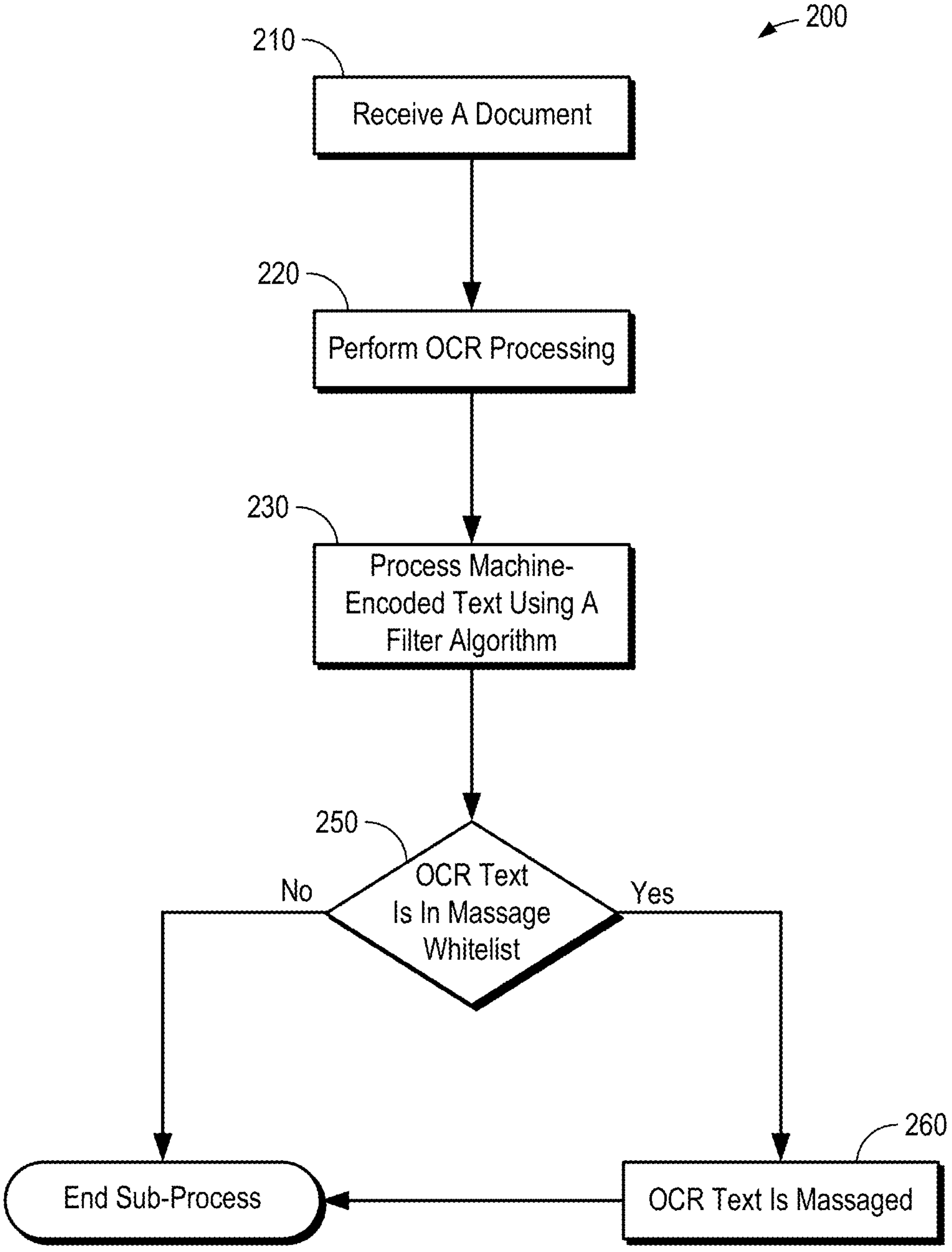
FIG. 2 illustrates a flow chart of a method for filtering and massaging machine-readable text recognized using optical character recognition (OCR).

FIG. 2 illustrates a flow chart of a method 200 for filtering and massaging machine-readable text recognized using optical character recognition (OCR). As illustrated, a system may receive a document, such as a document in the portable document format (PDF), at 210. The document may include one or more pages and may include image-based text (e.g., handwritten, typewritten, printed, or other non-machine-encoded text). The document may or may not also include some machine-encoded text. The system may then perform OCR processing, at 220, to generate machine-encoded text corresponding to the image-based text on the received document.

The system may then process the machine-encoded text using one or more OCR filtering algorithms, at 230, to improve the accuracy of the OCR processing. As part of the OCR filtering or in addition to the OCR filtering, the system may compare the machine-encoded text generated by the OCR processing with a massage whitelist, at 250. The massage whitelist may include a mapping of incorrect portions of text (e.g., a letter, symbol, word, or phrase) with corrected versions. For example, if a portion of the machine-encoded text is matched with an element in the massage whitelist, the portion of the machine-encoded text may be replaced with a corrected version, at 260. As a specific example, a massage whitelist may map the word “colour” with a replacement word “color.” Accordingly, the word “colour” may be replaced with the word “color” throughout the machine-encoded text on the document.

Figure 3:
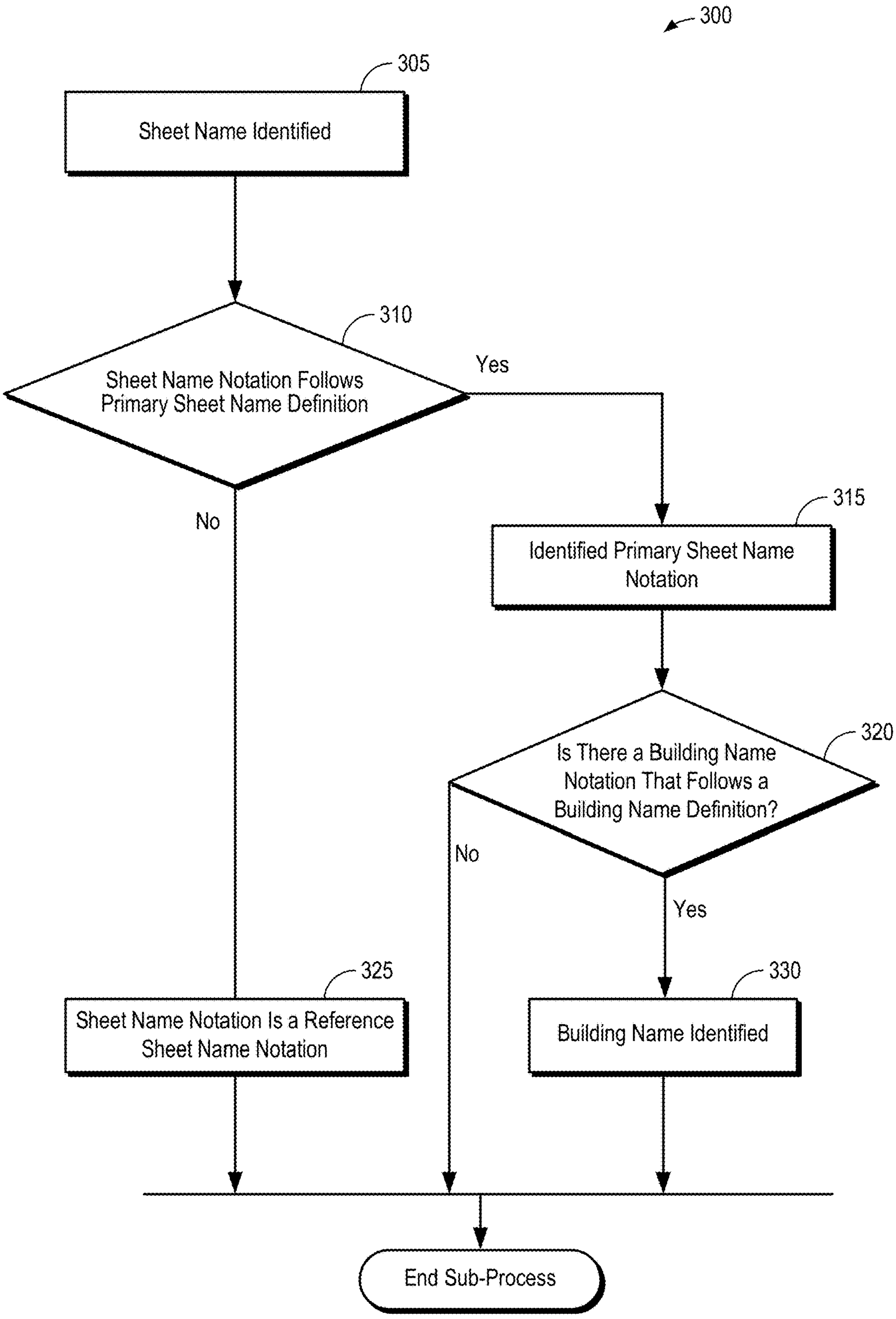
FIG. 3 illustrates a flow chart of a method for characterizing a sheet name notation as either a primary sheet name notation or a reference sheet name notation.

FIG. 3 illustrates a flow chart of a method 300 for characterizing a sheet name as either a primary sheet name or a reference sheet name. In some embodiments, the system may initially identify a sheet name as either a primary sheet name or a reference sheet name. Alternatively, the system may identify a sheet name in general, at 305. If the identified sheet name follows a primary sheet name definition (e.g., matches a whitelist or satisfies a regular expression), at 310, the system may identify the sheet name as a primary sheet name, at 315. However, if the sheet name notation does not follow the primary sheet name definition, at 310, the system may identify the sheet name as a reference sheet name, at 325. In some embodiments, if the sheet name is a primary sheet name, at 315, the system may determine if a building name is present, at 320, and identify the building name associated with the sheet name, at 330.

Figure 4:
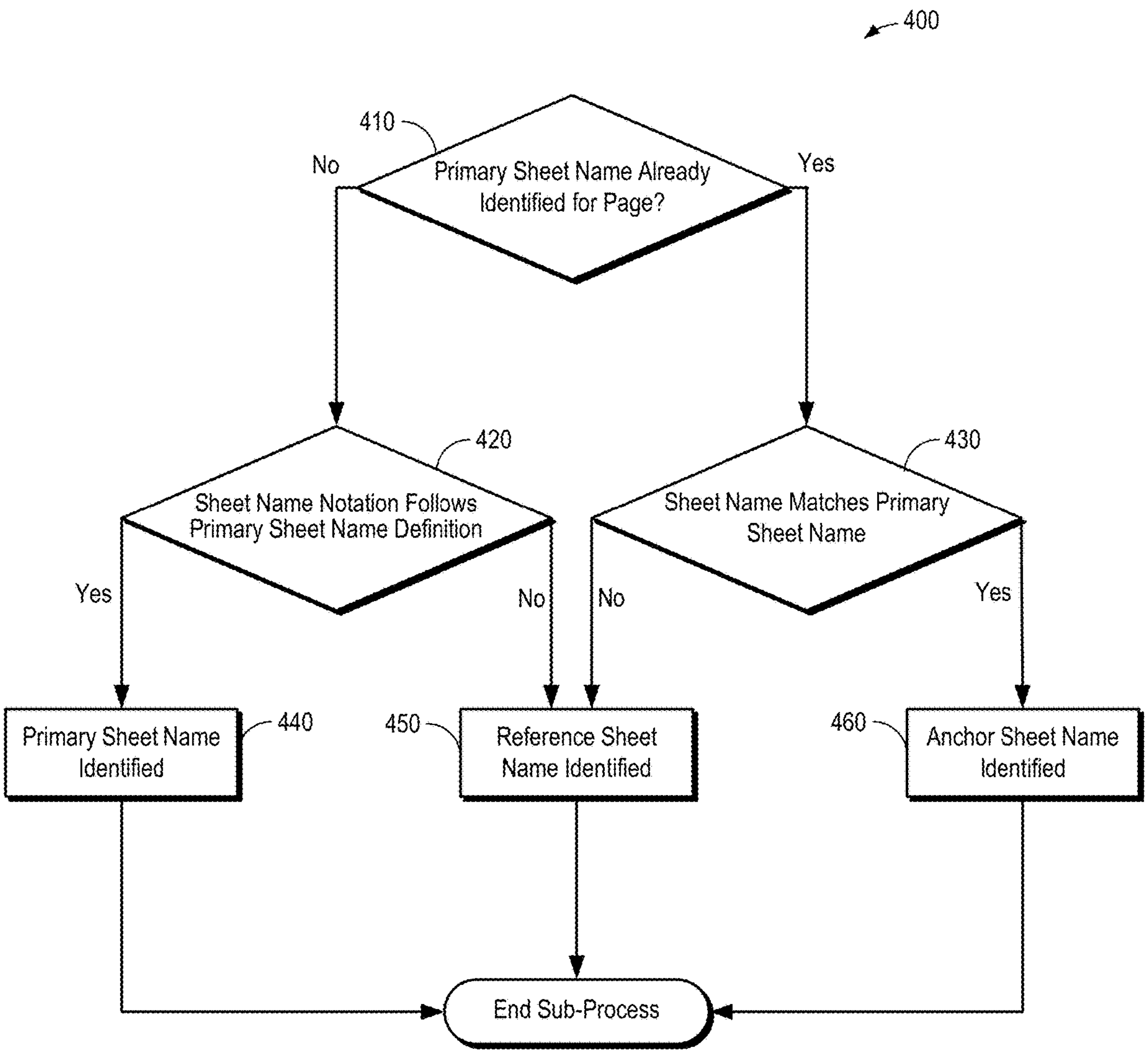
FIG. 4 illustrates a flow chart of a method for distinguishing between primary sheet name notations, reference sheet name notations, and anchor sheet name notations (i.e., sub parts of an anchor).

FIG. 4 illustrates a flow chart of another method 400 for distinguishing between primary sheet names, reference sheet names, and anchor sheet names that are part of an anchor. Initially, the system may identify an uncategorized sheet name. If a primary sheet name has not yet been identified for the page, at 410, and the uncategorized sheet name follows a primary sheet name definition, at 420, then the uncategorized sheet name may be categorized as a primary sheet name, at 440. If no primary sheet name has been identified, at 410, and the uncategorized sheet name does not follow the primary sheet name definition, at 420, the uncategorized sheet name may be identified as a reference sheet name, at 450.

If a primary sheet name has already been identified for the page, at 410, and the uncategorized sheet name does not match the primary sheet name, at 430, the uncategorized sheet name may be identified as a reference sheet name, at 450. If a primary sheet name has already been identified for the page, at 410, and the uncategorized sheet name matches the primary sheet name, at 430, the uncategorized sheet name may be identified as an anchor sheet name, at 460.

As described above, an anchor reference may refer to an anchor on another page. The anchor reference may include an anchor identifier and a reference sheet name, at 450. An anchor may include an anchor identifier and/or an anchor identifier coupled with a reference to the primary sheet name (an anchor sheet name).

Figure 5:
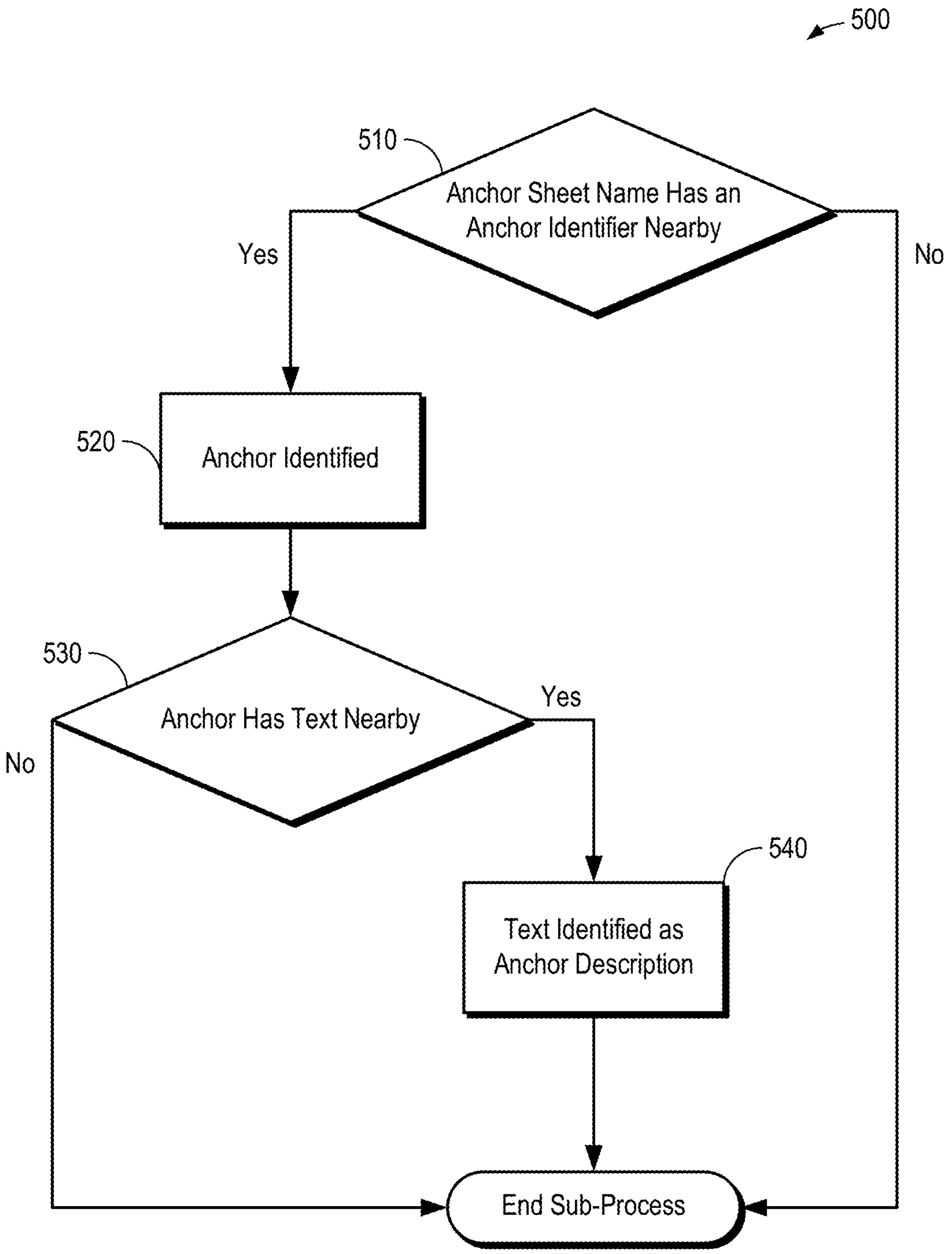
FIG. 5 illustrates a flow chart of a method for identifying an anchor based on the proximity of an anchor identifier to an anchor sheet name.

FIG. 5 illustrates a flow chart of a method 500 for identifying an anchor based on the proximity of an anchor identifier to an anchor sheet name. If an anchor sheet name (i.e., a reference to the primary sheet name of the page on which the reference is located) has an anchor identifier nearby, at 510, then an anchor is identified, at 520. If no anchor identifier is within a specified distance of the anchor sheet name, at 510, then the process ends without an anchor being identified. Once an anchor is identified, at 520, if there is text within a specified range of the anchor, at 530, an anchor description may be associated with the anchor, at 540.

Figure 6:
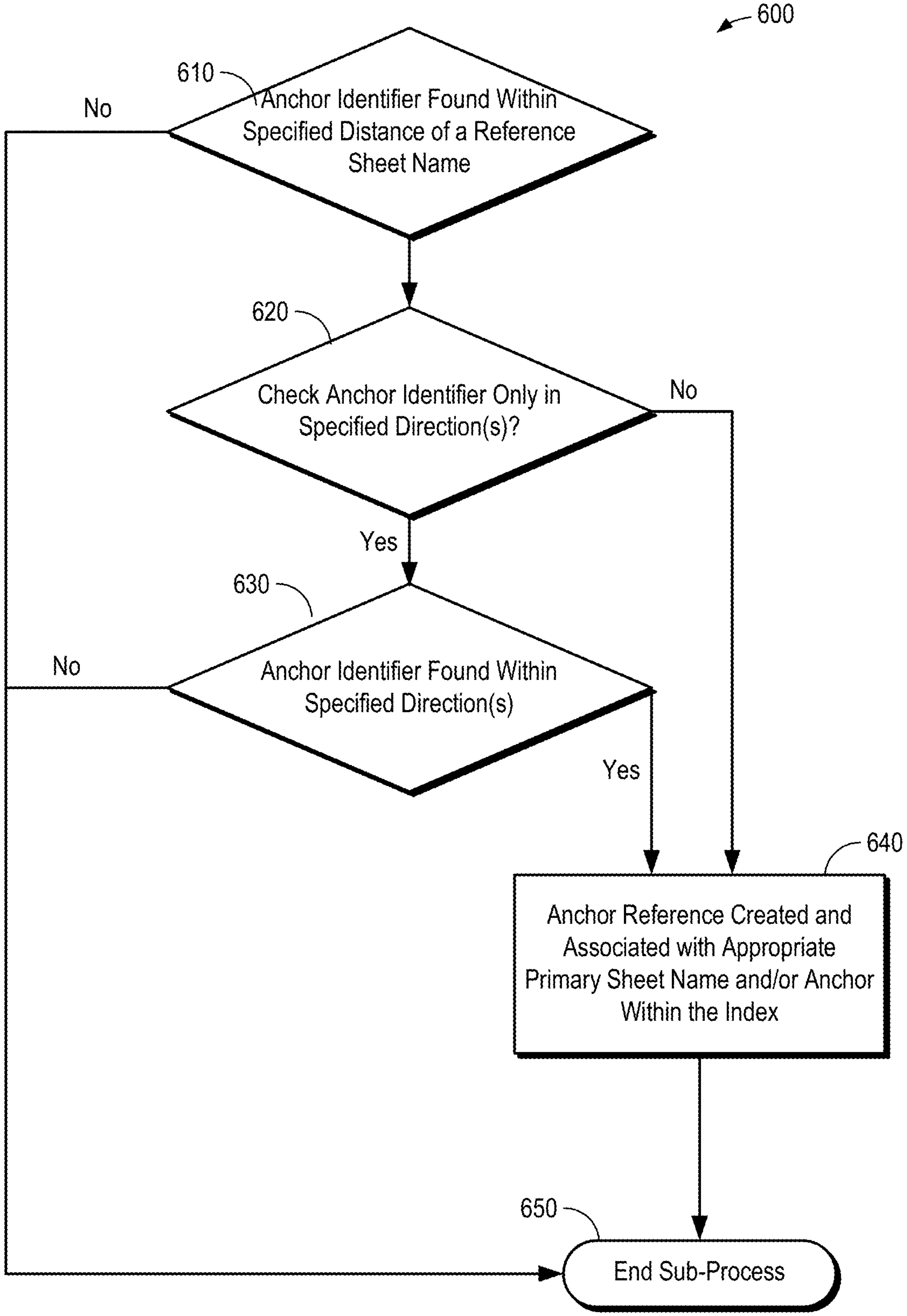
FIG. 6 illustrates a flow chart of a method for identifying an anchor reference based on the proximity of an anchor identifier to a reference sheet name.

FIG. 6 illustrates a flow chart of a method 600 for identifying an anchor reference based on the proximity of an anchor identifier to a reference sheet name. In some embodiments, an anchor reference may only be identified if an anchor identifier is within a specific distance, at 610, and/or in a particular direction relative to a reference sheet name, at 620 and 630. Otherwise, the identified anchor identifier may not be an anchor reference, at 650. An anchor reference may be identified and associated with the primary sheet name on which it is found, the anchor to which it refers, the page to which it refers, and/or the primary sheet name to which it refers, at 640.

In each of FIGS. 1-6, methods are described that identify a notation within machine-encoded text. The notations may be identified and/or categorized using a whitelist of one or more notations, by satisfying predefined criteria, by matching a predefined specification, and/or through the use of a regular expression. Although numerous variations are possible, the following is an example of a regular expression that may be used to identify a sheet name:

```
public static readonly Regex SheetRegex = new Regex(@"
^
(?<sheetName>
   (?<normalSheetName>
   [a-zA-Z]{1,3}
   [ ]?
   (?<badDash>"")?
   ([\\.-]?[0-9]){1,6}
   ([ \\.-]?[a-zA-Z])?[a-zA-Z]{0,3}
)
   |
   (?<coverSheet>
   [cC][sS][1-9]
   )
)
$
   ", RegexOptions.Compiled | RegexOptions.IgnorePatternWhitespace |
RegexOptions.ExplicitCapture);
```

It will be appreciated by one of skill in the art that regular expressions similar to the example above may be used to identify or categorize building names, anchors, anchor references, and/or other notations on one or more pages.

Figure 7:
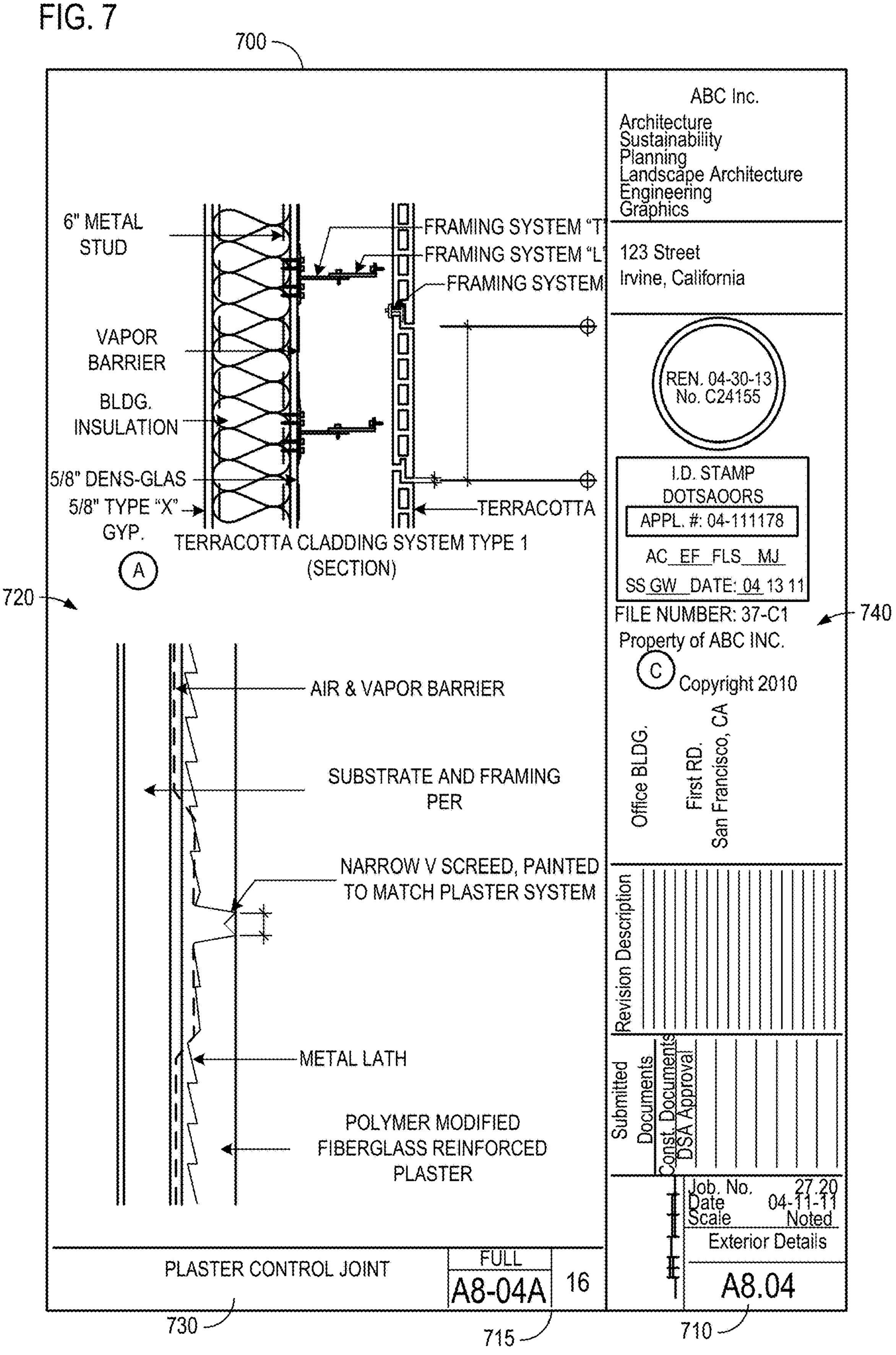
FIG. 7 illustrates an example of a construction page that can be processed by the embodiments of the present disclosure.

FIG. 7 illustrates an example of a construction page 700 that includes a primary sheet name 710 and an anchor 715. The anchor 715 may be associated with an anchor identifier, an anchor description 730, and detail, elevation, section, or other image data 720 on the page 700. The page 700 may include additional image-based text, machine-encoded text, images, and/or other information, such as ownership information 740.

Figure 8:
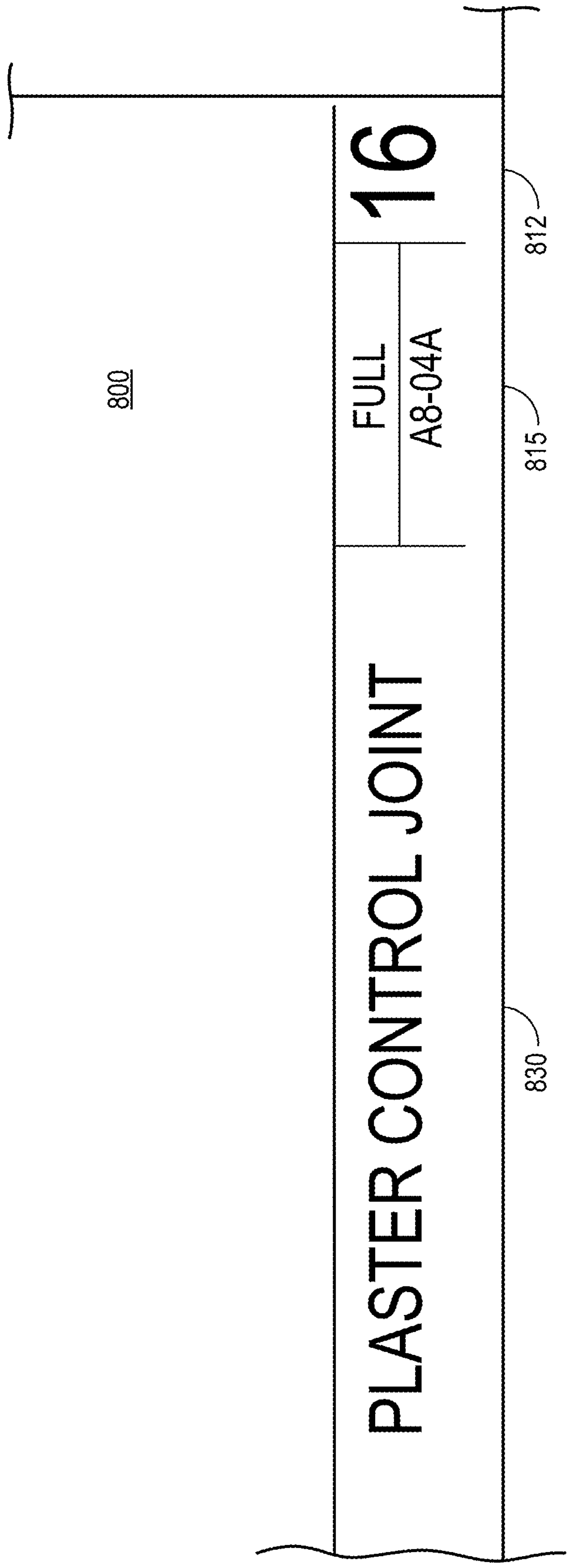
FIG. 8 illustrates a close-up view of the anchor of FIG. 7.

FIG. 8 illustrates a close-up view of an anchor 810 corresponding to the anchor 710 of FIG. 7. The anchor 810 on the page 800 may include an anchor identifier 812 and/or 815 and an anchor description 830. The anchor 810 may be identified using a regular expression or other pattern matching algorithm.

FIGS. 9A-9D illustrate examples of portions of three linked construction pages 900, 901, and 902. As previously described, the system may identify and index various notations on a plurality of pages, including primary sheet names, reference sheet names, anchor references, anchors, and possibly other notations. The index may map various relationships between each of the notations. The index may then be used to generate one or more linked pages, such as linked pages 900, 901, and 902.

Figures 9A, 9B, 9C, 9D:
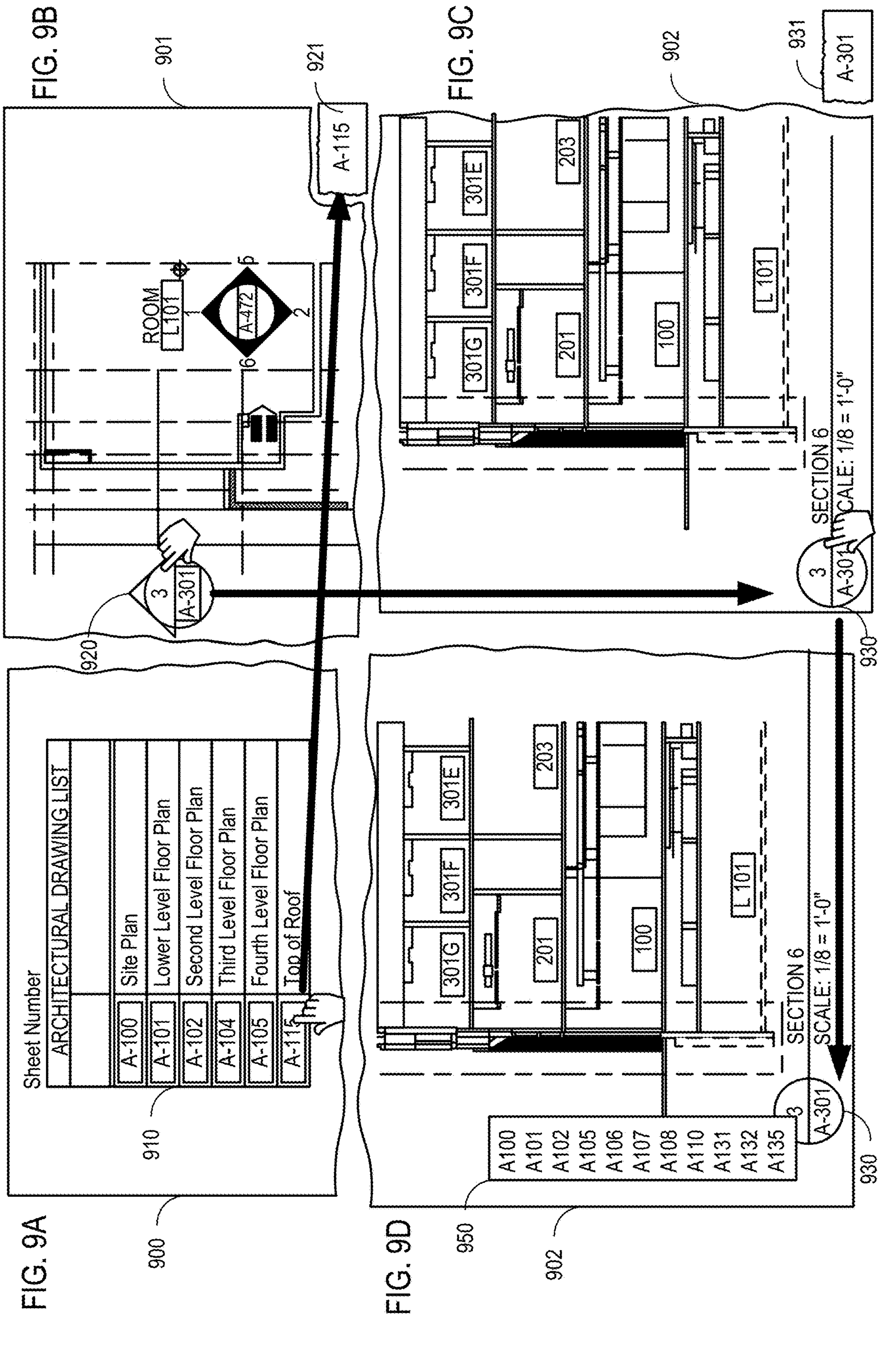
FIGS. 9A-9D illustrate examples of portions of linked construction pages and navigation between them using hyperlinked notations.

As illustrated, the first linked page 900 of FIG. 9A may include a table of contents 910 of various reference sheet names that refer to primary sheet names of other pages. Selecting a reference sheet name from the table of contents 910, such as reference sheet name A-115, with a cursor (or other selection implement/method) may direct an operator to the page 901 of FIG. 9B with the corresponding primary sheet name A-115, at 921. Accordingly, each reference sheet name in the table of contents 910 may be a hyperlink that opens the hyperlinked page and/or navigates to the correct page within a document of multiple pages.

The second linked page 901 of FIG. 9B shows an anchor reference 920. The anchor reference 920 may refer to a particular anchor on another page and the primary sheet name of that other page. Accordingly, anchor reference 920 may include an anchor identifier (shown as the number 3) and a reference sheet name reference to the primary sheet name A-301 of the other page. Selecting the anchor identifier of the anchor reference 920 may direct a user to a zoomed-in view of the corresponding anchor 930 on the page 902 of FIG. 9C associated with the primary sheet name A-301, at 931. Selecting the reference sheet name of the anchor reference 920 may direct a user to a zoomed-out view of the page associated with the primary sheet name A-301.

In FIG. 9C, the third linked page 902 includes A-301 as a primary sheet name 931, and an anchor 930 that refers to some image content or other detail, elevation, or section of the page 902. The anchor 930 may include an anchor identifier (3) and a sheet name that is the same as the primary sheet name 931 of the page 902 on which the anchor is found. In some embodiments, by clicking, right-clicking, mousing over, and/or otherwise selecting or partially selecting the anchor 930 (or other notation), a user may display a back link pop-up window 950 that displays a listing of primary sheet names that reference the anchor 930, as shown in FIG. 9D. Similarly, a back link pop-up window may be available for other notations and may include a listing of sheet names, anchors, and/or anchor references associated with a selected notation.

Figure 10:
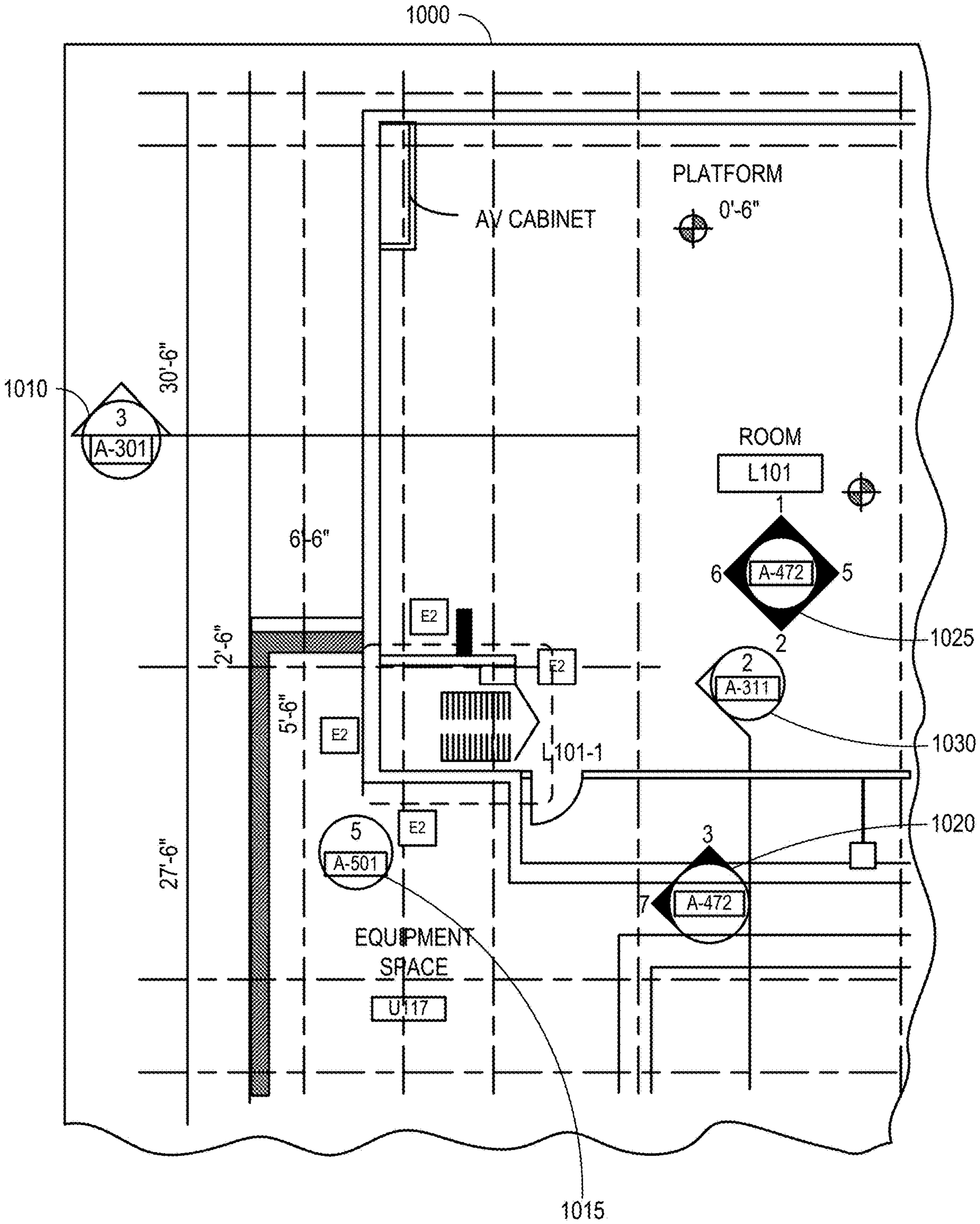
FIG. 10 illustrates an example of a portion of a construction page with multiple versions of anchor references.

FIG. 10 illustrates an example of a portion of a construction page 1000 with multiple versions of anchor references 1010, 1020, 1025, and 1030, and an anchor 1015. As illustrated, each of the anchor references refers to an anchor (identified by one or more anchor identifiers) on another page (identified by a reference sheet name).

Figure 11:
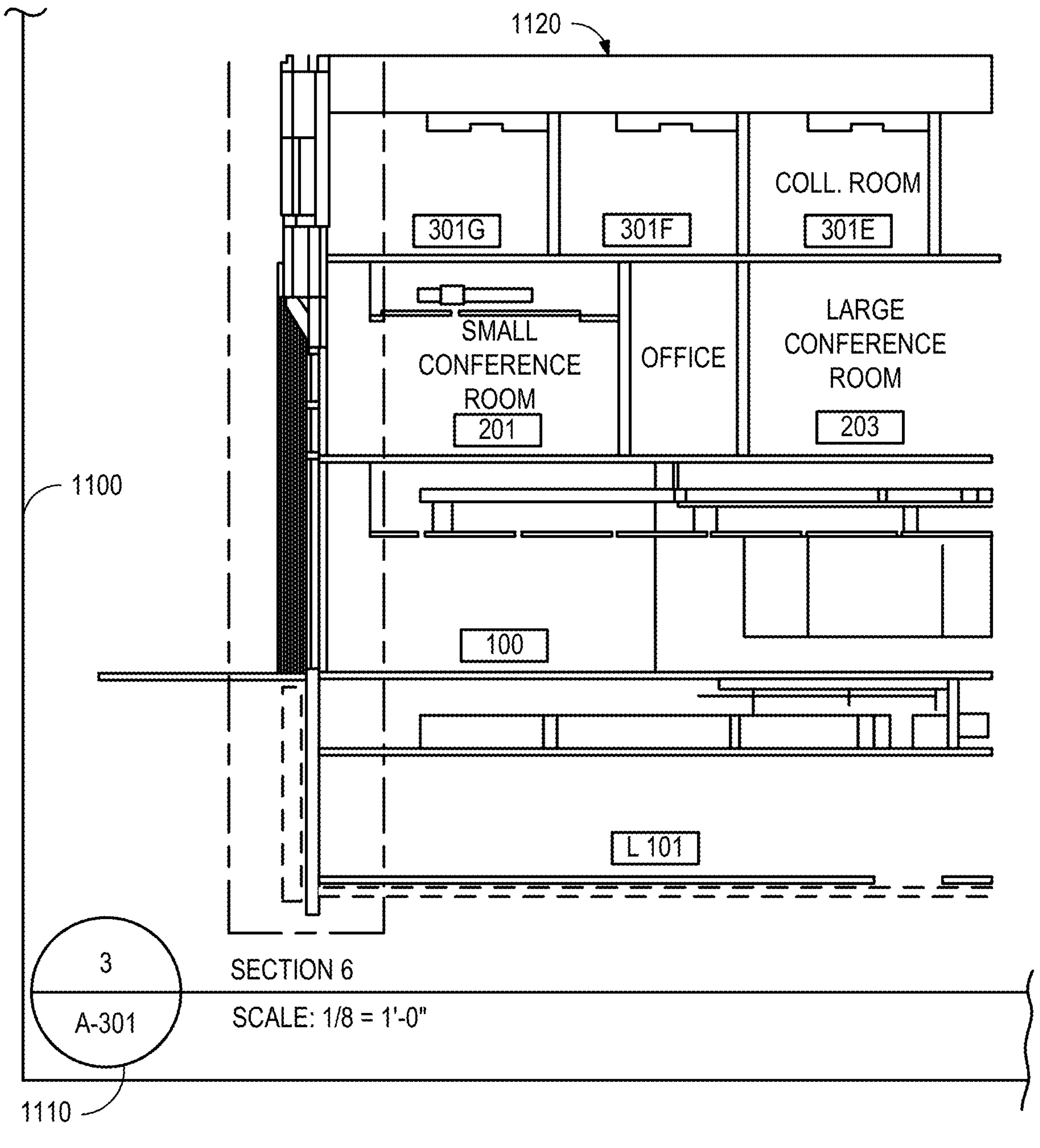
FIG. 11 illustrates an example of a portion of a construction page with an anchor.

FIG. 11 illustrates an example of a portion of a construction page 1100 with an anchor 1110 associated with an image 1120 that provides various details relating to a construction project. As previously described, the system may identify and index the anchor reference 1110 and distinguish it from other machine-encoded text, image-based text and/or image content. The various systems and methods described above may be used to identify and/or index any of the various notations described in any of the figures discussed herein.

Figure 12:
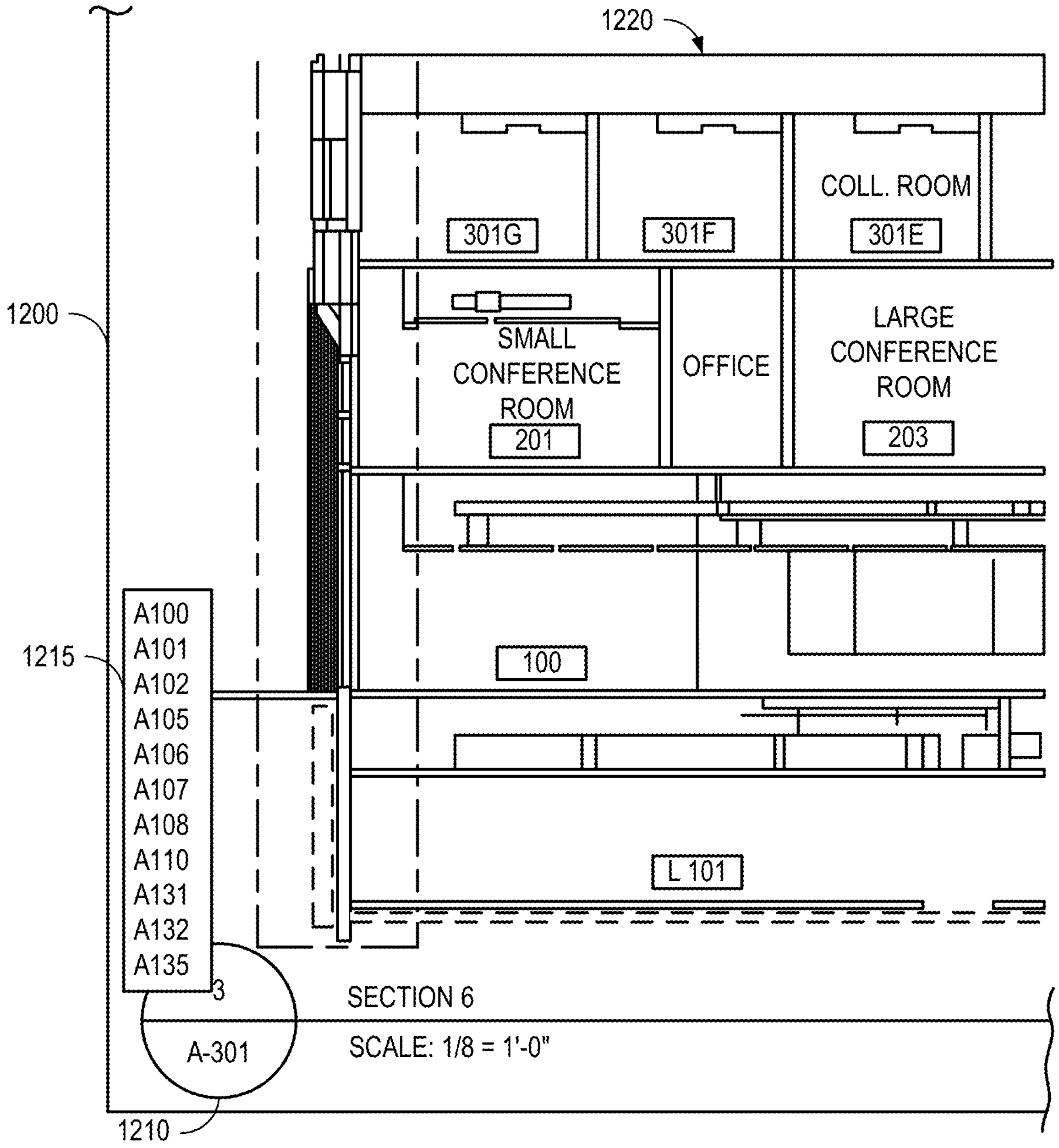
FIG. 12 illustrates an example of the portion of the construction page of FIG. 11 with a back link associated with the anchor being selectively displayed.

FIG. 12 illustrates an example of a portion of a construction page similar to the construction page illustrated in FIG. 11, but with a back link 1215 associated with the anchor 1210 being selectively displayed. The back link 1215 may provide a listing of primary sheet names that correspond to pages that have an anchor reference that refer to the anchor 1210. In some embodiments, each of the primary sheet names in the back link 1215 may be hyperlinks directed to the page corresponding to the respective primary sheet names. In some embodiments, the hyperlinks may automatically navigate a user to the hyperlinked page within a document having multiple pages. In other embodiments, the hyperlinks may automatically open a separate file that has the hyperlinked page.

Figure 13:
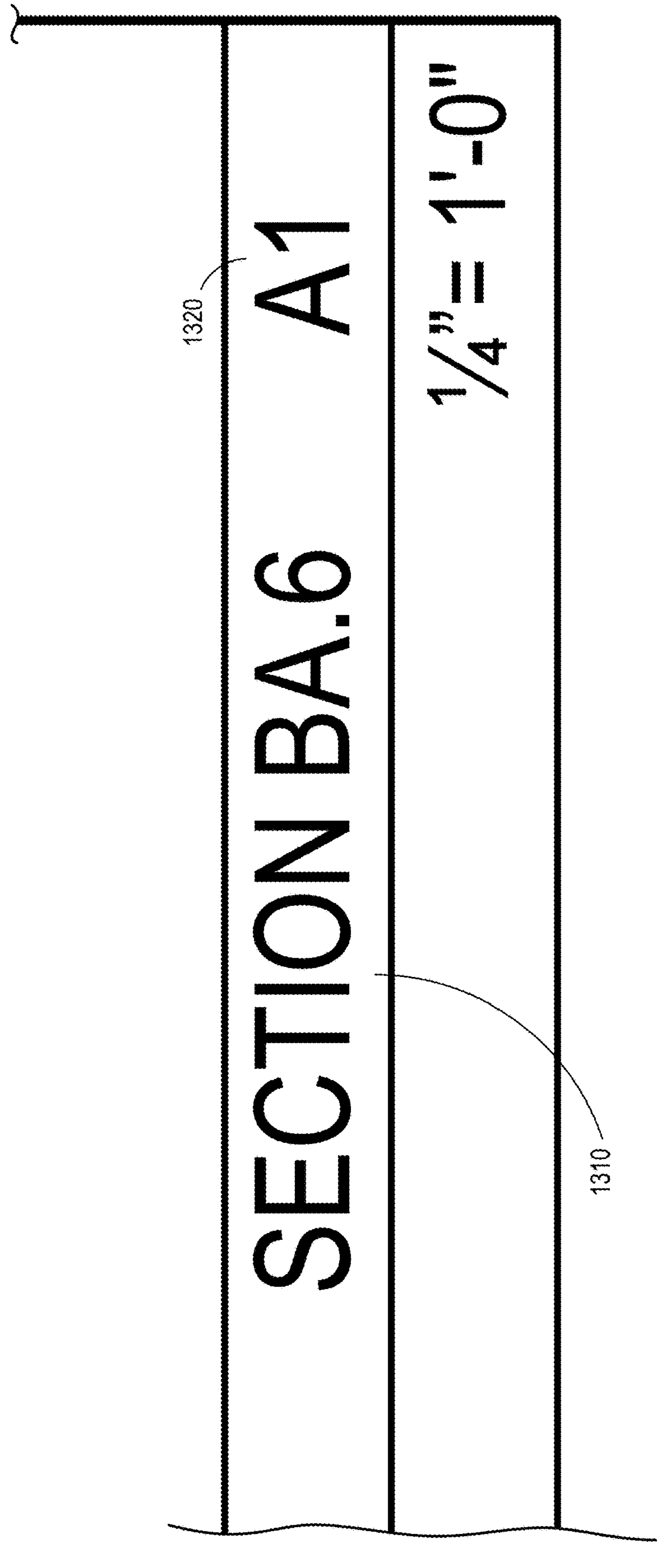
FIG. 13 illustrates a close-up view of an anchor and an anchor description.

FIG. 13 illustrates a close-up view of another embodiment of an anchor 1320 and an anchor description 1310. The illustrated anchor 1320 does not include a reference to the primary sheet name on which it is found. As described above, the system may be configured to identify and index anchors in various forms and styles using a regular expression or other processing and/or analyzing technique.

Figure 14:
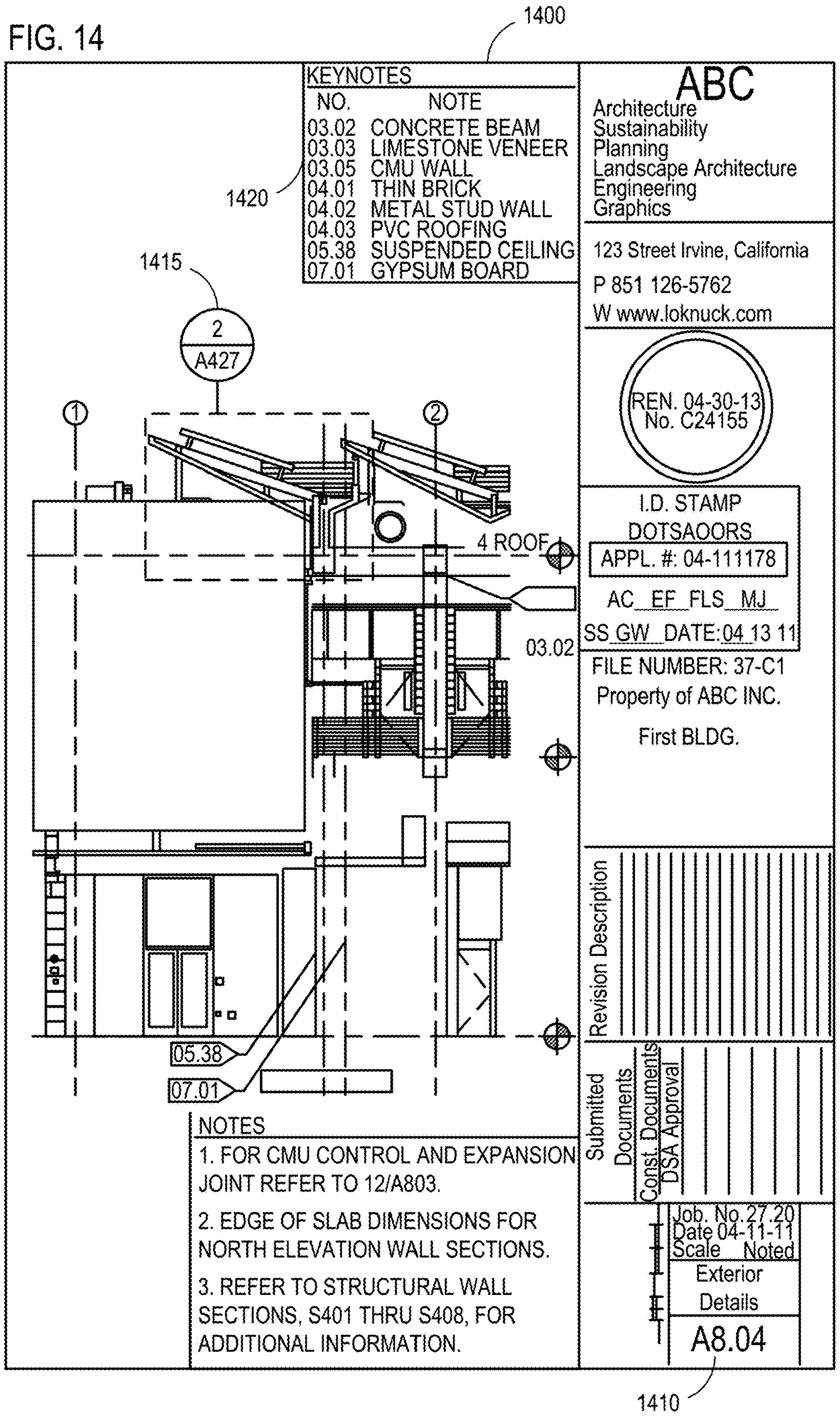
FIG. 14 illustrates a construction page with reference sheet names, an anchor reference, and a primary sheet name.

FIG. 14 illustrates a construction page 1400 with reference sheet names 1420 within a keynotes box, an anchor reference 1415, and a primary sheet name 1410. The system, using the various methods described herein, may be configured to identify each of the reference sheet names 1420, the primary sheet name 1410 of the page, and the anchor reference 1415. The anchor reference 1415 may refer to an anchor identifier (2) on a different page that is associated with a primary sheet name (A427). The index may associate the primary sheet name 1410 with the page 1400 and each reference sheet name 1420 with the primary sheet name for the page on which it is identified and/or the pages to which it refers.

Figure 15:
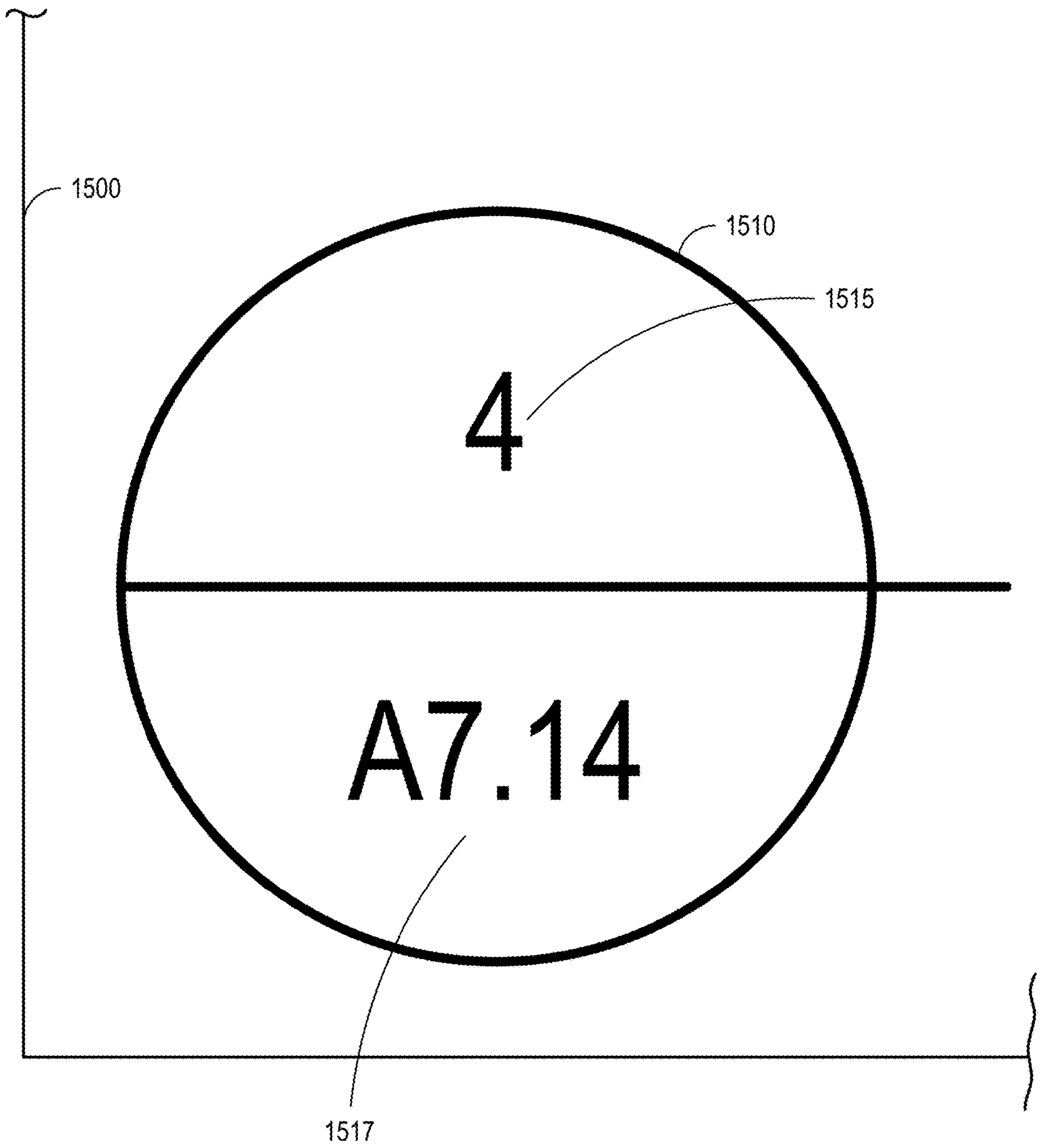
FIG. 15 illustrates a close-up view of one type of anchor, including an anchor identifier and a primary sheet name.

FIG. 15 illustrates a close-up view of one type of anchor 1510 on a page 1500. As illustrated, the anchor 1510 may include an anchor identifier 1515 (4) and a reference to the primary sheet name 1517 (A7.14) of the page 1500 on which the anchor 1510 is located.

Figure 16:
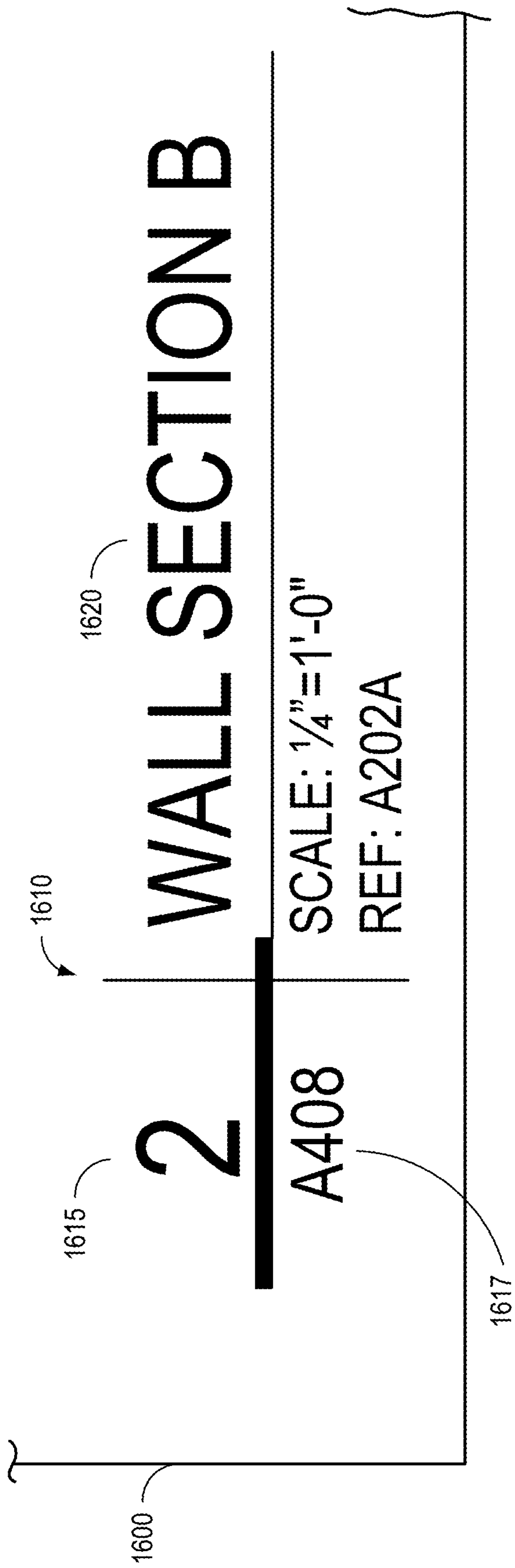
FIG. 16 illustrates a close-up view of an alternative type of anchor, including an anchor identifier and a primary sheet name.

FIG. 16 illustrates a close-up view of an alternative type of an anchor 1610 on a page 1600. As illustrated, the anchor 1610 may include an anchor identifier 1615 (2) and a reference to the primary sheet name 1617 (A408) of the page 1600 on which the anchor 1610 is located. The anchor 1610 may include an anchor description 1620 as well.

Figure 17:
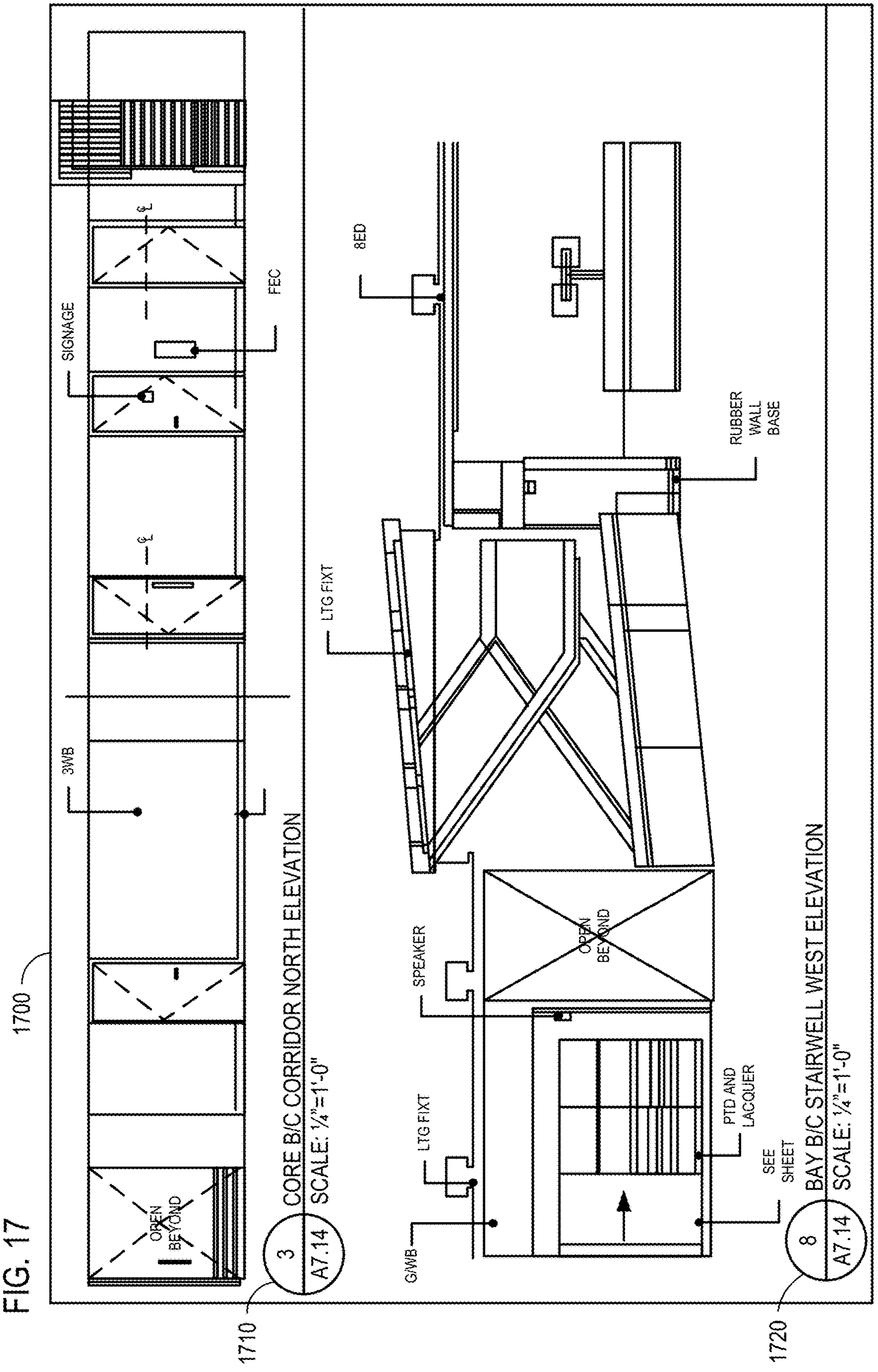
FIG. 17 illustrates an example of a construction page including two anchors and no primary sheet name.

FIG. 17 illustrates an example of a construction page 1700 including two anchors 1710 and 1720, and a blank primary sheet name. As in previous embodiments, each anchor 1710 and 1720 may refer to a non-text item useful for construction.

Figure 18:
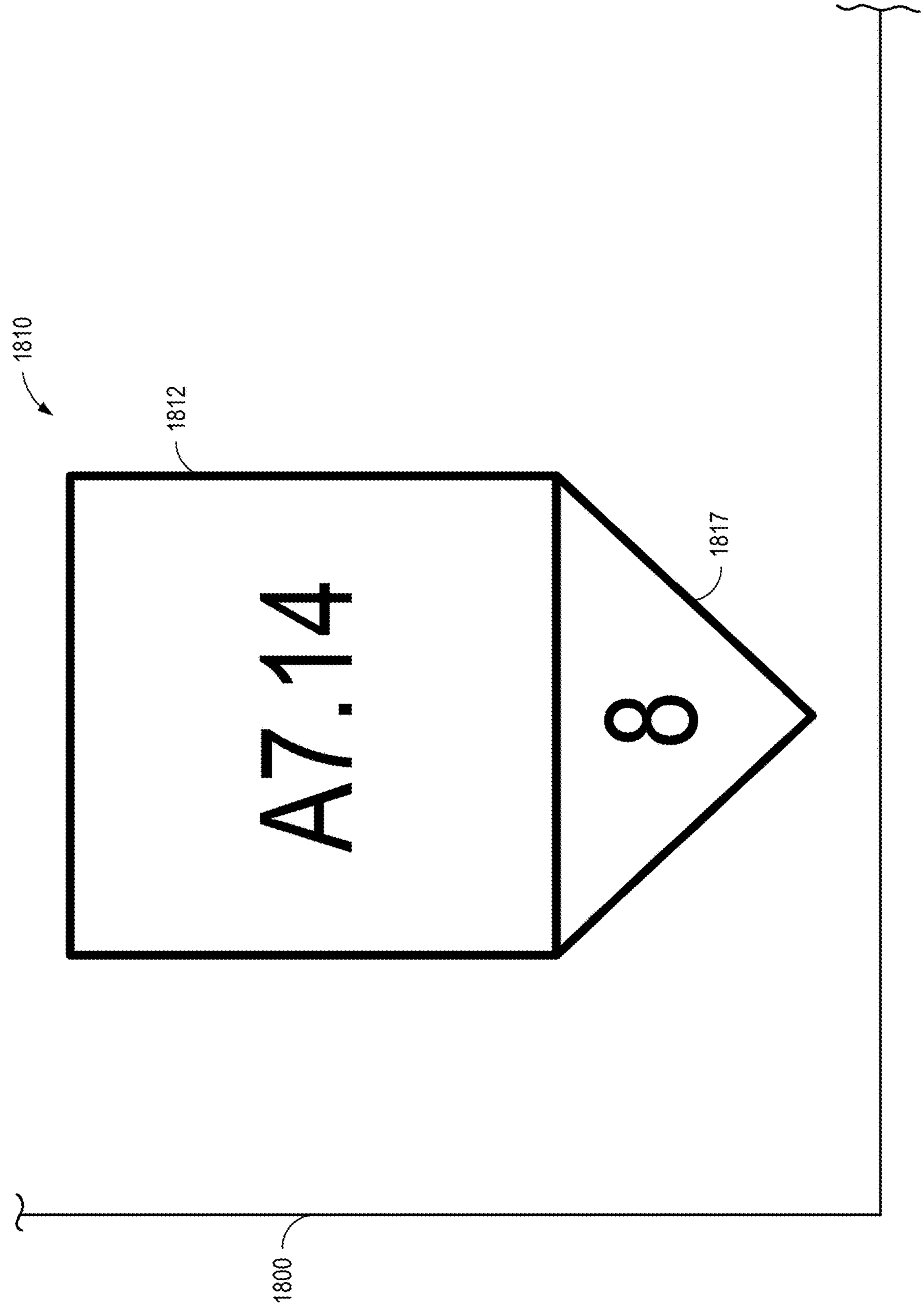
FIG. 18 illustrates an example of another type of anchor or anchor reference.

FIG. 18 illustrates an example of another type of anchor or anchor reference 1810 on a page 1800. As in previous embodiments, the anchor reference 1810 may include an anchor identifier 1817 (8) and a reference sheet name 1812 (A7.14). As may be appreciated by comparing the various styles of anchors and anchor references, complex regular expressions and/or other pattern matching algorithms may be used to identify and index each of the various types of notations within a plurality of pages.

Figure 19:
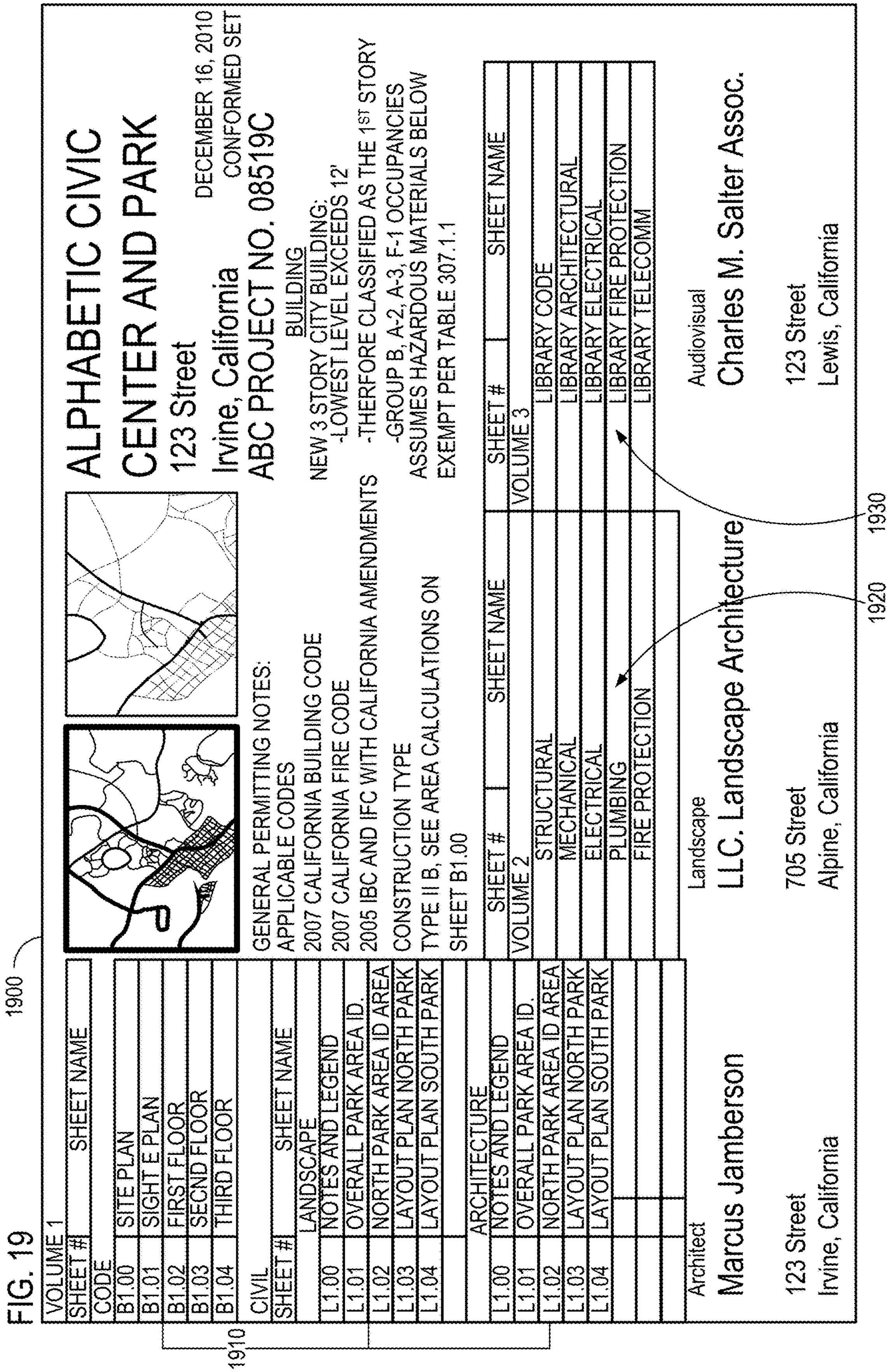
FIG. 19 illustrates a table of contents of a plurality of construction pages.

FIG. 19 illustrates a table of contents 1900 that includes references to a plurality of construction pages. The table of contents 1900 may have a blank primary sheet name. The table of contents 1900 may have any number of reference sheet names 1910, 1920, and 1930 arranged in various columns and/or rows. In some embodiments, the system may recognize and identify a table of contents 1900 based on characteristics associated with the columns and rows of reference sheet names 1910, 1920, and 1930. Each of the reference sheet names 1910, 1920, and 1930 may be hyperlinked to a corresponding page. According to various embodiments, the system may identify the table of contents 1900 using a whitelist of a file name associated with the page, using a page number of a document associated with the page, in response to a manual input, using a regular expression, and/or using a pattern recognizing software module.

Figure 20:
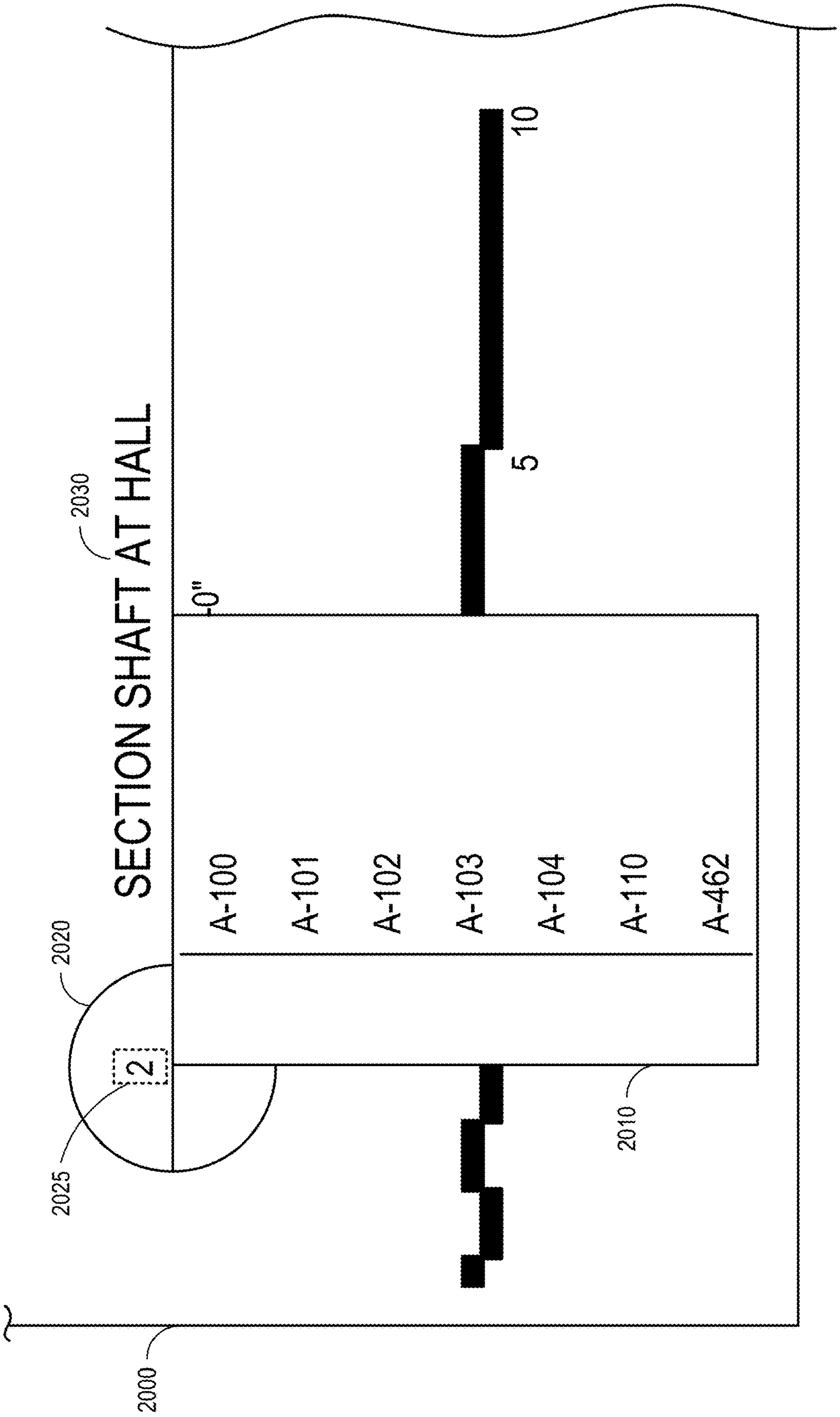
FIG. 20 illustrates a back link of an anchor showing all the primary sheet names that have an anchor reference referring to the anchor.

FIG. 20 illustrates another example of a back link 2010 of an anchor 2020 showing all the primary sheet names that have one or more anchor references that refer to the anchor 2020. According to various embodiments, each primary sheet name listed in the back link 2010 may be a hyperlink to a page corresponding to the primary sheet name. The back link 2010 may be selectively viewed by selecting the anchor 2020 in general, the anchor identifier 2025, and/or a primary sheet reference in the bottom half of the circle (not illustrated). As in previous embodiments, the anchor 2020 may be associated with an anchor description 2030 within the index. A system may index the notations in each of the pages in a plurality of pages, as described herein, and use the associations between the various notations to generate the back link 2010 illustrated on page 2000.

Figure 21A:
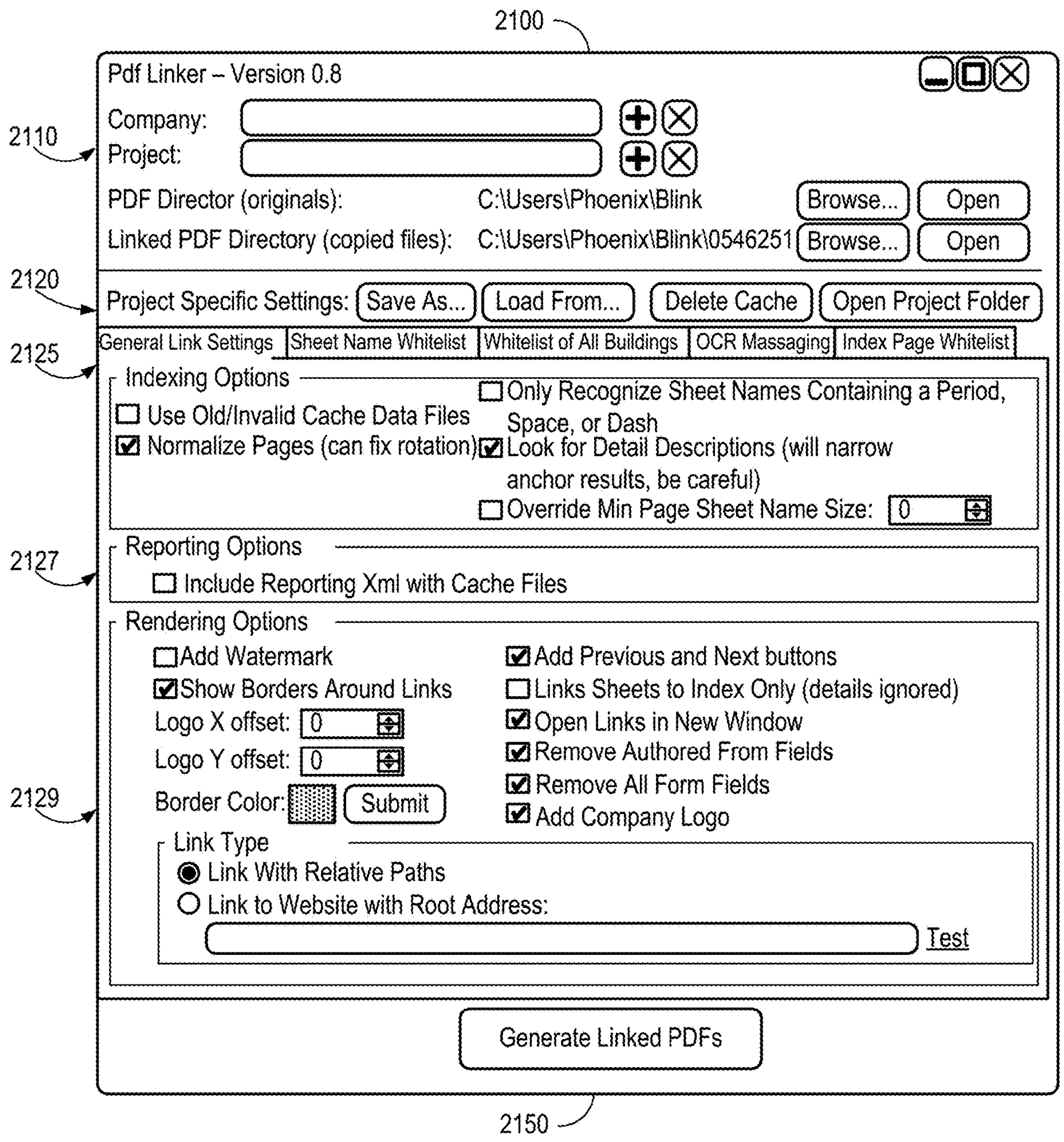
FIG. 21A illustrates an embodiment of a graphical user interface for indexing notations and/or internally linking notations within a plurality of pages.

FIG. 21A illustrates an embodiment of a graphical user interface 2100 for a system for indexing notations and/or internally linking notations within a plurality of pages. The system may be configured with one or more modules that may execute on a computing device (e.g., a general-purpose or special-purpose computer). The modules may interact with one or more hardware and/or firmware modules. The interface receives one or more documents containing one or more pages, at 2110. Various settings may be adjusted using a plurality of tabs 2120. FIG. 21A illustrates a general link tab 2125 that allows for various options, such as rotation settings, cache settings, and/or specific requirements for identifying sheet names, anchors, and/or anchor references. The interface may also include various reporting and/or output options 2127.

In some embodiments, the system may generate an index of pages, primary sheet names, reference sheet names, anchors, and/or anchor references. The index generated by the system may include one or more associations between each of the notations and/or pages. The system may also include various rendering options 2129 for generating linked pages (e.g., hyperlinked PDF pages/documents). As illustrated, the rendering options 2129 may include, for example, previous-page and next-page hyperlinks on one or more of the pages. The previous-page and next-page hyperlinks may be directed to previous and next pages, respectively, according to an order of pages listed on a table of contents page (also known as an index page or index sheet). The system may be executed by selecting the "Generate Linked PDFs" button 2150. In various embodiments, other file types besides PDFs are possible and a user may select a desired output file type.

Figure 21B:
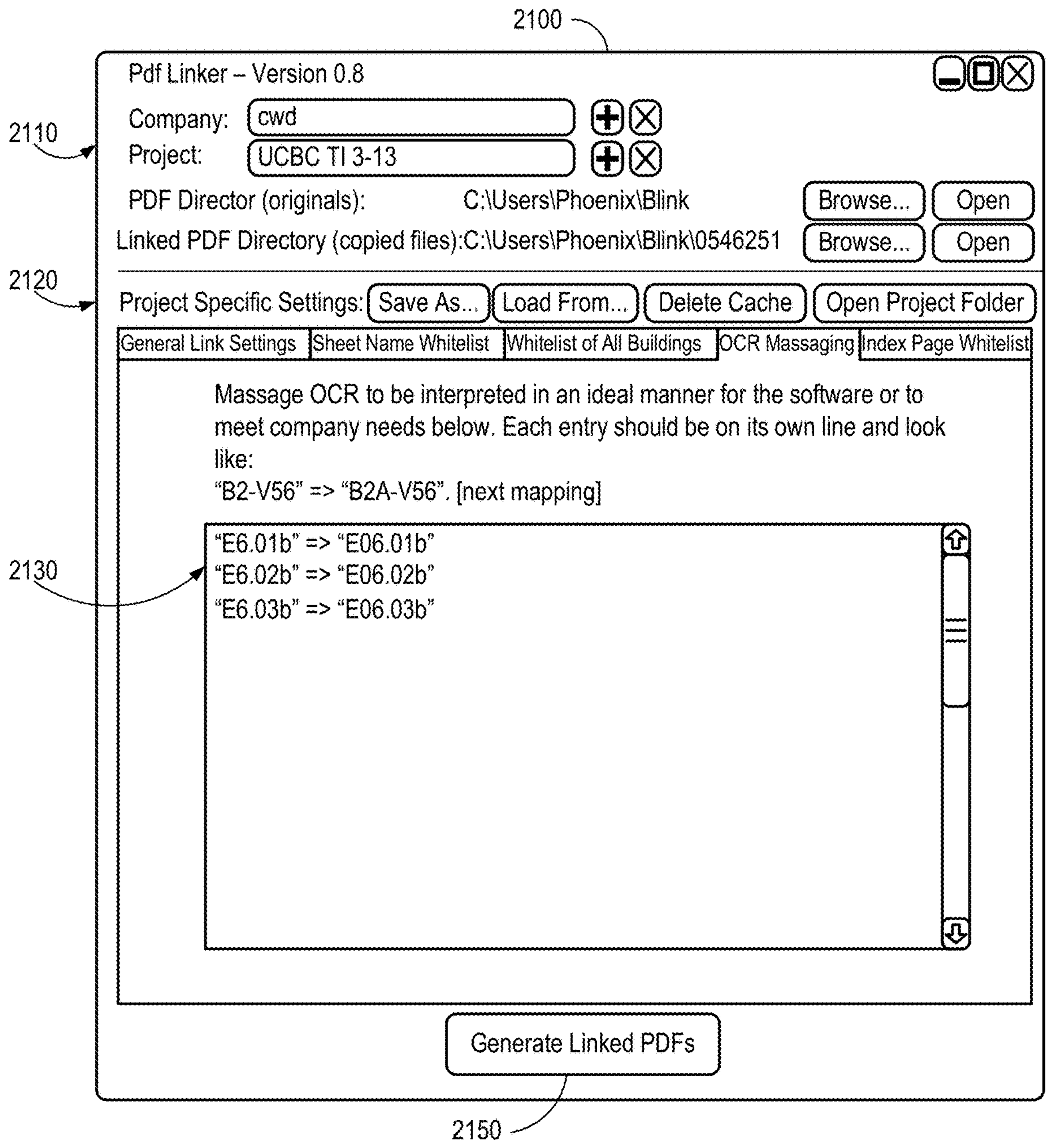
FIG. 21B illustrates an OCR massaging tab of the embodiment of the graphical user interface of FIG. 21A.

FIG. 21B illustrates an OCR massaging tab 2130 of the embodiment of the graphical user interface 2100 of FIG. 21A. The OCR massaging tab 2130 may include a mapping of text (a letter, symbol, word, phrase, etc.) with corrected versions. For example, if a portion (e.g., a letter, symbol, word, or phrase) of the machine-encoded text is matched with an element in the listed mapping, that portion of the machine-encoded text may be replaced.

As illustrated, for example, any text matching "E6.01b" would be replaced with "E06.01b." The OCR massaging tab 2130 may allow for various common errors or anomalous errors to be automatically corrected throughout a plurality of documents during the identification and indexing of the notations. The OCR massaging tab 2130 may also allow for changes to be made to various portions of the text, even if they are not erroneous. For example, the primary sheet names of a set of documents may be revised automatically using the OCR massaging tab 2130.

Figure 21C:
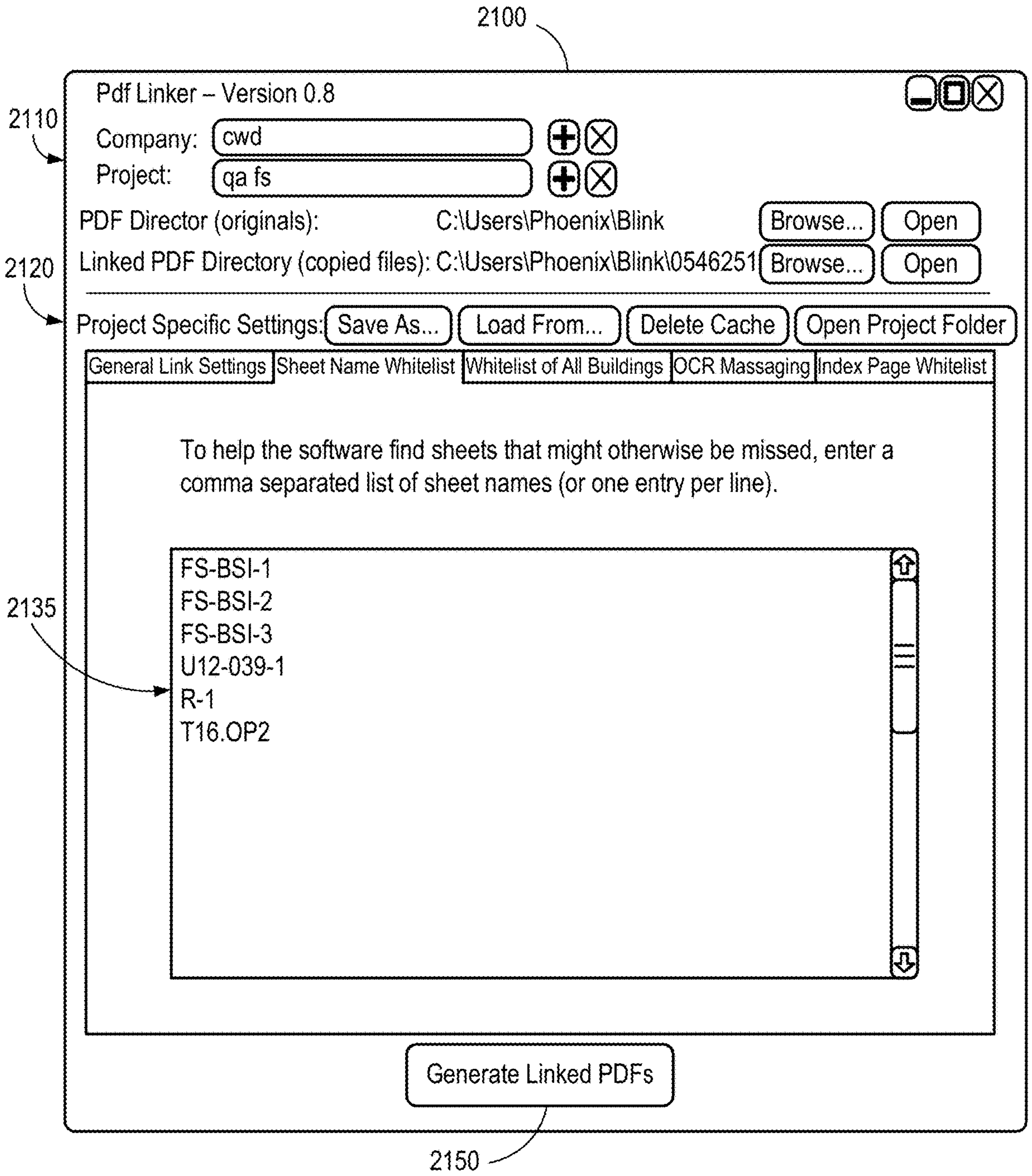
FIG. 21C illustrates a sheet name whitelist tab of the embodiment of the graphical user interface of FIG. 21A.

FIG. 21C illustrates a sheet name whitelist tab 2135 of the embodiment of the graphical user interface 2100 of FIG. 21A. The sheet name whitelist tab 2135 may include a list of primary and/or reference sheet names that the system should automatically identify and index as primary and/or sheet names, respectively, even if a regular expression or other pattern recognizing software module does not identify them as sheet names.

Figure 21D:
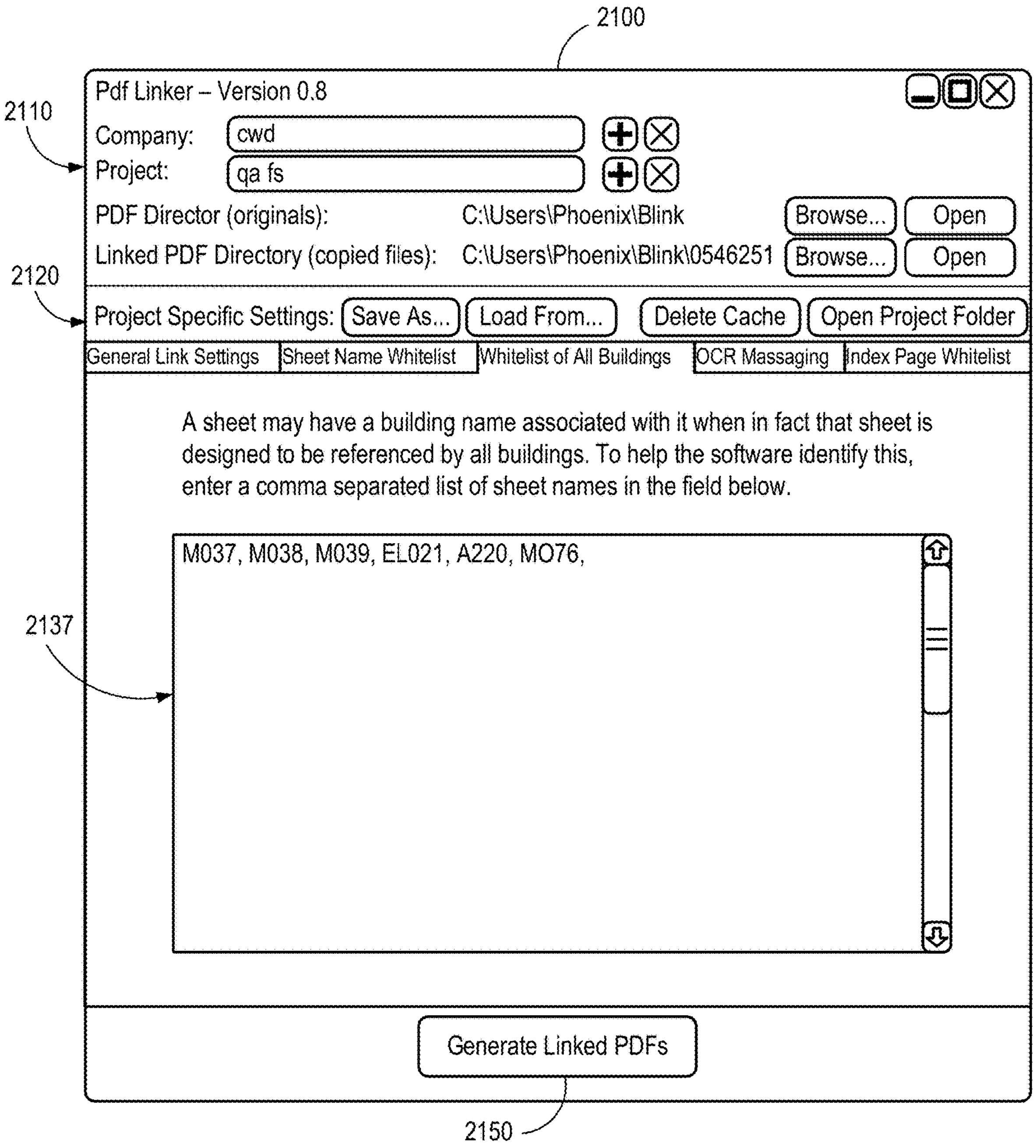
FIG. 21D illustrates a building name whitelist tab of the embodiment of the graphical user interface of FIG. 21A.

Similarly, FIG. 21D illustrates a building name whitelist tab 2137 of the embodiment of the graphical user interface 2100 of FIG. 21A. The building name whitelist tab 2137 may include a list of building names that the system should automatically identify and index as building names, even if a regular expression or other pattern recognizing software module does not identify those portions of machine-encoded text as building names.

Figure 21E:
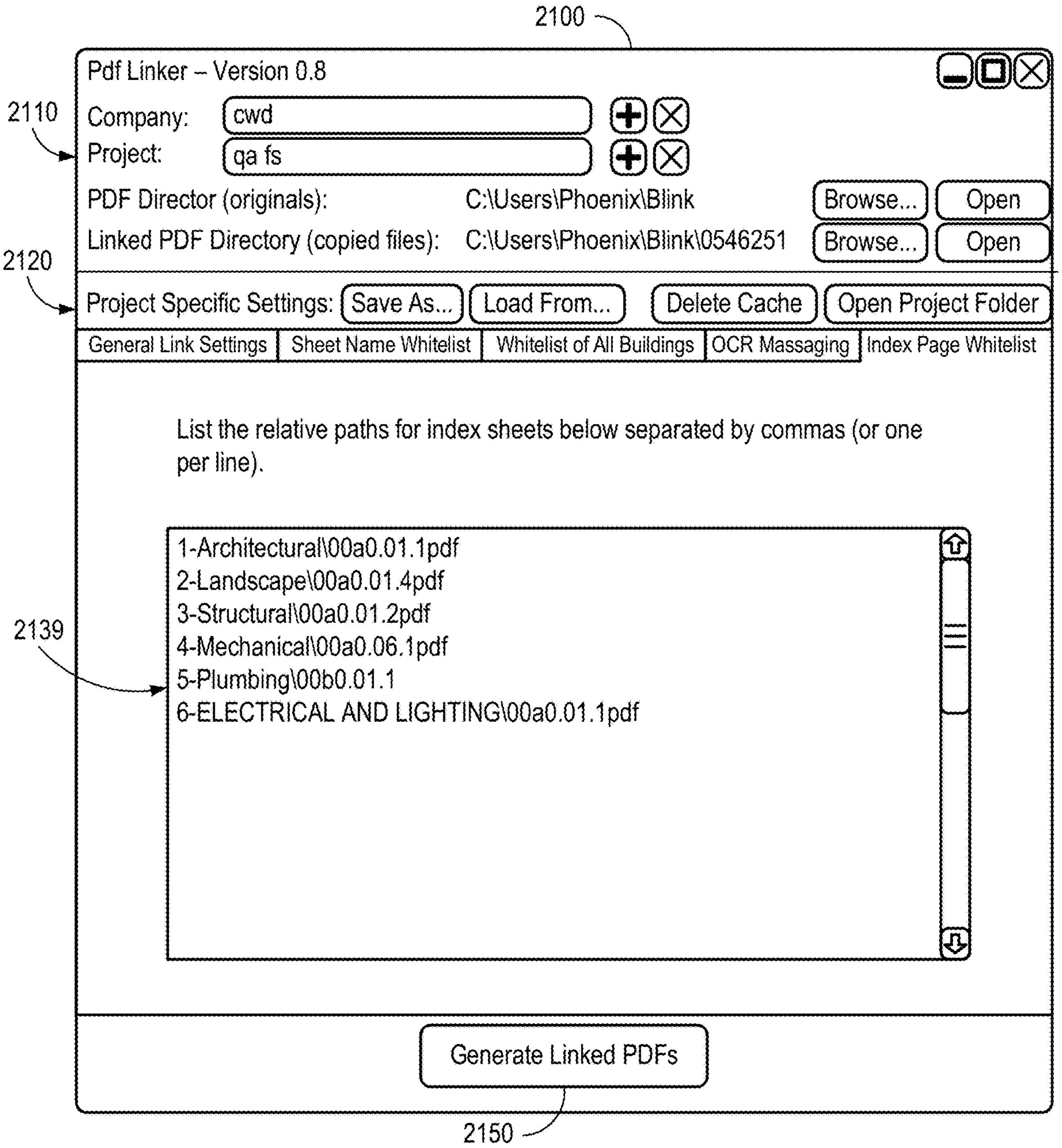
FIG. 21E illustrates an index sheet (table of contents) page whitelist tab of the embodiment of the graphical user interface of FIG. 21A.

FIG. 21E illustrates a table of contents page whitelist tab 2139 of the embodiment of the graphical user interface 2100 of FIG. 21A. The table of contents page whitelist tab 2139 may include a list of table of contents pages that the system should automatically identify and index as table of contents pages, even if a regular expression or other pattern recognizing software module does not identify the pages as table of contents pages. The table of contents pages may or may not include primary sheet names. In various embodiments, the index pages or index sheets may be assigned a blank or hidden primary sheet name.

In some embodiments, the system may identify a primary sheet name for each page of a plurality of pages. However, the primary sheet name associated with one or more index pages of the plurality of pages may not be originally part of the pages received by the system. Rather, the system may distinguish between index pages (and possibly other pages without primary sheet names) by assigning (or using existing) unique identification information for indexing purposes. Thus, while many pages of a plurality of pages may include an explicit primary sheet name, index pages may or may not include a primary sheet name and may instead include a blank primary sheet name and/or be otherwise uniquely identified within the index, which unique identification is referred to herein as a primary sheet name for simplicity.

Figure 22A:
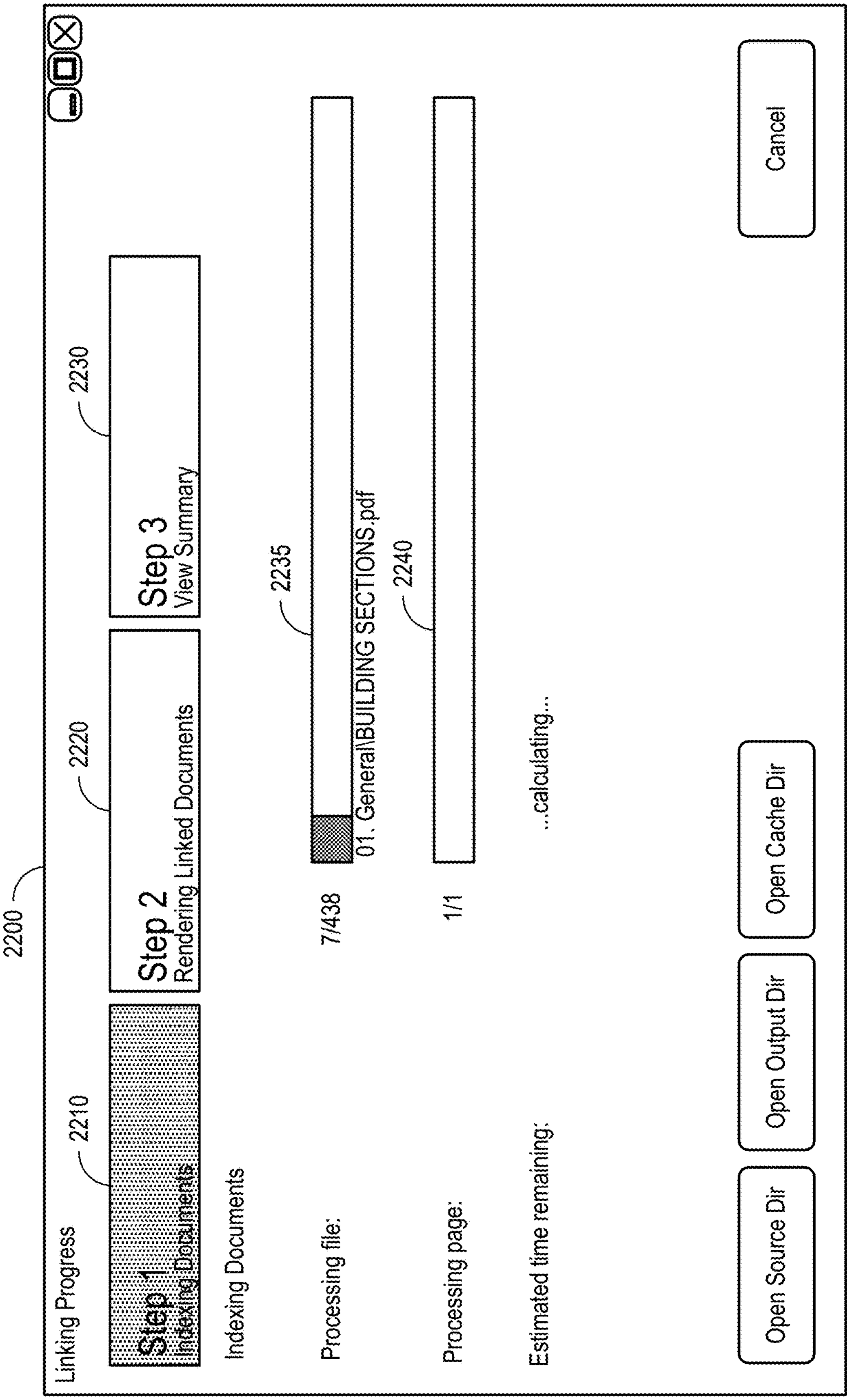
FIG. 22A illustrates a graphical user interface of a system while indexing documents.

FIG. 22A illustrates a graphical user interface 2200 of a graphical user interface while indexing documents. As illustrated, one or more progressing 2235 and/or status 2240 bars may indicate a current progress of an identifying and/or indexing process. According to various embodiments, the graphical user interface 2200 may include various steps, including an indexing step 2210, a rendering step 2220, and a summary display 2230.

Figure 22B:
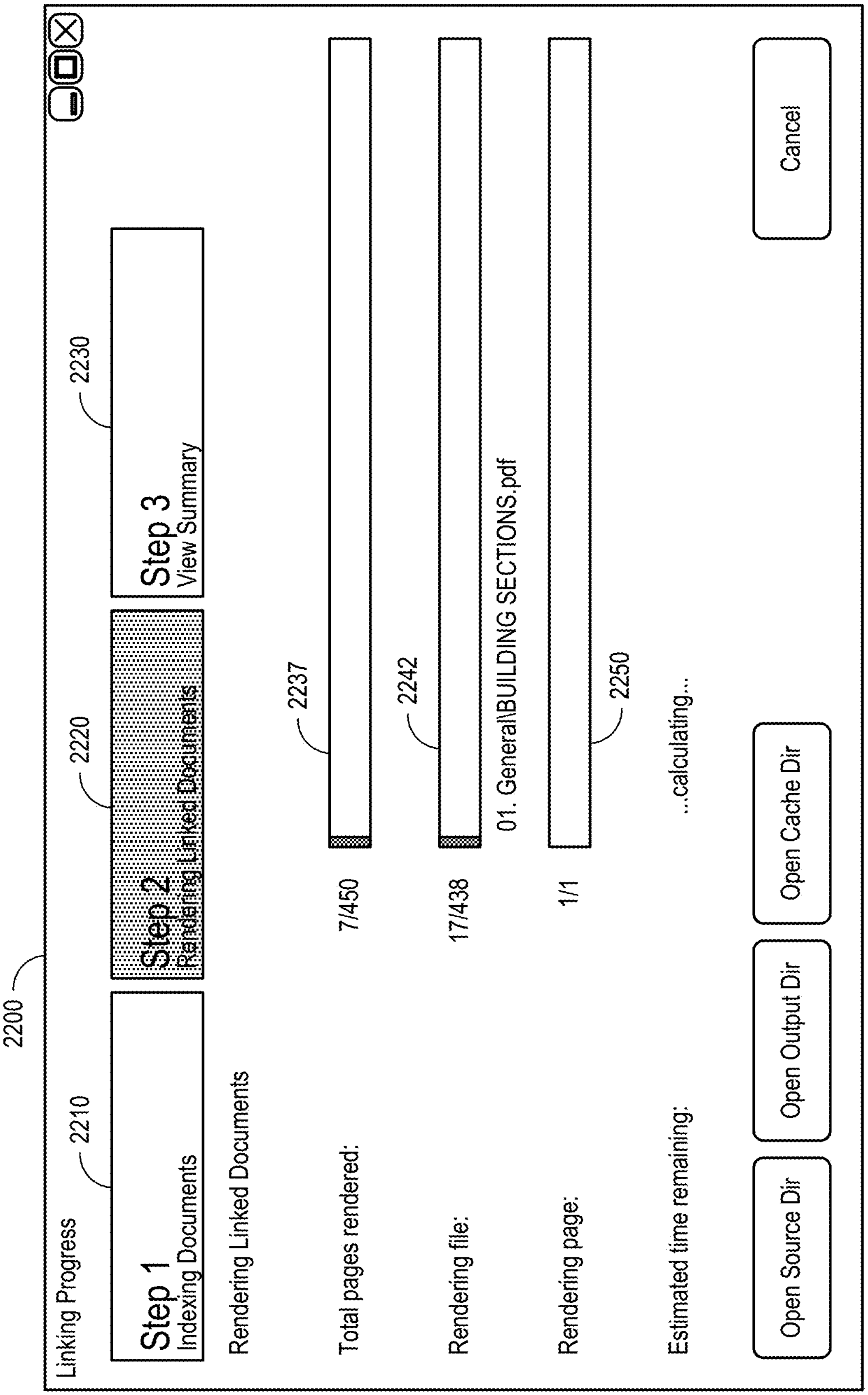
FIG. 22B illustrates a graphical user interface of a system while rendering linked documents.

FIG. 22B illustrates the graphical user interface 2200 of the graphical user interface while rendering linked documents, at 2220. Various status and progress bars 2237, 2242, and 2250 may provide information to a user who is waiting for the system to generate linked pages using the index generated during the step illustrated in FIG. 22A. In some embodiments, the linked pages generated by the system correspond exactly to the original pages received by the system, except that the notations, including the primary sheet names, reference sheet names, anchors, and/or anchor references, may be hyperlinks to the pages and/or notations to which they refer. Additionally, next-page and previous-page links and/or back link information may be generated for each page as well.

In other embodiments, each of the linked pages generated by the graphical user interface may be saved as a unique file, even if the pages originally received by the system were provided in one or more documents with multiple pages. In addition, the unique files for each of the linked pages may be saved with a file name corresponding to a primary sheet name and/or building name. Moreover, the files for each of the linked pages may be organized within a database in an order corresponding to an order on an index or table of contents page.

Figure 22C:
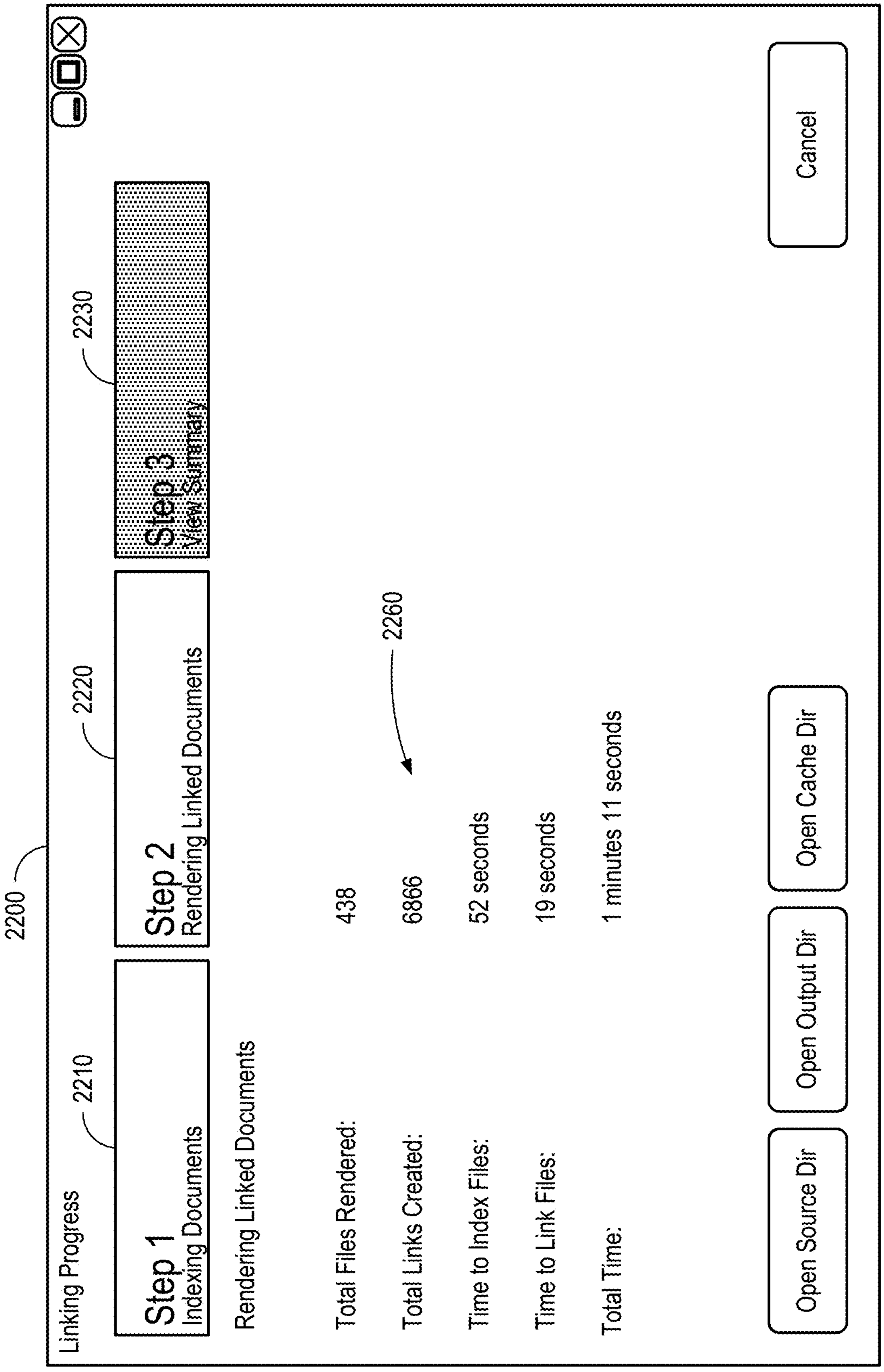
FIG. 22C illustrates a report on the statistics of the indexed and rendered documents.

FIG. 22C illustrates a report 2260 on the statistics of the indexed and rendered documents in the summary display 2230. The report may include statistical information, such as the number of files created and the number of links generated.

Figure 23:
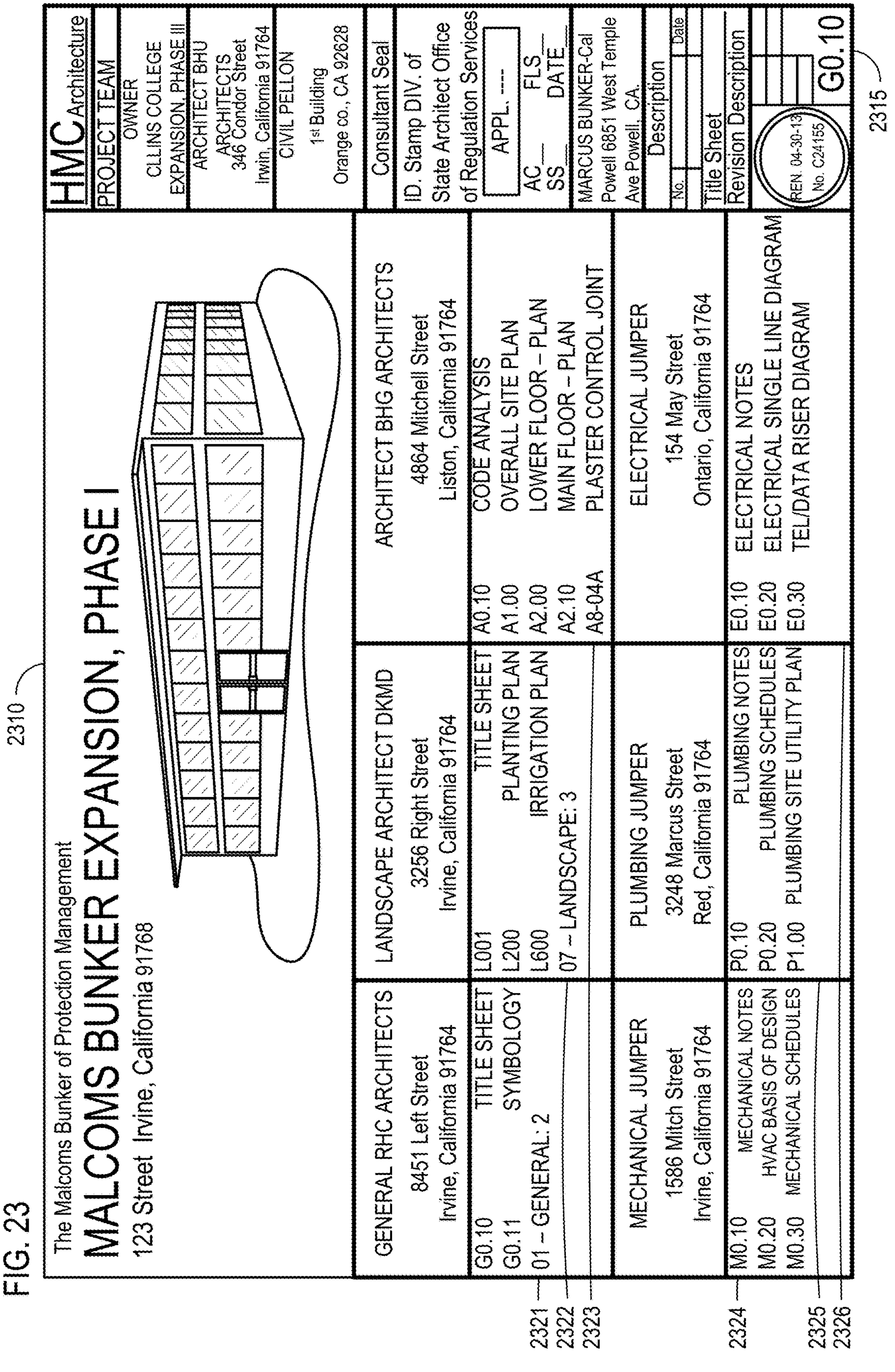
FIG. 23 illustrates another example of a table of contents page for a plurality of construction pages.

FIG. 23 illustrates another example of a table of contents page 2310 for a plurality of construction pages. As illustrated the table of contents page 2310 lists the primary sheet names of at least some of a plurality of pages as reference sheet names 2321-2326 on the table of contents page 2310. In the illustrated embodiment, the table of contents page 2310 includes a primary reference sheet 2315. According to various embodiments, a system may analyze the table of contents page 2310 and identify and index notations, such as the reference sheet names 2321-2326, and distinguish them from other machine-encoded text, descriptions, image-based text, stray lines, images, and/or other content on the table of contents page 2310.

The system may generate a corresponding linked page that appears similar or identical to the originally received table of contents page 2310. The linked page may include hyperlinks associated with each of the reference sheet names 2321-2326. Selecting a hyperlink associated with one of the reference sheet names 2321-2326 may direct a user to the page corresponding to the primary sheet name referenced by the reference sheet name 2321-2326. For example, selecting the reference sheet name (A8-04A) may automatically navigate the user to and/or open a page 2400 illustrated in FIG. 24.

Figure 24:
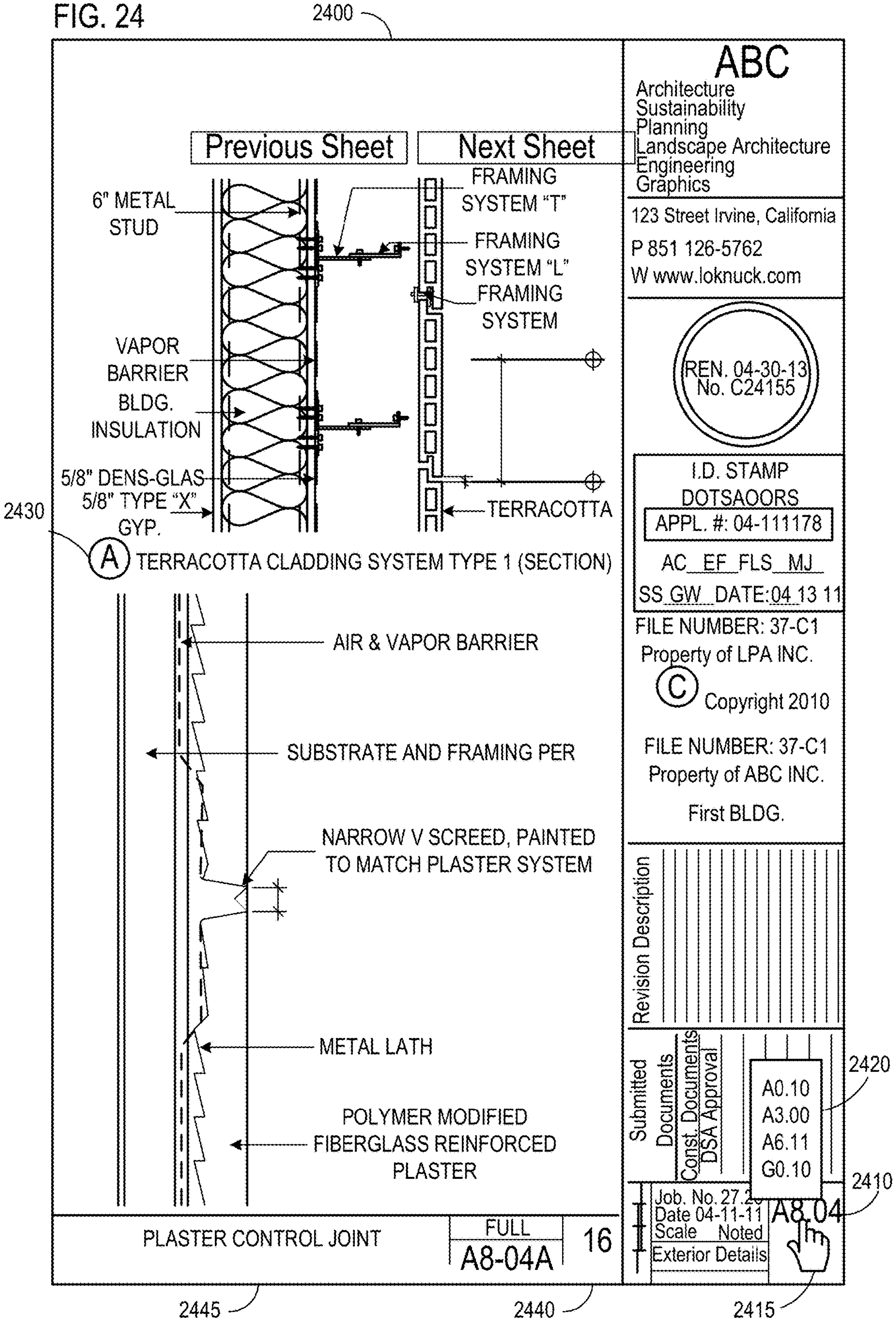
FIG. 24 illustrates one of the pages referred to by the table of contents page of FIG. 23.

FIG. 24 illustrates the page 2400 with a primary sheet name 2410 (A8-04A). The page 2400 may include one or more anchors and/or anchor references 2430 and 2440. The anchor 2440 may be associated with an anchor description 2445. In the illustrated embodiment, back link information 2420 associated with the primary sheet name is selectively displayed at 2415, such as when moused over, clicked on with a pointing device, and/or touched on a touch screen device. The back link information 2420 may include a listing of anchors, anchor references, and/or other pages that reference the primary sheet name 2410.

Figure 25:
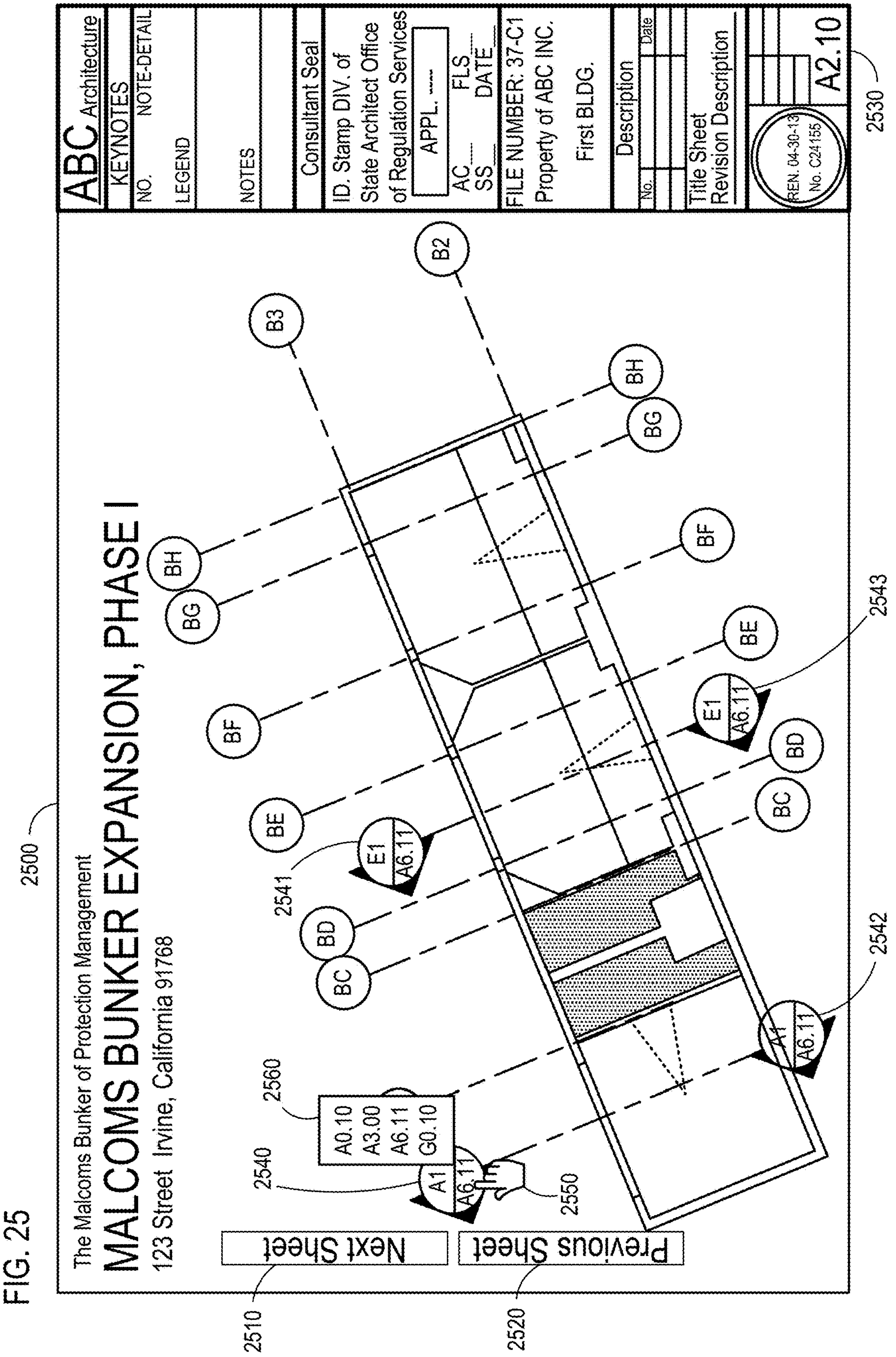
FIG. 25 illustrates another one of the pages referred to by the table of contents page of FIG. 23.

FIG. 25 illustrates a linked page 2500 that is referred to by the table of contents page 2300 of FIG. 23. As illustrated, the linked page 2500 includes a primary sheet name 2530 (A2.10). The page 2500 includes various anchor references 2540-2543. Each anchor reference refers to an anchor by including an anchor identifier and the primary sheet name of the sheet on which the associated anchor is found. In some embodiments, by selecting an anchor reference at 2550, back link information 2560 showing which other pages have a similar or identical reference anchor is displayed.

Additionally, the linked page 2500 may include next-sheet and previous-sheet hyperlinks 2510, 2520 that will navigate a user and/or open the appropriate files according to the order illustrated in the table of contents page 2300 of FIG. 23. Thus, using page 2500 as an example, selecting the previous-sheet hyperlink 2520 would navigate the user to and/or open a file that has a page associated with the primary sheet name A2.00. Similarly, selecting the next-sheet hyperlink 2510 would navigate the user to and/or open a file that has a page associated with the primary sheet name A8-04A (i.e., page 2400 of FIG. 24).

Each of the anchor references 2540-2543 may include an anchor identifier and a reference sheet name. Each anchor reference 2540-2543 may comprise one or more hyperlinks associated with at least the page that has the primary sheet name referenced by the reference sheet name of each of the anchor references. Similarly, the anchor identifier may be a hyperlink that directs a user directly to a zoomed-in view of the anchor on the page associated with the primary sheet name referenced by the reference sheet name. In the illustrated embodiment, each of the anchor references 2540-2543 refers to an anchor (either A1 or E1) on the page associated with the primary sheet name A6.11.

Figure 26:
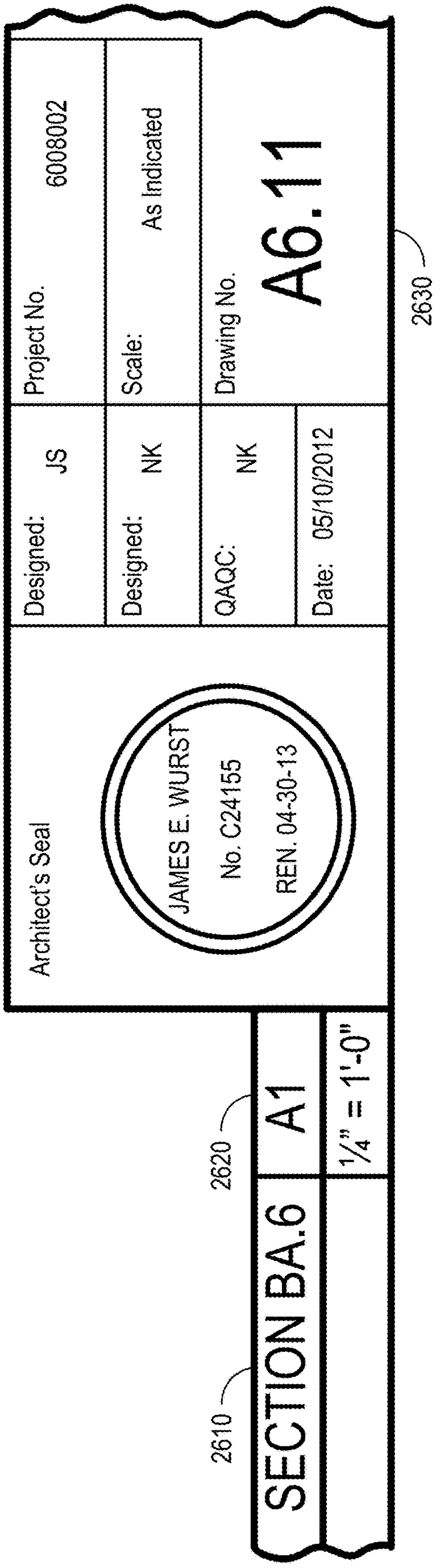
FIG. 26 illustrates a close-up view of an anchor and a primary sheet name of one of the pages referred to by the table of contents page of FIG. 23.

FIG. 26 illustrates a close-up view of an anchor 2620 (A1) on the page associated with a primary sheet name 2630 (A6.11). The anchor 2620 may be a section anchor, as described in the anchor description 2610.

Figure 27:
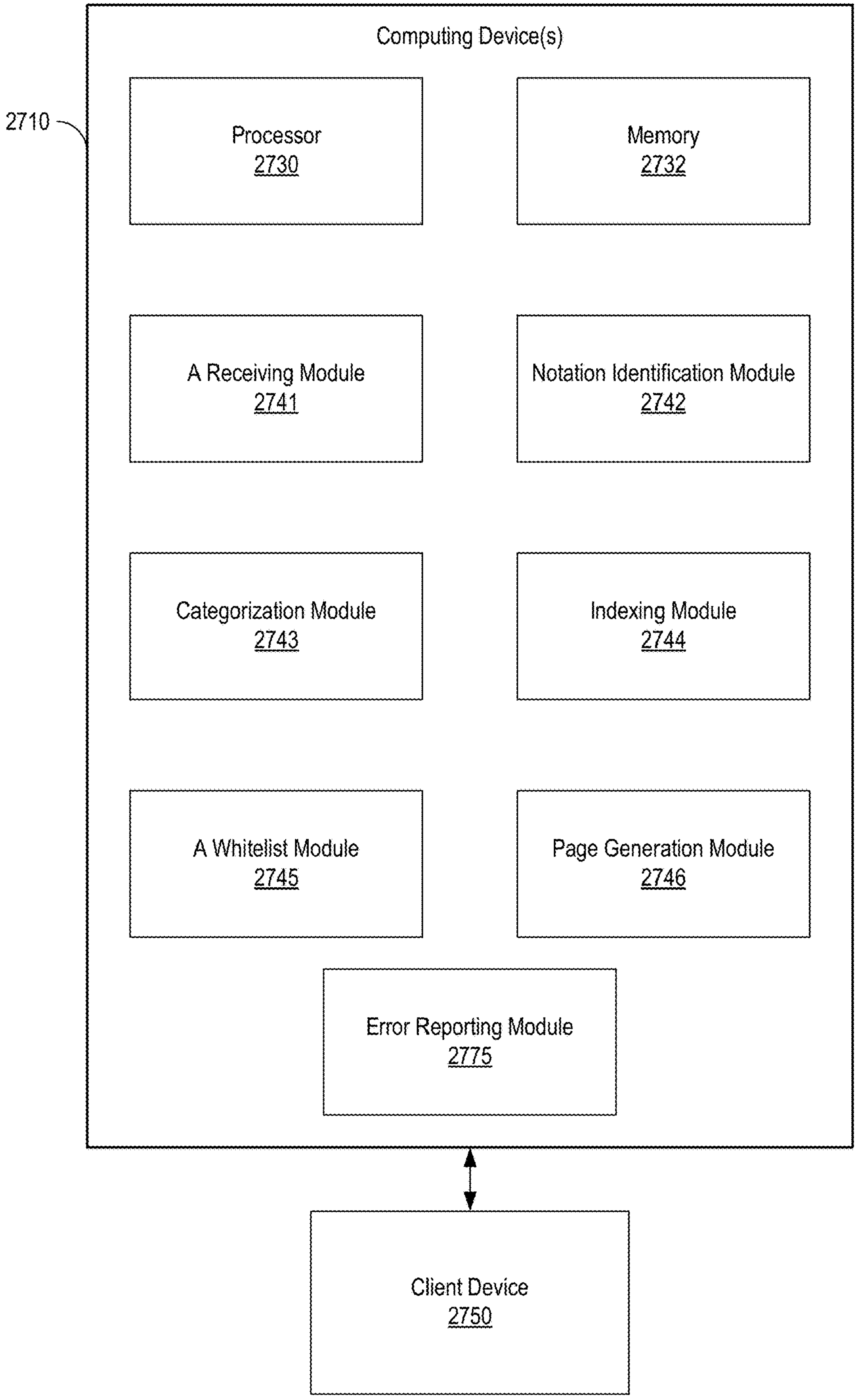
FIG. 27 illustrates a system for indexing and linking electronic documents, according to one embodiment.

FIG. 27 illustrates a system 2710 for indexing and/or generating linked pages, as described herein. As previously described, each of the various modules may be implemented in software, hardware, firmware, and/or a combination thereof. Moreover, the computing device 2710 may comprise any number of disparate computing devices.

As illustrated, the computing system 2710 may include a processor 2730 and/or a memory 2732 for interfacing with each of the various modules 2741-2746. The computing device 2710 may include a receiving module 2741 configured to receive one or more digital pages. The computing device 2710 may include a notation identification module 2742 configured to identify any of the various notations described herein, including sheet names, anchors, and anchor references. The computing device 2710 may include a categorization module 2743 configured to categorize each of the identified sheet name notations as either primary sheet name notations or reference sheet name notations. The computing device 2710 may include an indexing module 2744 configured to generate an index that associates various identified notations with one another. For example, an indexing module may generate an index that associates a primary sheet name notation with each of the plurality of digital pages, associates each reference sheet name notation with the primary sheet name notation on which it is identified, associates each anchor notation with a primary sheet name notation, and/or associates each anchor reference notation with the anchor notation and primary sheet notation to which it refers.

The computing device 2710 may include a whitelist module 2745 configured to identify one or more of the various notations described herein by comparing at least a portion of the machine-encoded text with one or more of a whitelist of primary sheet names, a whitelist of reference sheet names, a whitelist of anchors, and/or a whitelist of anchor references. The computing device 2710 may include a page generation module 2746 configured to generate a plurality of linked pages using the indexed notations, as described herein. In some embodiments, a user may interact directly with the computing device 2710. In other embodiments, the computing device(s) 2710 may be accessed remotely. For example, a client device 2750 may interact with the computing device(s) 2710. An error reporting module 2775 may generate reports that provide information about missing links, links for which referenced sheets do not exist, and/or other errors or potential errors as described herein.

Figure 28A:
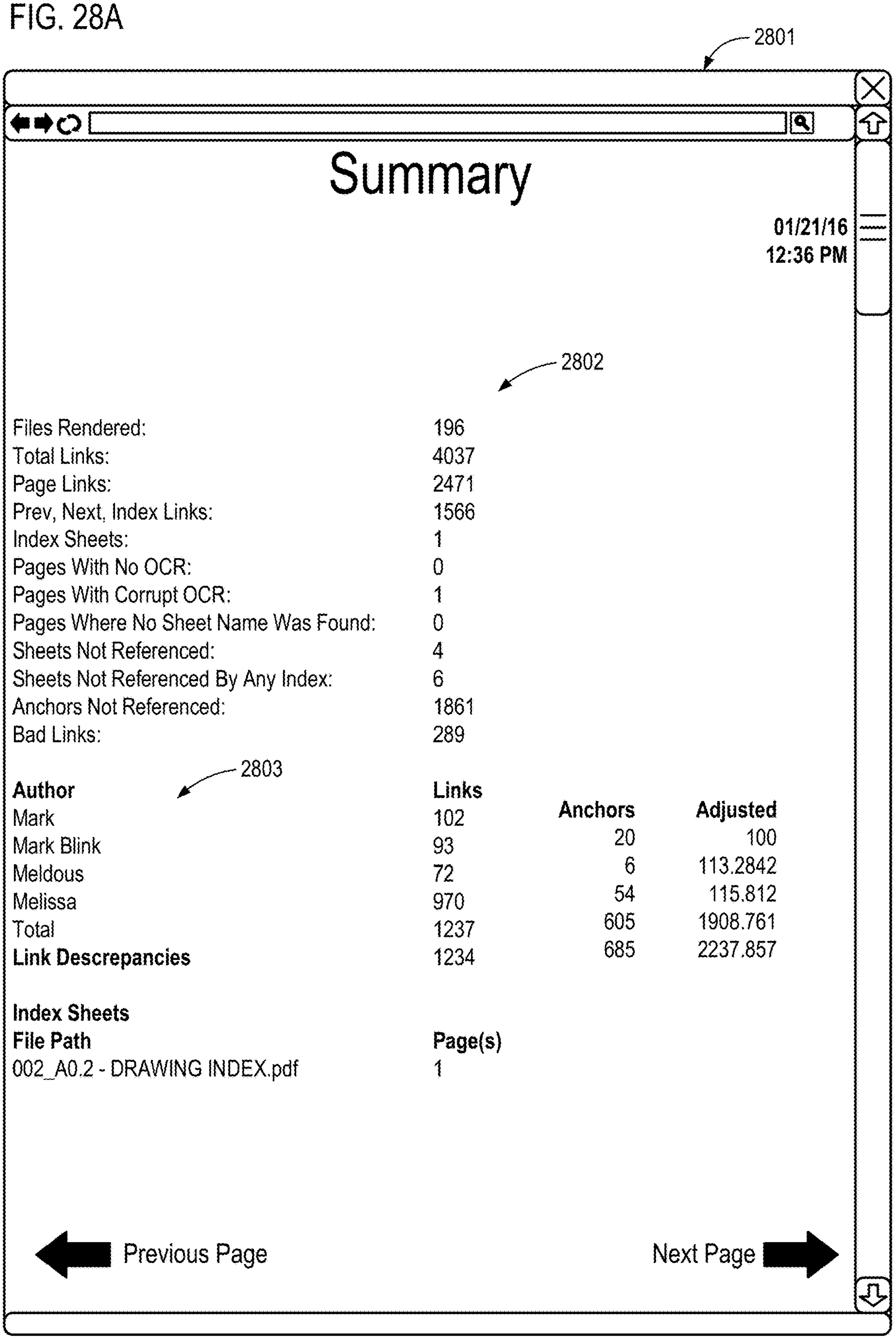
FIG. 28A illustrates a report summary from an error identification module that includes potential errors, mistakes, missing documents, and/or other information.

FIG. 28A illustrates a report summary 2801 from an error identification module that includes potential errors, mistakes, missing documents, and/or other information. As illustrated the error identification module may provide a summary 2802 of the number of: files rendered, links, page links, prev/next/index links, index sheets found, pages that do not include OCR text, corrupt pages, pages without sheet names, unreferenced sheets, unindexed sheets, unreferenced anchors, bad links, and/or other information.

The report generated by the error identification module may indicate who has worked on the project, at 2803, and provide an indication of how much work each individual or entity performed. In some embodiments, the author information may include the names or identification information of actual people. In other embodiments, the author information may identify human individuals, algorithms used, processing techniques employed, and/or other identifying information.

For instance, the author information may indicate that two humans worked on a project—Mark and Janet. Alternatively and/or additionally, the author information may indicate that Algorithm A was employed for part of the project and Algorithm B was employed for another part of the project. The summary report and/or other reports may provide an indication of discrepancies between the output of the humans and the algorithms, the two humans, or the two algorithms for portions of the projects worked on by more than one entity.

Figure 28B:
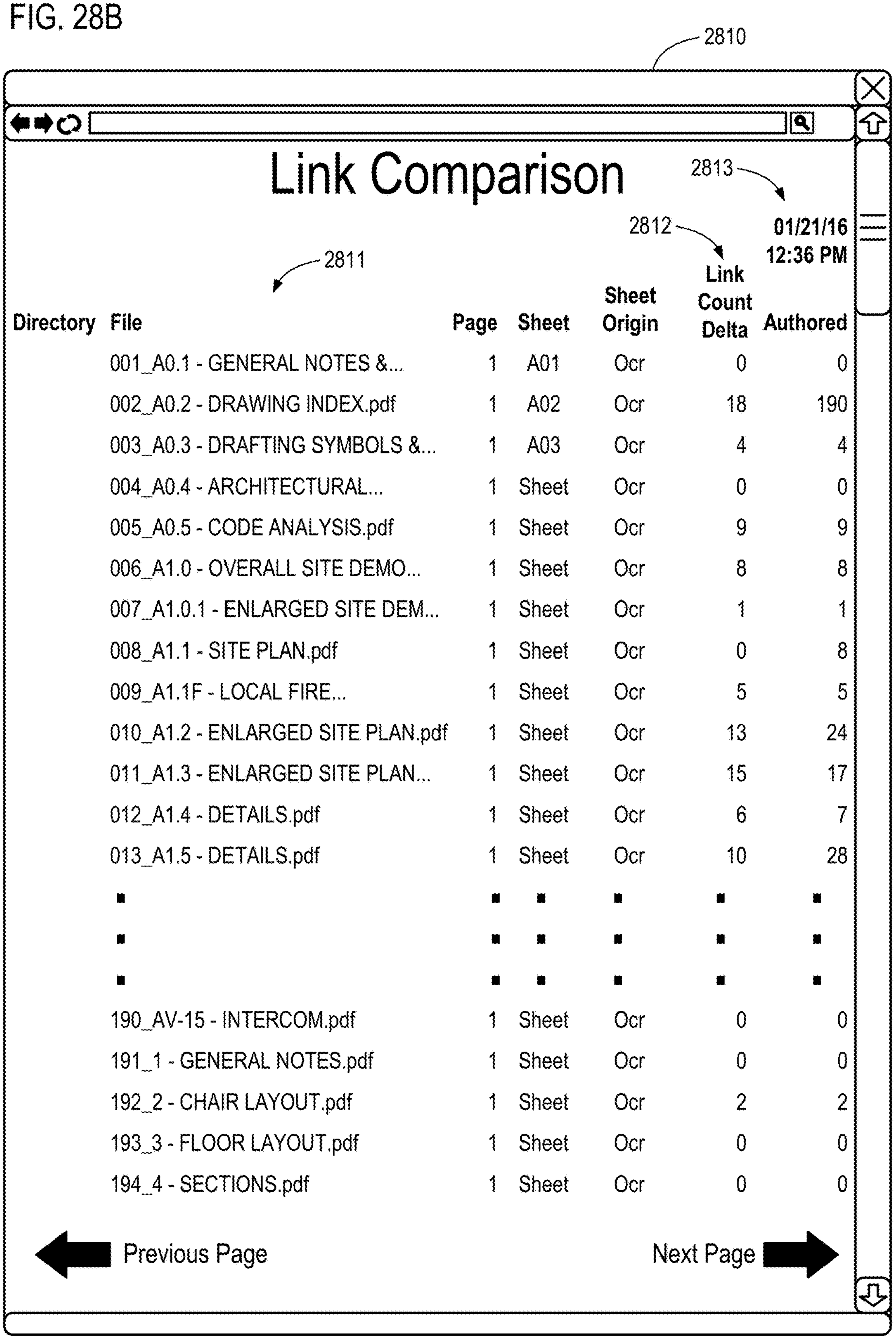
FIG. 28B illustrates the results of a link comparison module, according to one embodiment.

FIG. 28B illustrates the results 2810 of a link comparison module, according to one embodiment. As illustrated, the link comparison module may identify a number of files 2811 that have been processed on one or more dates, e.g., date column 2813. The date column 2813 may provide a count of the links found on each file 2811. Link count delta column 2812 may identify a difference between the number of links identified on date 2813 and prior (or later) dates on which the same files 2811 were processed. Thus, the link comparison module may identify potential discrepancies or processing errors based on a different number of links being identified during different processing runs.

Figure 28C:
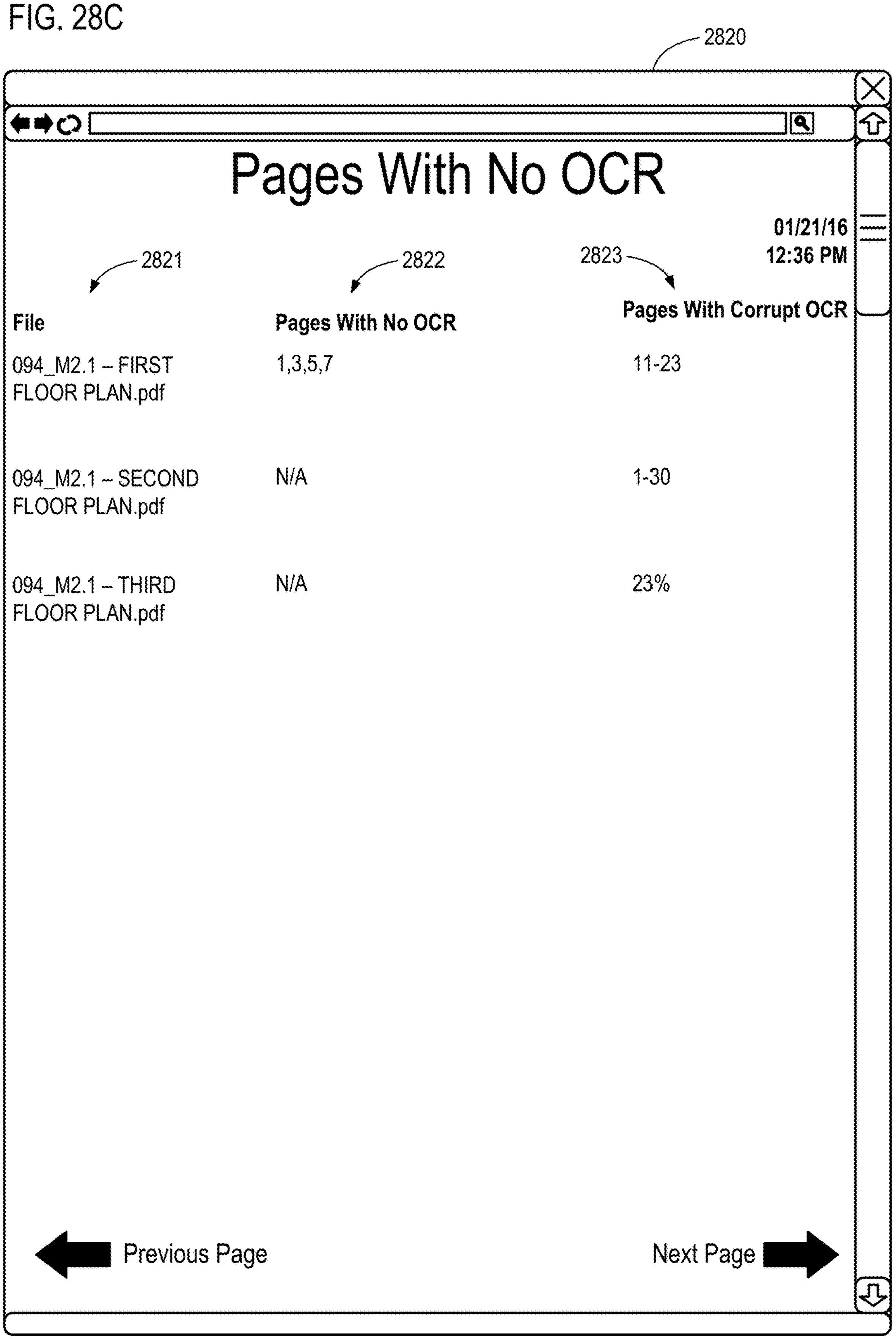
FIG. 28C illustrates a report with results from an OCR verification module, including identification of pages with no OCR and pages with corrupt OCR within various files.

FIG. 28C illustrates a report 2820 with results from an OCR verification module, including identification of files 2821 with no OCR 2822 and pages with corrupt OCR 2823. The pages with no OCR may or may not be an actual problem. A user may verify that the pages without OCR 2822 are not problematic and/or if OCR processing is needed-whether performed manually or automatically.

Pages with corrupt OCR 2823 may be expressed as an actual page range, number of pages, or a percentage of pages. In some embodiments, a low number of corrupt pages or a low percentage of corrupt pages may be ignored, while a percentage or number of pages exceeding a threshold value may be indicative of a problem. In some embodiments, any corrupt pages may be automatically marked for reprocessing (manually or automatically).

Figure 28D:
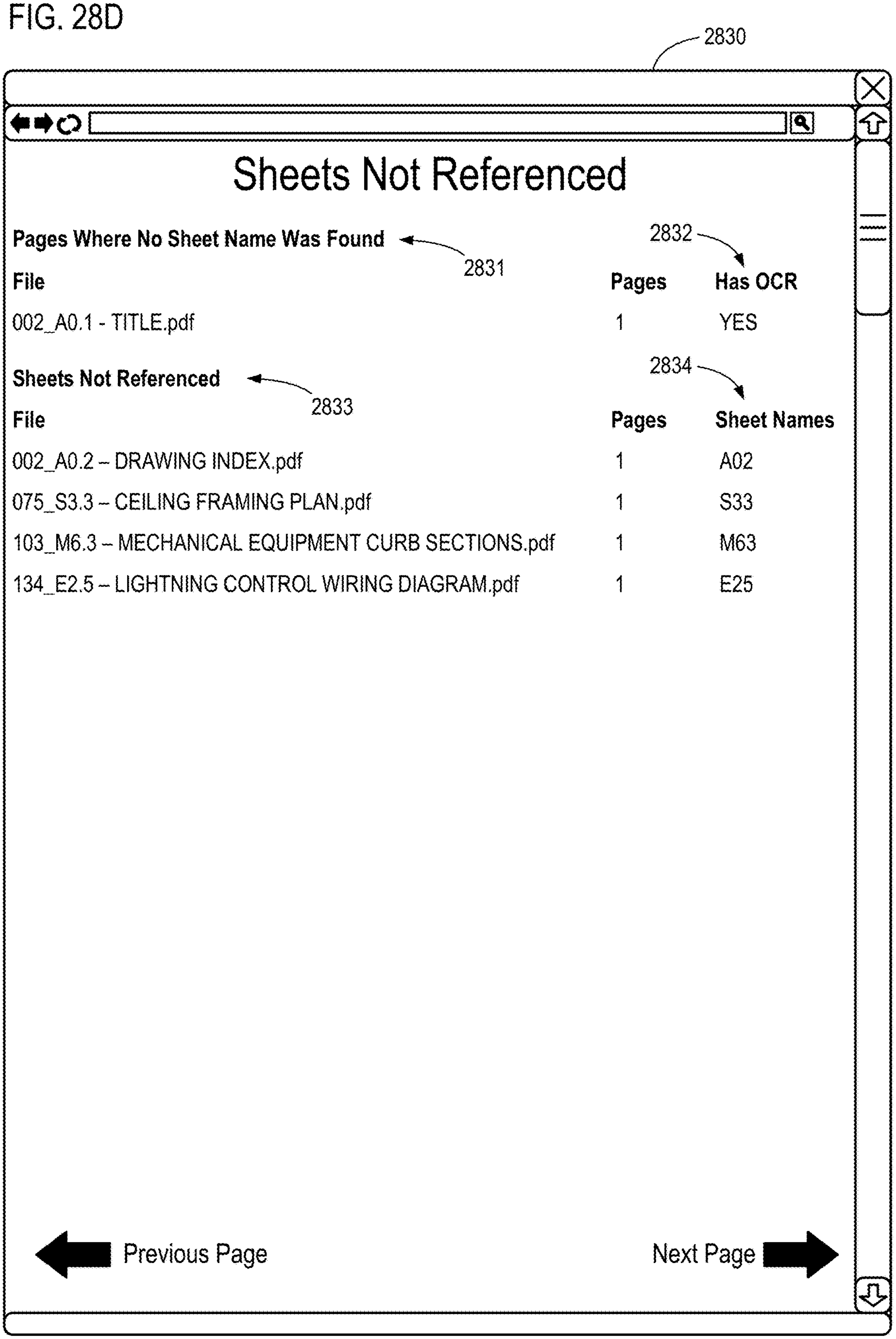
FIG. 28D illustrates a report of a sheet reference verification module identifying sheets without a sheet name and sheets that are not referenced by other sheets.

FIG. 28D illustrates a report 2830 of a sheet reference verification module identifying sheets without a sheet name 2831 and sheets that are not referenced by other sheets 2833. The sheet reference verification module may determine if the sheets that do not have a sheet name 2831 have been OCRed or not, at 2832. The sheets that are not referenced 2833 within each file may be listed by sheet name 2834.

Figure 28E:
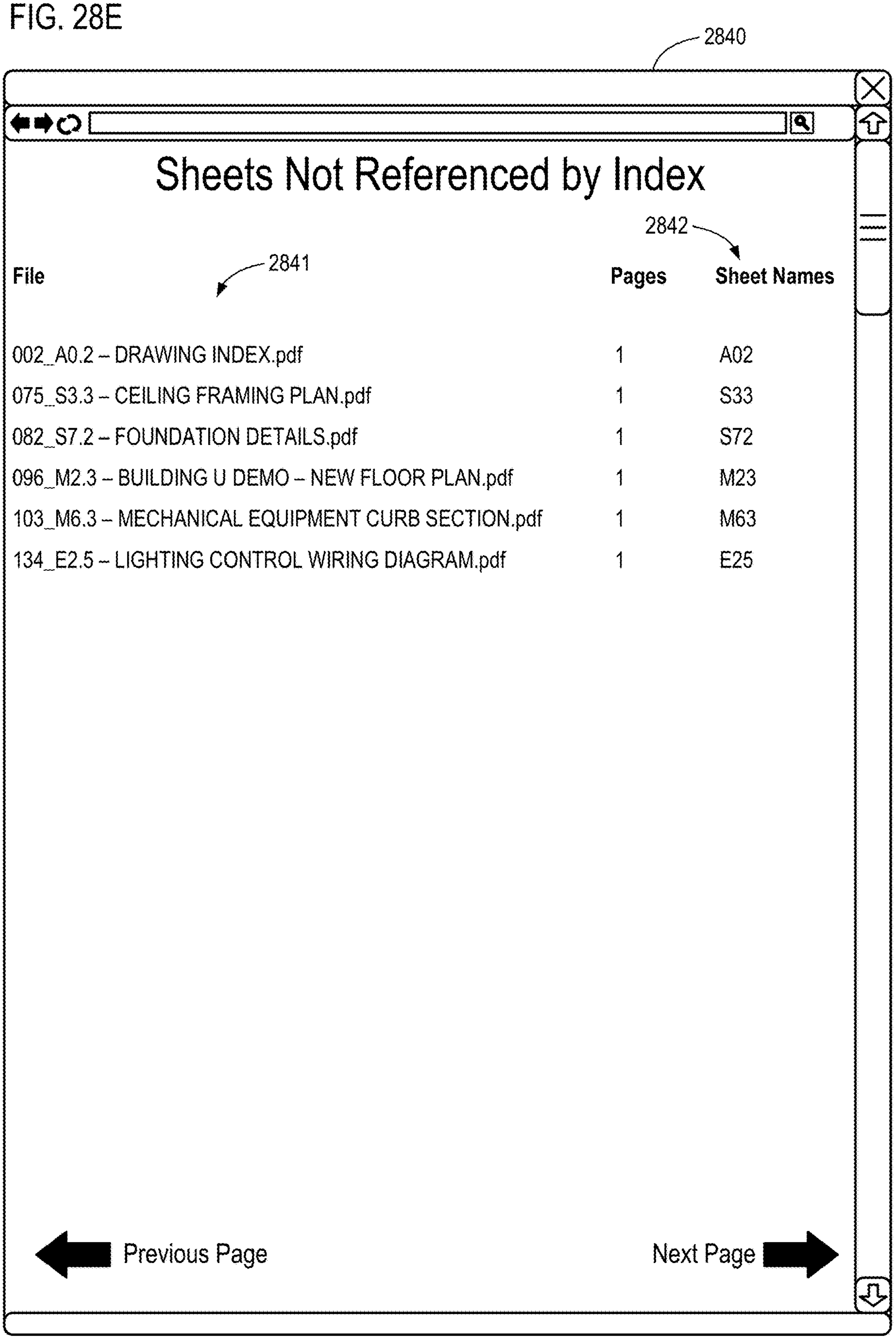
FIG. 28E illustrates a report from an indexed sheet verification module identifying sheets that are not referenced by an index sheet.

FIG. 28E illustrates a report 2840 from an indexed sheet verification module identifying sheets 2842 within a plurality of files 2841 of a project that are not referenced by an index sheet of the construction document set.

Figure 28F:
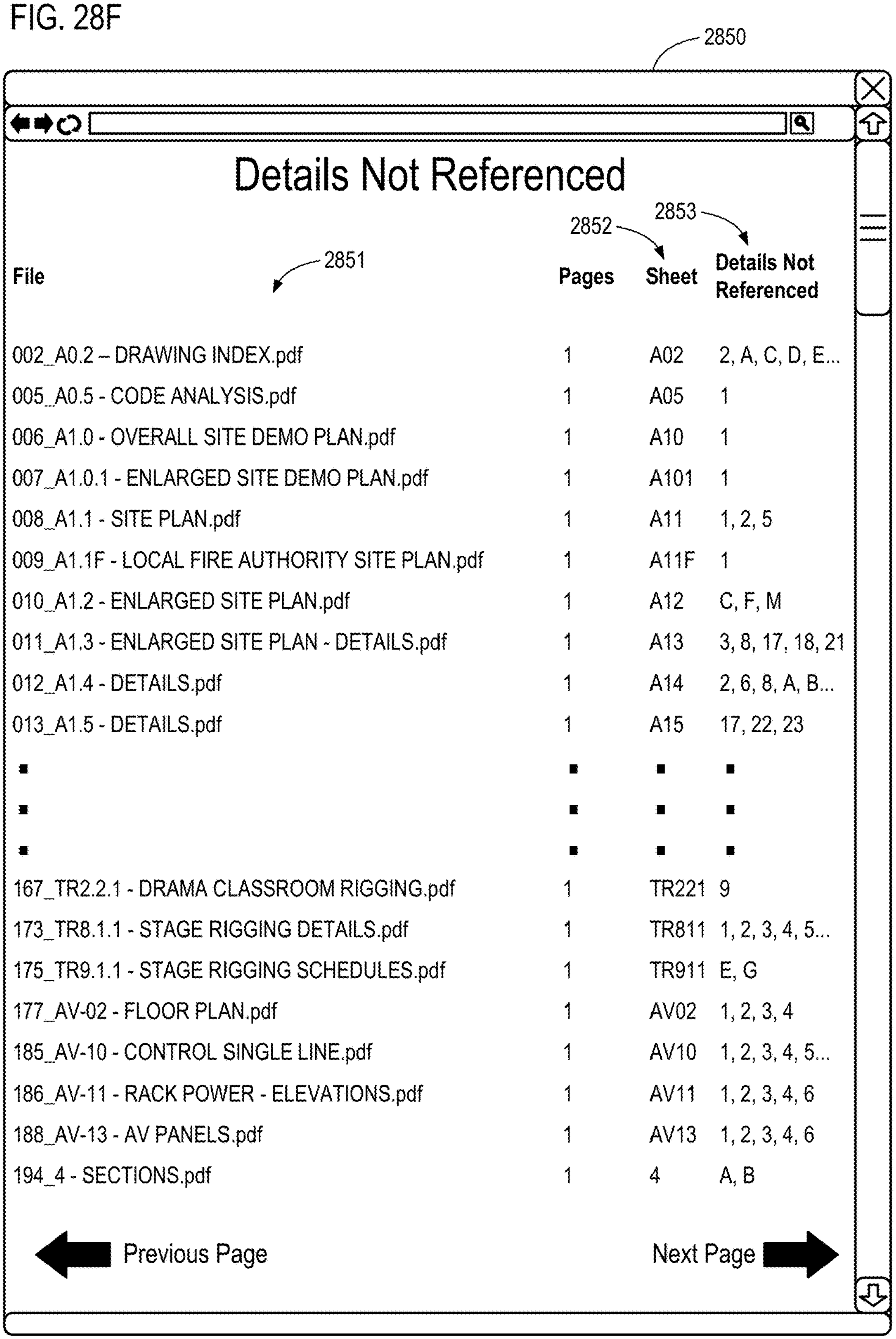
FIG. 28F illustrates a report from a detail reference verification module identifying details on sheets from a plurality for which no reference is found within a set of documents.

FIG. 28F illustrates a report 2850 from a detail reference verification module identifying details on sheets from a plurality for which no reference is found within a set of documents. The detail reference verification module may process a number of files 2851 to identify sheets 2852 that contain details that are never referenced by a sheet within the project 2853. The lack of any reference to the detail may be indicative of a problem or, for example, indicate that a set of construction documents are missing information.

FIG. 28G illustrates a report 2860 from a bad link identification module that identifies links for which the referenced sheets are missing. The bad link identification module 2860 may process a plurality of files 2861 to identify sheets 2862 that include sheets 2863 that reference details 2864 that do not exist elsewhere in the set of construction documents. For example, the 005_A0.5—CODE ANALYSIS.pdf file may include a sheet with a sheet name A05 that references detail A on sheet A32. However, the bad link identification module may identify this link as a "bad link" for the reason 2865 that sheet A32 does not exist within the set of construction documents. The reason 2865 that link is identified as bad may be because the sheet is missing (as illustrated) or because the specific detail does not exist on the referenced sheet.

Figure 28H:
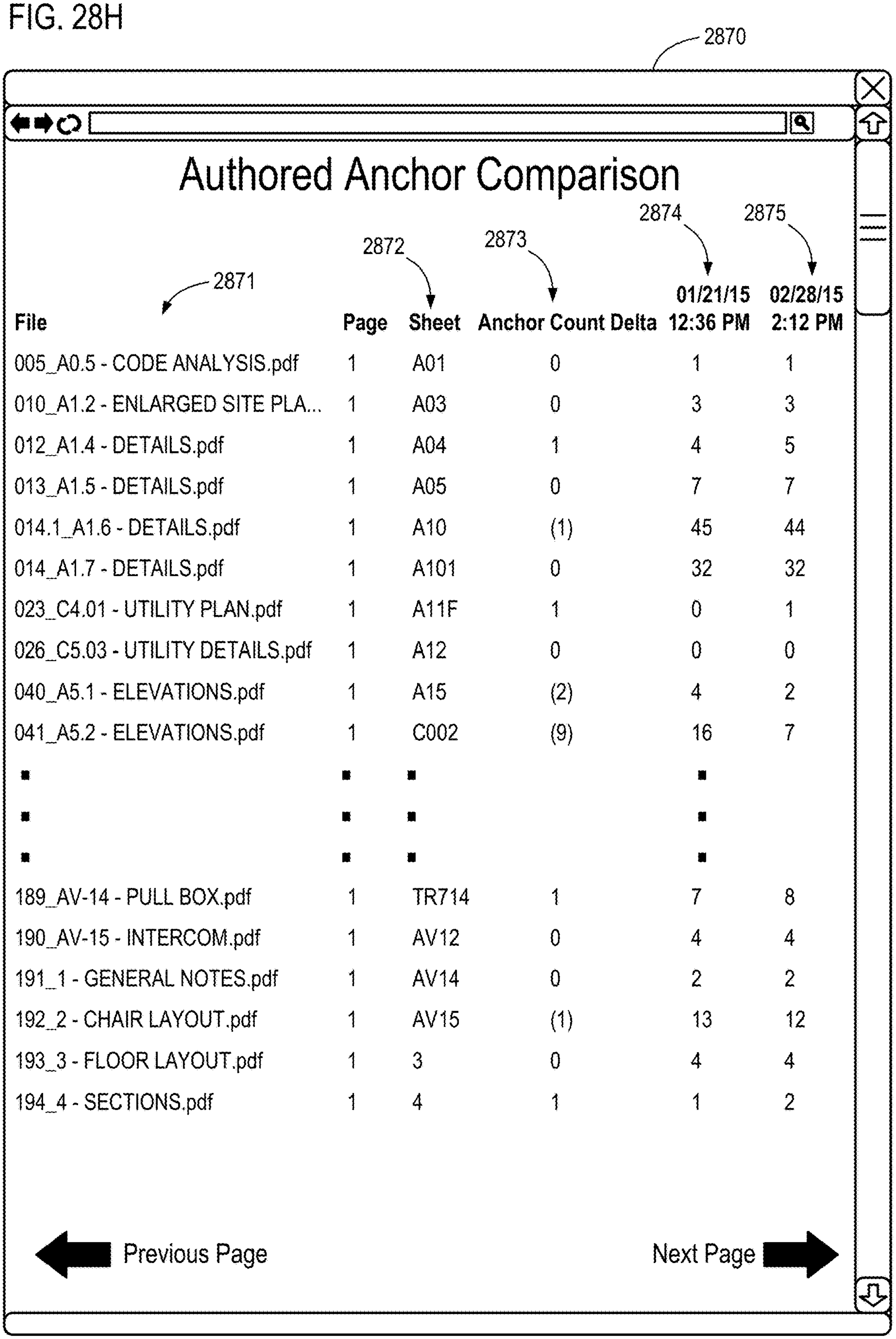
FIG. 28H illustrates a report from an authored anchor comparison module to identify potential discrepancies between the number of anchors on sheets identified by different authors or identification approaches.

FIG. 28H illustrates a report 2870 from an authored anchor comparison module to identify potential discrepancies between the number of anchors on sheets identified by different authors or identification approaches. As illustrated, the authored anchor comparison module may compare the number of anchors identified by different dates 2874 and 2875. The authored anchor comparison module may determine an anchor count delta 2873 based on differences between the number of anchors identified on each particular date 2874 and 2875.

The difference may be expressed in absolute numbers (as illustrated), as percentages, or even by simply indicating "discrepancy" or "no discrepancy." The authored anchor comparison module may process every file in a set of construction documents, or a subset list of files 2871. Each file may have only one page (as illustrated), or a plurality of pages. In embodiments in which the authored anchor comparison module processes a plurality of pages in a single file, the anchor count delta may be shown for each page of the file or for the file as a whole.

Figure 29A:
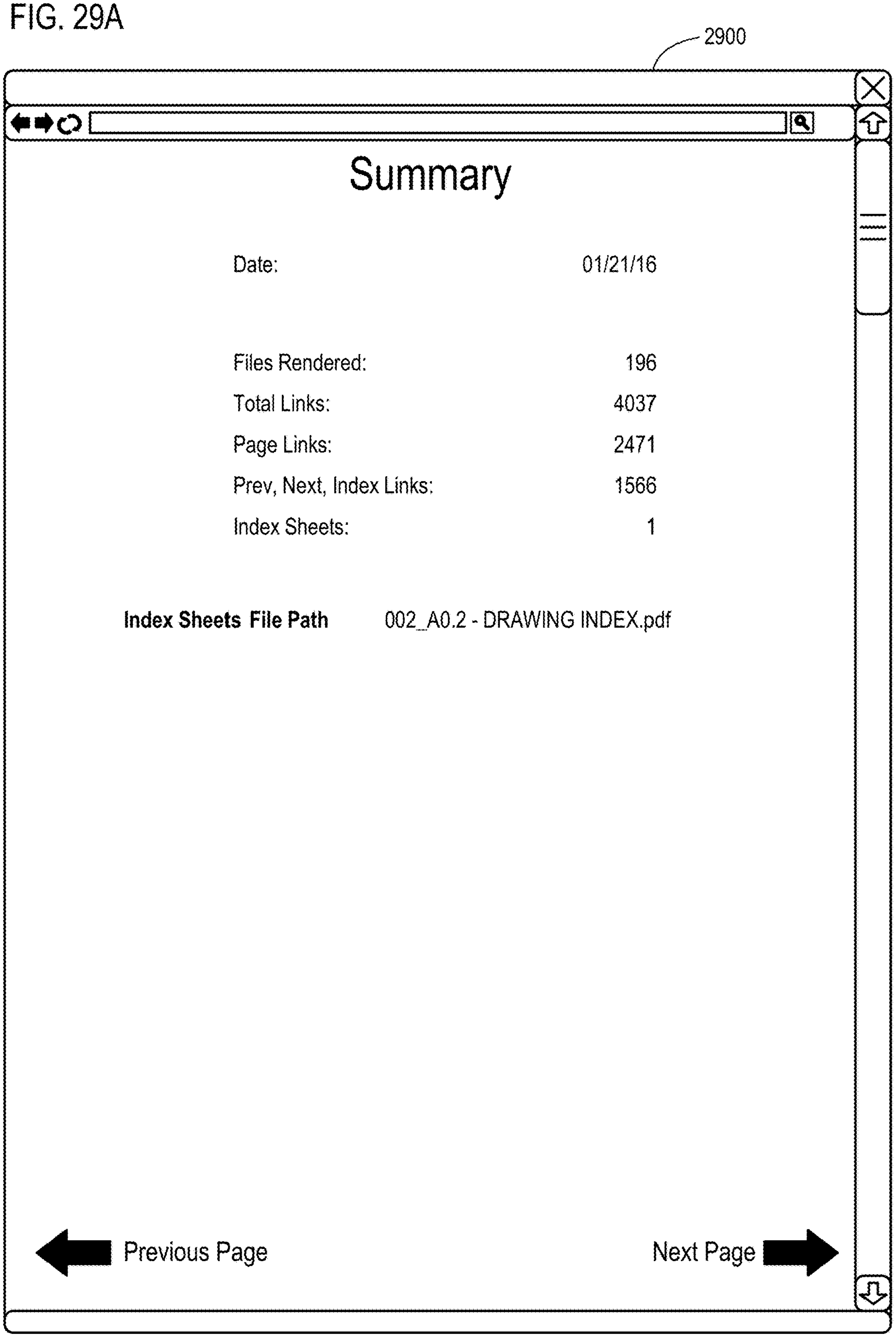
FIG. 29A illustrates summary document of the results of hyperlinking and indexing a set of construction documents, according to one embodiment.
Figure 29B:
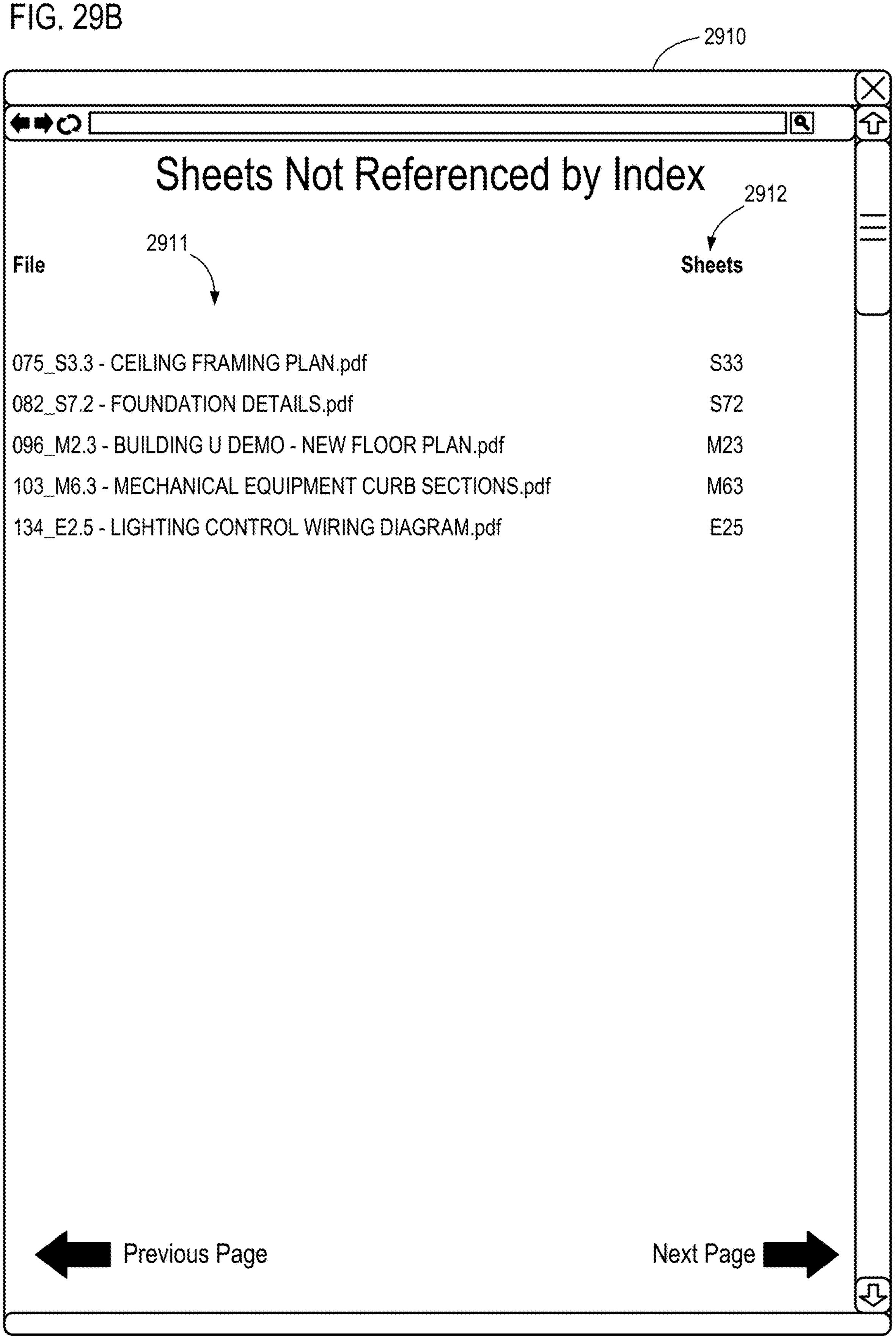
FIG. 29B illustrates a report from a sheet reference verification module that shows a list of sheets within a project that are not referenced by an index sheet of the construction set.

FIG. 29A illustrates summary document 2900 of the results of hyperlinking and indexing a set of construction documents, according to one embodiment. The report may be generated by the system illustrated in FIG. 27 using any of the various techniques, methods, and algorithms described herein FIG. 29B illustrates a report 2910 from a sheet reference verification module that shows a list of sheets within a project that are not referenced by an index sheet of the set of construction drawings (e.g., a table of contents). The sheet reference verification module may process all or a subset of files 2911 within a set of construction documents to identify those sheets 2912 that are not included in a master index sheet or in a sub-index sheet (e.g., an index of just plumbing documents or an index sheet of just electrical documents).

Figure 29C:
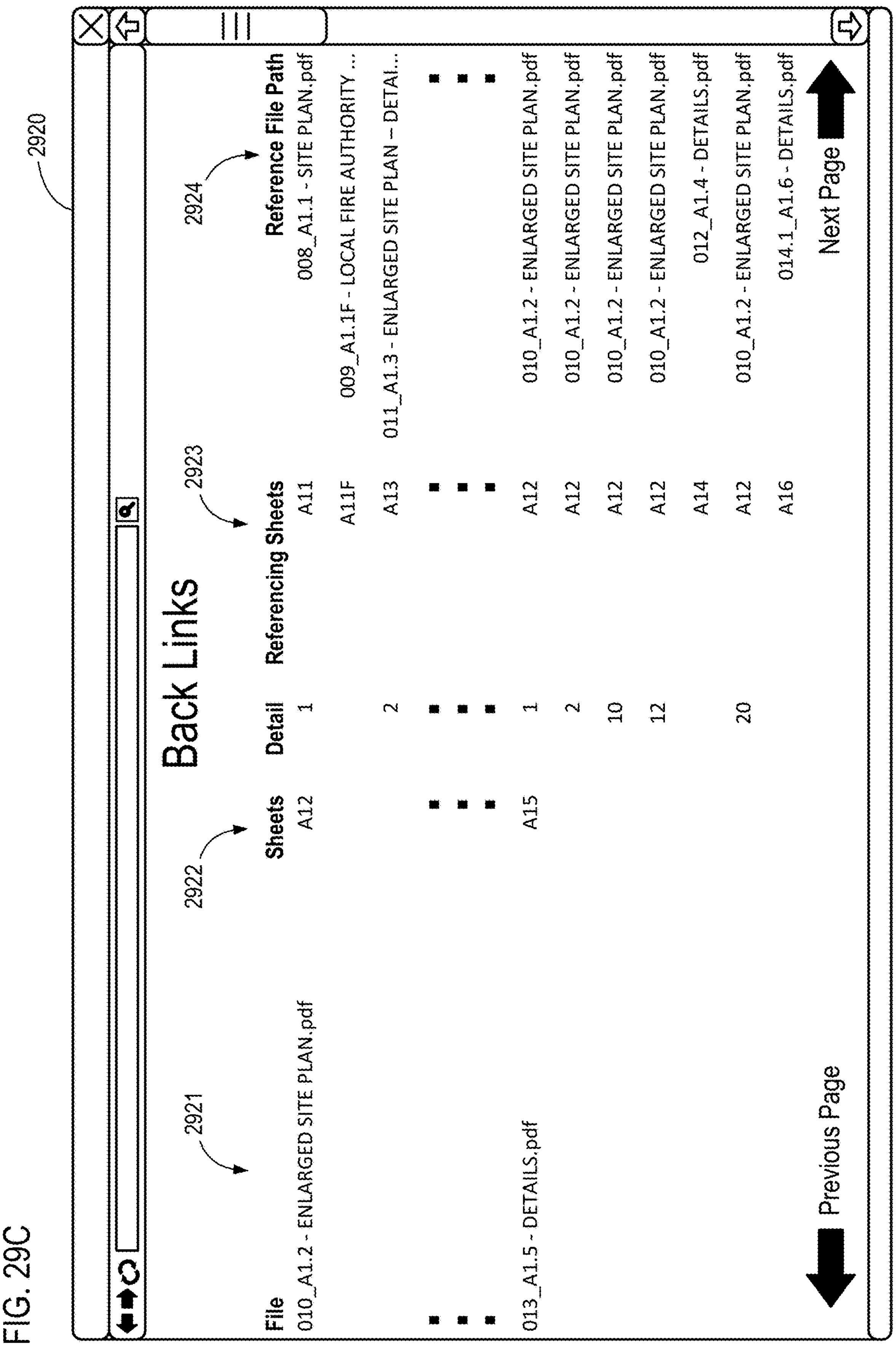
FIG. 29C illustrates a report from a detail reference verification module showing every referenced detail in the project and each sheet that references each respective detail.

FIG. 29C illustrates a report 2920 from a detail reference verification module showing every referenced detail in the project and each sheet that references each respective detail. As illustrated, a detail reference verification module may provide a comprehensive list of sheets 2922, detail numbers, sheets that reference the detail or sheet 2923, and the reference file path 2924. The detail reference verification module may process all of the files 2921 of a set of construction documents or a subset thereof. As in many of the illustrated reports, previous-page and next-page links may allow a user to navigate a report generated by a module if the report does not fit on a single page.

Figure 29D:
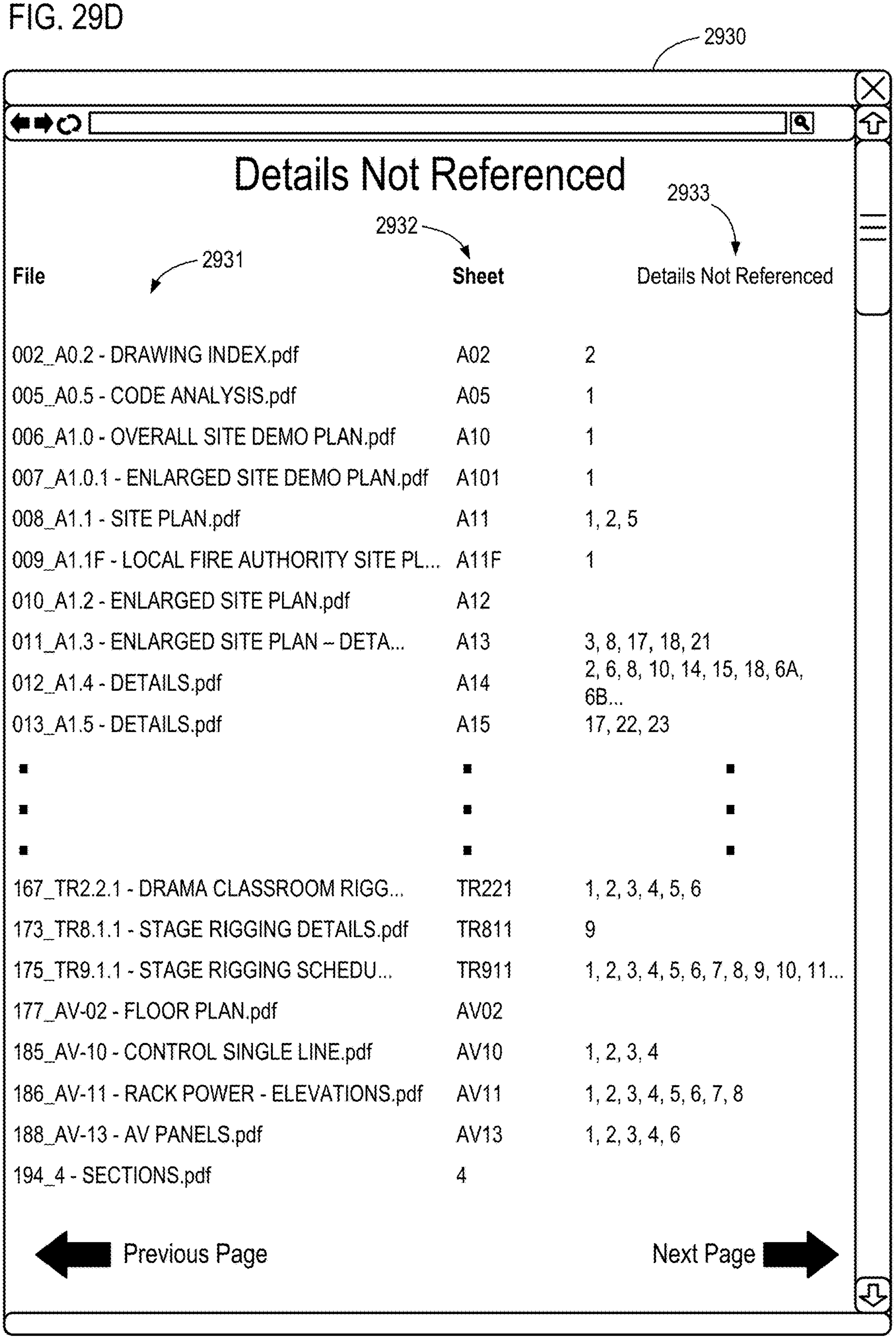
FIG. 29D illustrates a report from the detail reference verification module showing details within a project that are not referenced.

FIG. 29D illustrates a report 2930 from a detail reference verification module showing details within a project that are not referenced. For any number of files 2931, the detail reference verification module may identify those sheets 2932 that contain one or more details that are not referenced 2933.

Figure 29E:
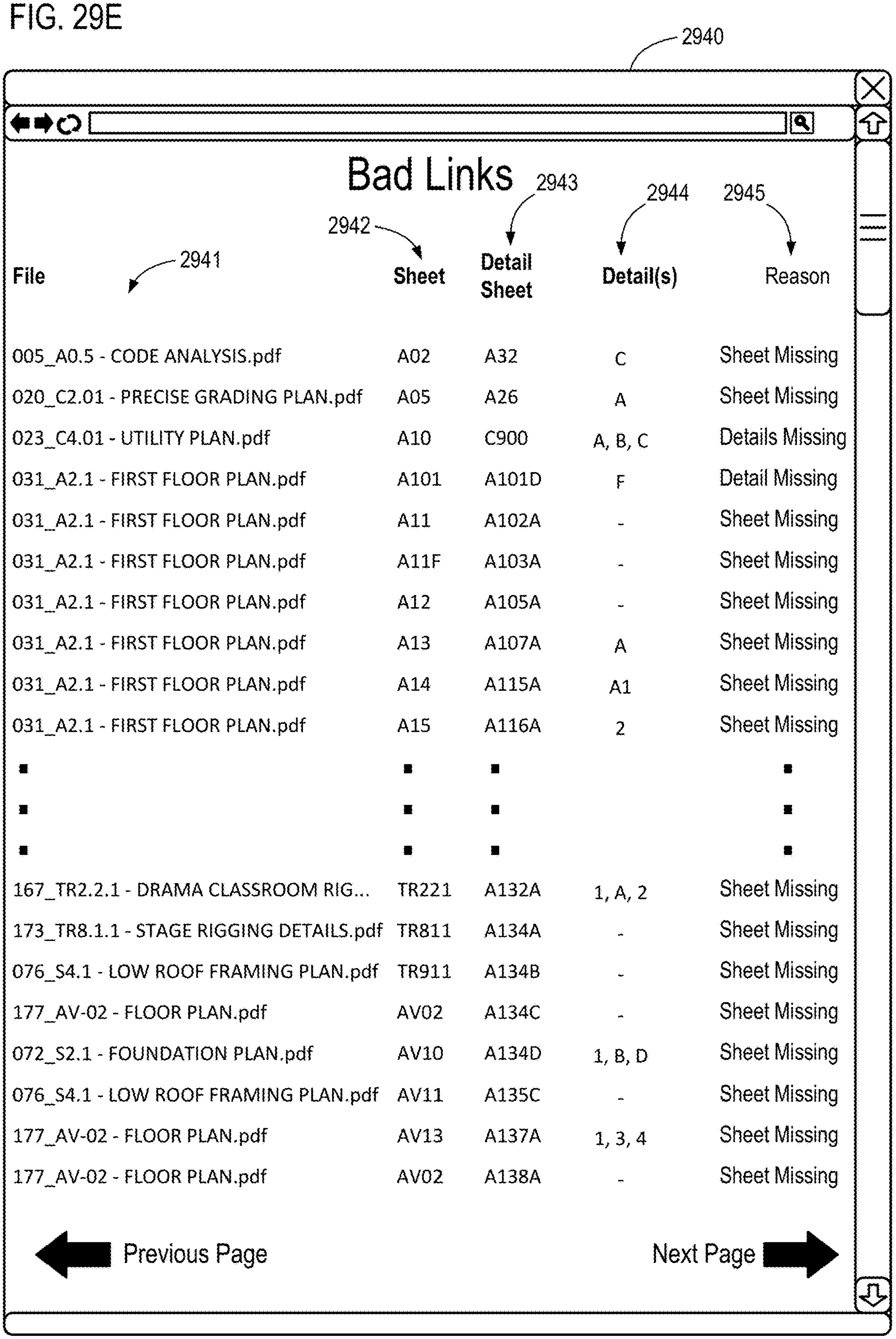
FIG. 29E illustrates a report from a bad link identification module showing a list of links for which no sheet or detail can be found.

FIG. 29E illustrates a report 2940 from the bad link identification module showing a list of links or details 2944 for which no sheet or detail can be found. For example, the bad link identification module may process a number of files to identify those sheets 2942 on which an anchor reference is found that cannot be or is not hyperlinked because the referenced sheet 2943 is missing 2945 or the referenced anchor notation 2944 is not found on the referenced sheet 2943. Such an anchor reference notation constitutes an erroneous anchor reference notation because the anchor reference notation does not exist on the referenced sheet or the referenced sheet does not exist.

Figure 30:
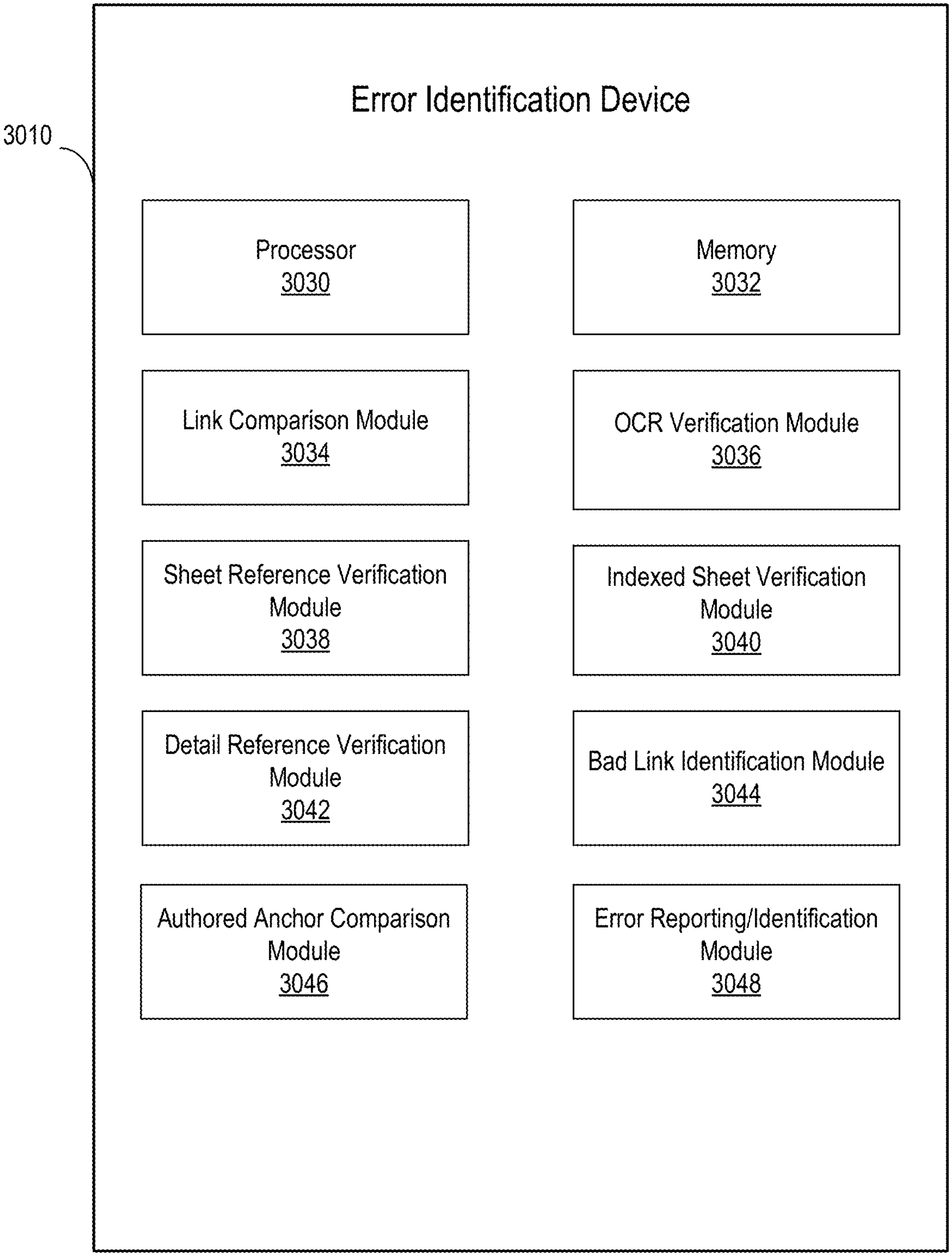
FIG. 30 illustrates a system for identifying potential or actual errors, omissions, discrepancies, warnings, missing items, mistakes, bad links, and the like, according to various embodiments.

FIG. 30 illustrates a system for identifying potential or actual errors, omissions, discrepancies, warnings, missing items, mistakes, bad links, and the like, according to various embodiments. It is appreciated that some identified anomalies may or may not represent mistakes, errors or omissions. For example, it may be intentional that an anchor notation on a sheet is not referenced by any other sheet. However, it is unlikely that a construction document will intentionally include an anchor reference with an anchor reference sheet name and/or an anchor reference notation that does not actually exist.

Thus, error reporting module 2775 of FIG. 27 may include one or more modules of error identification device 3010 and/or interface with a specialized error identification device 3010 to identify potential or actual errors, omissions, discrepancies, warnings, missing items, mistakes, bad links, or the like. The error identification device 3010 may be customized in manufacturing or programming to perform various identification, reporting, or verification functions for the hyperlinked and/or indexed documents. Each module 3034-3048 may represent hardware, firmware, and/or software components for performing a specialized function relating to identification, reporting, or verification.

The device 3010 may be tailored to perform those functions in an improved manner over a general-purpose computer, and one or more of the modules may modify a device having a processor 3030 and memory 3032 to become a special purpose or specialized device. The error identification device may be construction document specific. The error identification device may include various user interfaces, electronic displays, input devices, communication ports, network capabilities, and/or the like.

A link comparison module 3034 may identify a number of files that have been processed on one or more dates and compare the number of links found during each processing event. The link comparison module 3034 may identify and/or report a "link count delta" summarizing discrepancies between the number of links identified on each date. An OCR verification module 3036 may identify files for which no OCR has been performed and pages with corrupt OCR 2823. The numbers may be expressed as an actual page range, a number of pages, or a percentage of pages.

The error identification device 3010 may include a sheet reference verification module 3038. The sheet reference verification module 3038 may identify sheets that do not have a sheet name and, optionally, determine if these unnamed sheets have been properly OCRed. Moreover, the sheet reference verification module 3038 may also determine which of the sheets within a set of construction documents or specific files within the set of construction documents are not referenced by any other sheet.

The error identification device 3010 may also include an index sheet verification module 3040 that identifies any sheets not included on an index sheet of a set of construction plans. The detail reference verification module 3042 may process a number of files to identify sheets that contain details that are never referenced by a sheet within the project. For example, the detail reference verification module 3042 may identify anchor notations that are never referenced by an anchor reference on any other sheet within the set of construction documents or at least within the processed files.

A bad link identification module 3044 may identify links, references, anchor references, anchor reference sheet names, anchor reference notations, or similar pointers that point to something that does not exist within the set of documents or files.

For example, the bad link identification module 3044 may identify sheets that include anchor reference notations that include (1) a reference sheet name notation and (2) a reference to an anchor notation on the referenced sheet. If the referenced sheet does not exist or the anchor reference on the referenced sheet does not exist, the bad link identification module 3044 may notify a user or otherwise report the error.

An authored anchor comparison module 3046 may compare the number of anchors identified on different dates for a particular sheet or file and determine a delta. The delta or difference may be expressed as a number, as a percentage, or in a pass/fail fashion. Each of the modules 3034-3046 may implement a processing or identification function based on the algorithms and methods described herein. The error identification device 3010 may utilize an error reporting or identification module 3048 to generate a report and/or otherwise notify a user or other system of a potential or actual error or discrepancy.

In various embodiments, the error identification device 3010 may include an API to allow other systems or programs to utilize the functionalities or results of the various modules 3034-3048. Any of the modules 3034-3046 may be broadly referred to as an "error identification module" configured to identify and/or report one or more actual errors or potential errors as per the specific functionality of the module.

Many changes may be made to the details of the above-described embodiments without departing from the underlying principles and scope of the present disclosure.

What is claimed:

1. A system, comprising:

a computing device comprising a processor and memory;

an input module to interact with the processor and memory of the computing device to receive a plurality of digital construction document pages having machine-encoded sheet name notations thereon, including primary sheet name notations and reference sheet name notation, wherein each reference sheet name notation refers to a primary sheet name notation presumably on another of the plurality of digital pages; and an error identification module to identify at least one reference sheet name notation that refers to a primary sheet name notation that is not in the electronic index as an erroneous reference sheet name notation; and a reporting module to generate an electronic construction document error report that identifies each primary sheet name notation and each reference sheet name notation within the plurality of digital pages, wherein at least one of the reference sheet name notations and the primary sheet name notations are non-sequentially located within the plurality of digital pages.

2. The system of claim 1, further comprising:

an indexing module to generate a digitally accessible electronic index in a non-transitory computer readable medium that:

associates each identified primary sheet name notation with one of the plurality of digital pages, and associates each reference sheet name notation with the primary sheet name notation on which it is identified, wherein the reporting module is further configured to generate a report of the electronic index that identifies each reference sheet name notation that refers to a primary sheet name notation that is not in the electronic index.

3. The system of claim 2, further comprising an error identification subsystem to identify each reference sheet name notation that refers to a primary sheet name notation that is not in the electronic index as an error, and wherein the reporting module is further configured to identify each error within the electronic report.

4. The system of claim 3, wherein the electronic report includes at least one primary sheet name notation referenced by at least two reference sheet name notations on different digital pages.

5. The system of claim 4, wherein the generated electronic index includes a first primary sheet name notation on a first digital page referred to by (1) a first reference sheet name notation on a second digital page and (2) a second reference sheet name notation on a third digital page, and wherein the system further comprises a backlink generation module to create a backlink for the first primary sheet name within the electronic report with hyperlinks to each of the first reference sheet name notation and the second reference sheet name notation.

6. The system of claim 5, wherein the first digital page, the second digital page, and the third digital page are interspersed and non-sequential within the plurality of digital pages.

7. The system of claim 4, wherein the electronic report further comprises backlink information associated with at least one of the primary sheet name notations, wherein the backlink information associated with each respective primary sheet name notation comprises a report of plurality of digital pages, listed by primary sheet name notations, that include reference sheet name notations that reference each respective backlinked primary sheet name notation.

8. The system of claim 7, wherein the selectively viewable backlink information is viewable by a user in response to a mouse-over on the backlinked primary sheet name notation, such that by mousing-over on the backlinked primary sheet name notation, the user is able to view a list of primary sheet name notations of digital pages that include reference sheet name notations thereon that refer to the backlinked primary sheet name notation within the report.

9. The system of claim 1, wherein one of the plurality of digital pages comprises an index sheet of primary sheet names within the plurality of digital pages, and wherein the reporting module is further configured to generate a report of the primary sheet names identified within the plurality of digital pages that are not listed within the index sheet.

10. A non-transitory computer readable storage medium storing instructions that, when executed by a processor, are configured to cause the processor to:

receive a plurality of digital construction document pages having machine-encoded text, wherein the machine-encoded text of the plurality of digital pages includes a plurality of notations, including primary sheet name notations and reference sheet name notations, wherein each reference sheet name notation refers to a primary sheet name notation on another of the plurality of digital pages; and generating a digitally accessible electronic index in a non-transitory computer-readable medium that associates each identified primary sheet name notation with one of the plurality of digital pages, and associates each reference sheet name notation with (i) the digital page on which it is located and (ii) the primary sheet name notation to which it refers, wherein the electronic index includes at least one primary sheet name notation referred to by multiple reference sheet name notations on different, non-sequential digital construction document pages, and wherein the electronic index identifies each reference sheet name notation that refers to a primary sheet name notation that is not in the electronic index.

11. The non-transitory computer readable storage medium of claim 10, wherein the digital pages comprise construction document pages.

12. A system, comprising:

an input subsystem to interact to receive a plurality of non-sequential digital construction document pages having machine-encoded sheet name notations thereon;

a categorization subsystem:

categorize each sheet name notation that refers to a primary sheet name notation purported to be on another of the plurality of digital pages as a reference sheet name notation, and categorize each sheet name notation that is not categorized as a reference sheet name notation as a primary sheet name notation;

an indexing subsystem to generate a digitally accessible electronic index that:

associates each primary sheet name notation with one of the plurality of digital pages, and associates each reference sheet name notation with (i) the digital page on which it is located, and (ii) the primary sheet name notation to which it refers;

an error identification subsystem to identify at least one reference sheet name notation that refers to a primary sheet name notation that is not in the electronic index as an erroneous reference sheet name notation; and a reporting subsystem to generate a construction document report of the electronic index that identifies each erroneous reference sheet name notation and the digital page on which it is located, wherein the reporting subsystem is configured to identify the digital page on which each erroneous reference sheet name notation is located.

13. The system of claim 12, wherein the reporting subsystem is configured to identify the digital page on which each erroneous reference sheet name notation is located by providing the primary sheet name notation of the digital page on which the erroneous reference sheet name notation is located.

14. The system of claim 12, wherein the generated electronic index includes a first primary sheet name notation on a first digital page referred to by (1) a first reference sheet name notation on a second digital page and (2) a second reference sheet name notation on a third digital page, and wherein the system further comprises a backlink generation module to create a backlink for the first primary sheet name within the electronic report with hyperlinks to each of the first reference sheet name notation and the second reference sheet name notation.

15. The system of claim 14, wherein the first digital page, the second digital page, and the third digital page are interspersed and non-sequential within the plurality of digital pages.

16. The system of claim 12, wherein the electronic report further comprises backlink information associated with at least one of the primary sheet name notations, wherein the backlink information associated with each respective primary sheet name notation comprises a report of plurality of digital pages, listed by primary sheet name notations, that include reference sheet name notations that reference each respective backlinked primary sheet name notation.

17. The system of claim 16, wherein the selectively viewable backlink information is viewable by a user in response to a mouse-over on the backlinked primary sheet name notation, such that by mousing-over on the backlinked primary sheet name notation, the user is able to view a list of primary sheet name notations of digital pages that include reference sheet name notations thereon that refer to the backlinked primary sheet name notation within the report.

18. The system of claim 17, wherein one of the plurality of digital pages comprises an index sheet of primary sheet names within the plurality of digital pages, and wherein the reporting module is further configured to generate a report of the primary sheet names identified within the plurality of digital pages that are not listed within the index sheet.

* * * * *